(12) United States Patent
Ikai et al.

(10) Patent No.: US 10,104,362 B2
(45) Date of Patent: Oct. 16, 2018

(54) IMAGE DECODING DEVICE, IMAGE CODING DEVICE, AND CODED DATA

(71) Applicant: SHARP KABUSHIKI KAISHA, Osaka-shi, Osaka (JP)

(72) Inventors: Tomohiro Ikai, Osaka (JP); Tomoyuki Yamamoto, Osaka (JP); Takeshi Tsukuba, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 83 days.

(21) Appl. No.: 15/027,486

(22) PCT Filed: Oct. 7, 2014

(86) PCT No.: PCT/JP2014/076852
§ 371 (c)(1),
(2) Date: Apr. 6, 2016

(87) PCT Pub. No.: WO2015/053286
PCT Pub. Date: Apr. 16, 2015

(65) Prior Publication Data
US 2016/0241835 A1    Aug. 18, 2016

(30) Foreign Application Priority Data
Oct. 8, 2013 (JP) .................. 2013-211468

(51) Int. Cl.
H04N 13/00    (2018.01)
H04N 13/161   (2018.01)
H04N 13/128   (2018.01)
H04N 19/70    (2014.01)
H04N 19/30    (2014.01)

(52) U.S. Cl.
CPC ....... *H04N 13/161* (2018.05); *H04N 13/0022* (2013.01); *H04N 13/0048* (2013.01); *H04N 13/128* (2018.05); *H04N 19/30* (2014.11); *H04N 19/70* (2014.11)

(58) Field of Classification Search
CPC .... H04N 19/70; H04N 19/30; H04N 13/0022; H04N 13/0048
USPC .................................................. 375/240.25
See application file for complete search history.

(56) References Cited

PUBLICATIONS

Gerhard Tech et al, "MV-HEVC Draft Text 5", Joint Collaborative Team on 3D Video Coding Extension Development of ITU-T SG 16 WP 3 and ISO/IEC JTC 1/SC29/WG 11, 5th meeting: Vienna, AT, Jul. 27-Aug. 2, 2013; JCT3V-E1004-v6; XP030131384; Aug. 7, 2013.

(Continued)

*Primary Examiner* — Nguyen Truong
(74) *Attorney, Agent, or Firm* — Birch, Stewart, Kolasch & Birch, LLP

(57) ABSTRACT

An image decoding device which can extract an independent layer without rewriting of syntax and cause a non-scalable decoder to reproduce the extracted is realized. An image decoding device (1) includes a NAL-unit header decoding unit (211) that decodes a layer ID of an SPS, a dependency layer information decoding unit (2101) that decodes dependency layer information, and a profile level information decoding unit (2102) that decodes profile level information from a VPS. The decoding unit (2102) decodes the profile level information also from the SPS in a case where, it is determined that a layer indicated by the layer ID is an independent layer, based on the dependency layer information.

4 Claims, 43 Drawing Sheets

(56) References Cited

PUBLICATIONS

Chen et al., "High efficiency video coding (HEVC) scalable extension draft 3", JCTVC-N1008_v3, 14th Meeting: Vienna, AT, Jul. 25-Aug. 2, 2013.

Chen et al., "SHVC Draft 3", Joint Collaborative Team on Video Coding (JCT-VC) of ITU-T SG 16 WP 3 and ISO/IEC JTC 1/SC 29/WG 11, JCTVC-N1008_v1, 14th Meeting: Vienna, AT, Jul. 25-Aug. 2, 2013, pp. i-iv, 1-66.

Ikai et al., "On independent layer", Joint Collaborative Team on n Video Coding (JCT-VC) of ITU-T SG 16 WP 3 and ISO/IEC JTC 1/SC 29/WG 11, JCTVC-O0062_r2, 15th Meeting: Geneva, CH, Oct. 23-Nov. 1, 2013, pp. 1-8.

International Search Report, issued in PCT/JP2014/076852, PCT/ISA/210, dated Jan. 6, 2015.

Written Opinion of the International Searching Authority, issued in PCT/JP2014/076852, PCT/ISA/237, dated Jan. 6, 2015.

| nal_unit( NumBytesInNALunit ) { | Descriptor |
|---|---|
| nal_unit_header( ) | |
| NumBytesInRBSP = 0 | |
| for( i = 2; i < NumBytesInNALunit; i++ ) { | |
| if( i + 2 < NumBytesInNALunit && next_bits( 24 ) == 0x000003 ) { | |
| rbsp_byte[ NumBytesInRBSP++ ] | b(8) |
| rbsp_byte[ NumBytesInRBSP++ ] | b(8) |
| i += 2 | |
| emulation_prevention_three_byte /* equal to 0x03 */ | f(8) |
| } else | |
| rbsp_byte[ NumBytesInRBSP++ ] | b(8) |
| } | |
| } | |

(b)

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG. 13

| nal_unit_type | Name of nal_unit_type | Content of NAL unit and RBSP syntax structure | NAL unit type class | |
|---|---|---|---|---|
| 0, 1 | TRAIL_N, TRAIL_R | Coded slice segment of a non-TSA, non-STSA trailing picture<br>slice_segment_layer_rbsp( ) | VCL | ⎫<br>⎬ SYNA101 |
| 2, 3 | TSA_N, TSA_R | Coded slice segment of a TSA picture<br>slice_segment_layer_rbsp( ) | VCL | |
| 4, 5 | STSA_N, STSA_R | Coded slice segment of an STSA picture<br><br>slice_layer_rbsp( ) | VCL | |
| 6, 7 | RADL_N, RADL_R | Coded slice segment of a RADL picture<br><br>slice_layer_rbsp( ) | VCL | |
| 8, 9 | RASL_N, RASL_R, | Coded slice segment of a RASL picture<br>slice_layer_rbsp( ) | VCL | |
| 10, 12, 14 | RSV_VCL_N10 RSV_VCL_N12 RSV_VCL_N14 | Reserved // reserved non-RAP non-reference VCL NAL unit types | VCL | |
| 11, 13, 15 | RSV_VCL_R11 RSV_VCL_R13 RSV_VCL_R15 | Reserved // reserved non-RAP reference VCL NAL unit types | VCL | ⎭ |
| 16, 17, 18 | BLA_W_LP BLA_W_DLP BLA_N_LP | Coded slice segment of a BLA picture<br>slice_segment_layer_rbsp( ) | VCL | ⎫<br>⎬ SYNA102 |
| 19, 20 | IDR_W_DLP IDR_N_LP | Coded slice segment of an IDR picture<br>slice_segment_layer_rbsp( ) | VCL | |
| 21 | CRA_NUT | Coded slice segment of a CRA picture<br>slice_segment_layer_rbsp( ) | VCL | ⎭ |
| 22, 23 | RSV_RAP_VCL22.. RSV_RAP_VCL23 | Reserved // reserved RAP VCL NAL unit types | VCL | |
| 24..31 | RSV_VCL24.. RSV_VCL31 | Reserved // reserved non-RAP VCL NAL unit types [ | VCL | |
| 32 | VPS_NUT | Video parameter set<br>video_parameter_set_rbsp( ) | non-VCL | ⎫<br>⎬ SYNA103 |
| 33 | SPS_NUT | Sequence parameter set<br>seq_parameter_set_rbsp( ) | non-VCL | |
| 34 | PPS_NUT | Picture parameter set<br>pic_parameter_set_rbsp( ) | non-VCL | ⎭ |
| 35 | AUD_NUT | Access unit delimiter<br>access_unit_delimiter_rbsp( ) | non-VCL | |
| 36 | EOS_NUT | End of sequence<br>end_of_seq_rbsp( ) | non-VCL | |
| 37 | EOB_NUT | End of bitsteam<br>end_of_bitstream_rbsp( ) | non-VCL | |
| 38 | FD_NUT | Filler data<br>filler_data_rbsp( ) | non-VCL | |
| 39, 40 | PREFIX_SEI_NUT SUFFIX_SEI_NUT | Supplemental enhancement information (SEI)<br>sei_rbsp( ) | non-VCL | |
| 41..47 | RSV_NVCL41.. RSV_NVCL47 | Reserved | non-VCL | |
| 48..63 | UNSPEC48.. UNSPEC63 | Unspecified | non-VCL | |

FIG. 14

| video_parameter_set_rbsp( ) { | Descriptor | |
|---|---|---|
| video_parameter_set_id | u(4) | ←SYNA401 |
| vps_temporal_id_nesting_flag | u(1) | ←SYNA402 |
| vps_reserved_zero_2bits | u(2) | |
| vps_max_num_layers_minus1 //reserved_zero_6bits in the base spec | u(6) | ←SYNA403 |
| vps_max_sub_layers_minus1 | u(3) | |
| next_essential_info_byte_offset //vps_reserved_zero_16bits in the base spec | u(16) | |
| profile_tier_level( 1, vps_max_sub_layers_minus1 ) | | |
| for( i = 0; i <= vps_max_sub_layers_minus1; i++ ) { | | |
|   vps_max_dec_pic_buffering[ i ] | ue(v) | |
|   vps_max_num_reorder_pics[ i ] | ue(v) | |
|   vps_max_latency_increase[ i ] | ue(v) | |
| } | | |
| vps_num_hrd_parameters | ue(v) | |
| vps_max_nuh_reserved_zero_layer_id | u(6) | |
| for( i = 0; i < vps_num_hrd_parameters; i++ ) { | | |
|   if( i > 0 ) | | |
|     operation_point_layer_ids( i ) | | |
|   hrd_parameters( i == 0, vps_max_sub_layers_minus1 ) | | |
| } | | |
| bit_equal_to_one | u(1) | |
| vps_extension( ) | | |
| vps_extension_flag | u(1) | ←SYNA404 |
| if( vps_extension_flag ) | | |
|   while( more_rbsp_data( ) ) | | |
|     vps_extension_data_flag | u(1) | ←SYNA405 |
| rbsp_trailing_bits( ) | | |
| } | | |

FIG. 15

| vps_extension( ) { | Descriptor | |
|---|---|---|
| avc_base_layer_flag | u(1) | |
| vps_vui_offset | u(16) | |
| splitting_flag | u(1) | |
| for( i = 0, NumScalabilityTypes = 0; i < 16; i++ ) { | | |
| scalability_mask_flag[ i ] | u(1) | |
| NumScalabilityTypes += scalability_mask_flag[ i ] | | |
| } | | |
| for( j = 0; j < ( NumScalabilityTypes − splitting_flag ); j++ ) | | |
| dimension_id_len_minus1[ j ] | u(3) | ←SYNA501 |
| vps_nuh_layer_id_present_flag | u(1) | |
| for( i = 1; i <= vps_max_layers_minus1; i++ ) { | | |
| if( vps_nuh_layer_id_present_flag ) | | |
| layer_id_in_nuh[ i ] | u(6) | |
| if( !splitting_flag ) | | |
| for( j = 0; j < NumScalabilityTypes; j++ ) | | |
| dimension_id[ i ][ j ] | u(v) | ←SYNA502 |
| } | | |
| if( NumViews > 1 ) | | |
| view_id_len_minus1 | u(4) | |
| for( i = 0; i < NumViews; i++ ) | | |
| view_id_val[ i ] | u(v) | |
| for( i = 1; i <= vps_max_layers_minus1; i++ ) | | |
| for( j = 0; j < i; j++ ) | | |
| direct_dependency_flag[ i ][ j ] | u(1) | ←SYNA503 |
| ... | | ←SYNA504 |
| } | | |

| seq_parameter_set_rbsp( ) { | Descriptor |
|---|---|
| sps_video_parameter_set_id | u(4) |
| if( IndependentLayerFlag [nuh_layer_id] || nuh_layer_id == 0 ) { | |
| sps_max_sub_layers_minus1 | u(3) |
| sps_temporal_id_nesting_flag | u(1) |
| profile_tier_level( 1, sps_max_sub_layers_minus1 ) | |
| } | |
| sps_seq_parameter_set_id | ue(v) |
| if(! IndependentLayerFlag [nuh_layer_id] ) | |
| update_rep_format_flag | u(1) |
| ... | |
| if( scaling_list_enabled_flag ) { | |
| if(! IndependentLayerFlag [nuh_layer_id] ) | |
| sps_infer_scaling_list_flag | u(1) |
| ... | |
| } | |

(b)

| pic_parameter_set_rbsp( ) { | Descriptor |
|---|---|
| ... | |
| if(! IndependentLayerFlag [nuh_layer_id] ) | |
| pps_infer_scaling_list_flag | u(1) |
| ... | |
| } | |

(c)

| slice_segment_header( ) { | Descriptor |
|---|---|
| ... | |
| if( !dependent_slice_segment_flag ) { | |
| ... | |
| if(! IndependentLayerFlag [nuh_layer_id] || ( nal_unit_type != IDR_W_RADL && nal_unit_type != IDR_N_LP ) ) { | |
| slice_pic_order_cnt_lsb | u(v) |

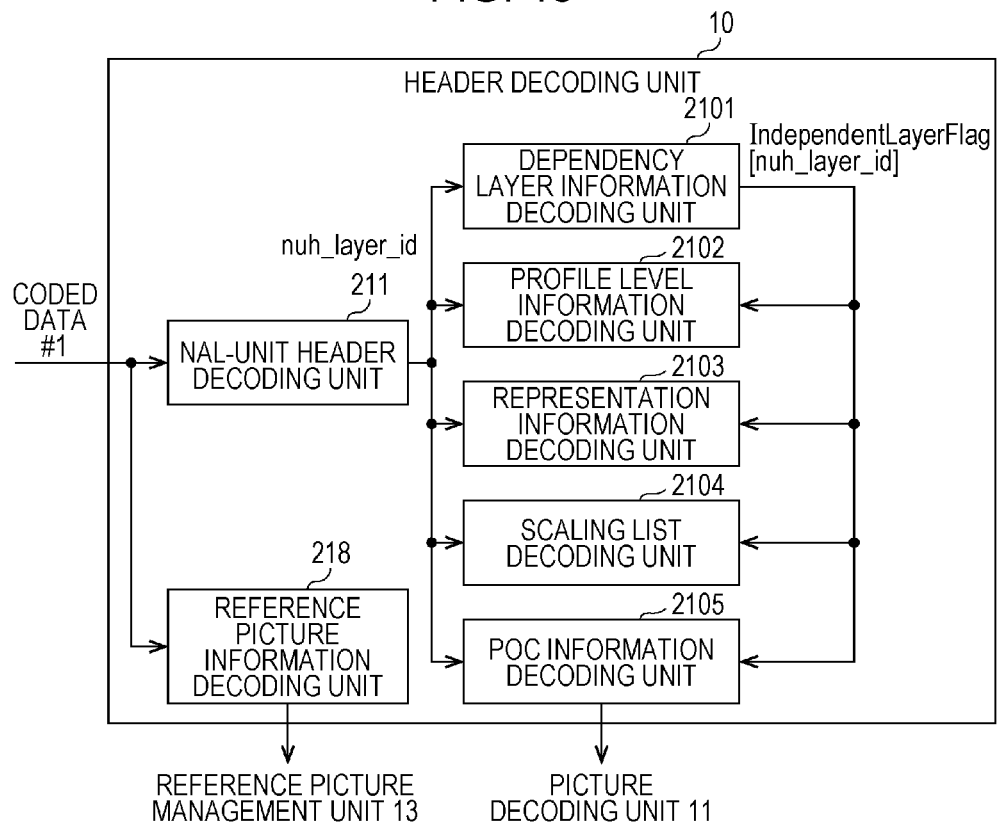
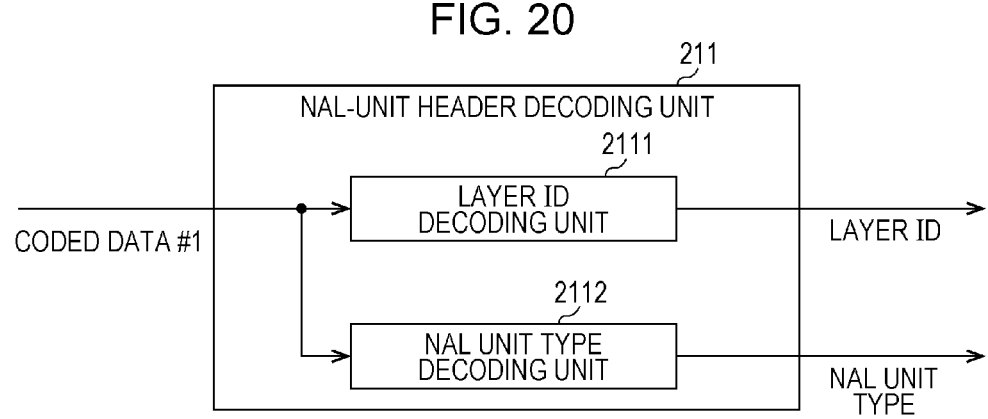

| | |
|---|---|
| rep_format_idx_present_flag | u(1) |
| if( rep_format_idx_present_flag ) | |
| vps_num_rep_formats_minus1 | u(4) |
| for( i = 0; i <= vps_num_rep_formats_minus1; i++ ) | |
| rep_format( ) | |
| if( rep_format_idx_present_flag ) | |
| for( i = 1; i <= vps_max_layers_minus1; i++ ) | |
| if( vps_num_rep_formats_minus1 > 0 ) | |
| vps_rep_format_idx[ i ] | u(4) |

(b)

| | |
|---|---|
| if(!IndependentLayerFlag[nuh_layer_id] ) | |
| update_rep_format_flag | u(1) |
| if( update_rep_format_flag ) { | |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| } | |
| ... | |
| if( update_rep_format_flag ) { | |
| bit_depth_luma_minus8 | ue(v) |
| bit_depth_chroma_minus8 | ue(v) |
| } | |

FIG. 34

| seq_parameter_set_rbsp( ) { | Descriptor |
|---|---|
| ... | |
| log2_max_pic_order_cnt_lsb_minus4 | ue(v) |
| ... | |
| restricted_ref_pic_lists_flag | u(1) |
| if( restricted_ref_pic_lists_flag ) | |
| lists_modification_present_flag | u(1) |
| ... | |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) { | |
| lt_ref_pic_poc_lsb_sps[ i ] | u(v) |
| used_by_curr_pic_lt_sps_flag[ i ] | u(1) |
| } | |
| } | |
| ... | |
| } | |

(C) brackets: restricted_ref_pic_lists_flag through lists_modification_present_flag
(A) brackets: num_short_term_ref_pic_sets through short_term_ref_pic_set( i )
(B) brackets: long_term_ref_pics_present_flag through closing }

(A) SPS SHORT-TERM RPS INFORMATION
(B) SPS LONG-TERM RP INFORMATION
(C) SPS LIST MODIFICATION INFORMATION

FIG. 35

| short_term_ref_pic_set( idx ) { | Descriptor |
|---|---|
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |

FIG. 36

| slice_header( ) { | Descriptor |
|---|---|
| ... | |
| if( !dependent_slice_flag ) { | |
| ... | |
| if( !IdrPicFlag ) { | |
|   pic_order_cnt_lsb | u(v) |
|   short_term_ref_pic_set_sps_flag | u(1) |
|   if( !short_term_ref_pic_set_sps_flag ) | |
|     short_term_ref_pic_set( num_short_term_ref_pic_sets ) | |
|   else | |
|     short_term_ref_pic_set_idx | u(v) |
|   if( long_term_ref_pics_present_flag ) { | |
|     if( num_long_term_ref_pics_sps > 0 ) | |
|       num_long_term_sps | ue(v) |
|     num_long_term_pics | ue(v) |
|     for( i = 0; i < num_long_term_sps + num_long_term_pics; i++ ) { | |
|       if( i < num_long_term_sps ) | |
|         lt_idx_sps[ i ] | u(v) |
|       else { | |
|         poc_lsb_lt[ i ] | u(v) |
|         used_by_curr_pic_lt_flag[ i ] | u(1) |
|       } | |
|       delta_poc_msb_present_flag[ i ] | u(1) |
|       if( delta_poc_msb_present_flag[ i ] ) | |
|         delta_poc_msb_cycle_lt[ i ] | ue(v) |
|     } | |
|   } | |
| } | |
| ... | |
| } | |

(A) SH SHORT-TERM RPS INFORMATION
(B) SH LONG-TERM RP INFORMATION

FIG. 37

| slice_header( ) { | Descriptor |
|---|---|
| ... | |
| if( !dependent_slice_flag ) { | |
| ... | |
| if( slice_type == P \|\| slice_type == B ) { | |
| ... | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| if( lists_modification_present_flag ) | |
| ref_pic_list_modification( ) | |
| } | |
| } | |
| ... | |
| } | |

Rows from num_ref_idx_active_override_flag through ref_pic_list_modification( ) are bracketed as (C).

(C) SH LIST MODIFICATION INFORMATION

FIG. 38

| ref_pic_list_modification( ) { | Descriptor |
|---|---|
| ref_pic_list_modification_flag_l0 | u(1) |
| if( ref_pic_list_modification_flag_l0 <br> && NumPocTotalCurr > 2 ) | |
| for( i = 0; i <= num_ref_idx_l0_active_minus1; i++ ) | |
| list_entry_l0[ i ] | u(v) |
| if( slice_type == B ) { | |
| ref_pic_list_modification_flag_l1 | u(1) |
| if( ref_pic_list_modification_flag_l1 <br> && NumPocTotalCurr > 2 ) | |
| for( i = 0; i <= num_ref_idx_l1_active_minus1; i++ ) | |
| list_entry_l1[ i ] | u(v) |
| } | |
| } | |

FIG. 39

| ref_pic_list_modification( ) { | Descriptor |
|---|---|
| if (NumPocTotalCurr > 1) | |
| { | |
| ref_pic_list_modification_flag_l0 | u(1) |
| if( ref_pic_list_modification_flag_l0 ) | |
| for( i = 0; i <= num_ref_idx_l0_active_minus1; i++ ) | |
| list_entry_l0[ i ] | u(v) |
| if( slice_type == B ) { | |
| ref_pic_list_modification_flag_l1 | u(1) |
| if( ref_pic_list_modification_flag_l1 ) | |
| for( i = 0; i <= num_ref_idx_l1_active_minus1; i++ ) | |
| list_entry_l1[ i ] | u(v) |
| } | |
| } | |
| } | |

| vps_extension( ) { | Descriptor |
|---|---|
| ... | |
| rep_format_idx_present_flag | u(1) |
| if( rep_format_idx_present_flag ) | |
| vps_num_rep_formats_minus1 | u(4) |
| for( i = 0; i <= vps_num_rep_formats_minus1; i++ ) | |
| rep_format( ) | |
| if( rep_format_idx_present_flag ) | |
| for( i = 1; i <= vps_max_layers_minus1; i++ ) | |
| if( vps_num_rep_formats_minus1 > 0 ) | |
| vps_rep_format_idx[ i ] | u(4) |
| vps_syntax_change_by_layer_id_flag | v(1) |
| max_one_active_ref_layer_flag | u(1) |
| ... | |
| } | |

(b)

| seq_parameter_set_rbsp( ) { | Descriptor |
|---|---|
| sps_video_parameter_set_id | u(4) |
| if( !vps_syntax_change_by_layer_id_flag || nuh_layer_id == 0 ) { | |
| sps_max_sub_layers_minus1 | u(3) |
| sps_temporal_id_nesting_flag | u(1) |
| profile_tier_level( 1, sps_max_sub_layers_minus1 ) | |
| } | |
| sps_seq_parameter_set_id | ue(v) |
| if(vps_syntax_change_by_layer_id_flag && nuh_layer_id > 0 ) | |
| update_rep_format_flag | u(1) |
| ... | |
| if( scaling_list_enabled_flag ) { | |
| if(vps_syntax_change_by_layer_id_flag && nuh_layer_id > 0 ) | |
| sps_infer_scaling_list_flag | u(1) |
| ... | |
| } | |

| pic_parameter_set_rbsp( ) { | Descriptor |
|---|---|
| ... | |
| if(vps_syntax_change_by_layer_id_flag && nuh_layer_id > 0 ) | |
|   pps_infer_scaling_list_flag | u(1) |
| ... | |
| } | |

(b)

| slice_segment_header( ) { | Descriptor |
|---|---|
| ... | |
| if( !dependent_slice_segment_flag ) { | |
|   if( (vps_syntax_change_by_layer_id_flag && nuh_layer_id > 0) \|\| <br>   ( nal_unit_type != IDR_W_RADL && nal_unit_type != IDR_N_LP ) ) { | |
|     slice_pic_order_cnt_lsb | u(v) |

| seq_parameter_set_rbsp( ) { | Descriptor |
|---|---|
| sps_video_parameter_set_id | u(4) |
| if( nuh_layer_id >= LAYER_ID_FOR_SYNTAX_CHANGE || nuh_layer_id == 0 ) { | |
| sps_max_sub_layers_minus1 | u(3) |
| sps_temporal_id_nesting_flag | u(1) |
| profile_tier_level( 1, sps_max_sub_layers_minus1 ) | |
| } | |
| sps_seq_parameter_set_id | ue(v) |
| if(nuh_layer_id < LAYER_ID_FOR_SYNTAX_CHANGE && nuh_layer_id > 0 ) | |
| update_rep_format_flag | u(1) |
| ... | |
| if( scaling_list_enabled_flag ) { | |
| if(nuh_layer_id < LAYER_ID_FOR_SYNTAX_CHANGE && nuh_layer_id > 0 ) | |
| sps_infer_scaling_list_flag | u(1) |
| ... | |
| } | |

(b)

| pic_parameter_set_rbsp( ) { | Descriptor |
|---|---|
| ... | |
| if(nuh_layer_id < LAYER_ID_FOR_SYNTAX_CHANGE && nuh_layer_id > 0 ) | |
| pps_infer_scaling_list_flag | u(1) |
| ... | |
| } | |

(c)

| slice_segment_header( ) { | Descriptor |
|---|---|
| ... | |
| if( !dependent_slice_segment_flag ) { | |
| if( (nuh_layer_id < LAYER_ID_FOR_SYNTAX_CHANGE && nuh_layer_id > 0) \|\| ( nal_unit_type != IDR_W_RADL && nal_unit_type != IDR_N_LP ) ) { | |
| slice_pic_order_cnt_lsb | u(v) |

FIG. 44

| seq_parameter_set_rbsp( ) { | Descriptor |
|---|---|
| sps_video_parameter_set_id | u(4) |
| if(nuh_layer_id == 0 ) { | |
| sps_max_sub_layers_minus1 | u(3) |
| sps_temporal_id_nesting_flag | u(1) |
| profile_tier_level( 1, sps_max_sub_layers_minus1 ) | |
| } | |
| sps_seq_parameter_set_id | ue(v) |
| if(nuh_layer_id > 0 ) | |
| update_rep_format_flag | u(1) |
| if( update_rep_format_flag ) { | |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| } | |
| ... | |
| if( update_rep_format_flag ) { | |
| bit_depth_luma_minus8 | ue(v) |
| bit_depth_chroma_minus8 | ue(v) |
| } | |
| ... | |
| if( scaling_list_enabled_flag ) { | |
| if(nuh_layer_id > 0 ) | |
| sps_infer_scaling_list_flag | u(1) |
| if( sps_infer_scaling_list_flag ) | |
| sps_scaling_list_ref_layer_id | u(6) |
| else { | |
| sps_scaling_list_data_present_flag | u(1) |
| if( sps_scaling_list_data_present_flag ) | |
| scaling_list_data( ) | |
| } | |
| } | |
| ... | |
| } | |

| pic_parameter_set_rbsp( ) { | Descriptor |
|---|---|
| ... | |
| if( nuh_layer_id > 0 ) | |
| pps_infer_scaling_list_flag | u(1) |
| if( pps_infer_scaling_list_flag ) | |
| pps_scaling_list_ref_layer_id | u(6) |
| else { | |
| pps_scaling_list_data_present_flag | u(1) |
| if( pps_scaling_list_data_present_flag ) | |
| scaling_list_data( ) | |
| } | |
| ... | |
| } | |

(b)

| slice_segment_header( ) { | Descriptor |
|---|---|
| ... | |
| if( !dependent_slice_segment_flag ) { | |
| ... | |
| if( nuh_layer_id > 0 \|\| <br>　( nal_unit_type != IDR_W_RADL && nal_unit_type != IDR_N_LP ) ) { | |
| slice_pic_order_cnt_lsb | u(v) |

IMAGE DECODING DEVICE, IMAGE CODING DEVICE, AND CODED DATA

TECHNICAL FIELD

The present invention relates to an image decoding device that decodes image data subjected to scalable coding, an image coding device that performs scalable coding on image data, and coded data to which such an image decoding device refers.

BACKGROUND ART

In general, as scalable coding technologies, spatial scalability in which resolutions in layers are different from each other, SNR scalability in which image qualities or bit depths in layers are different from each other, bit depth scalability, view scalability in which plural viewpoint images can be coded, depth scalability in which an image (texture) for viewing and depth information (depth) can be simultaneously coded, 3D scalability (or view scalability plus depth) obtained by combining the view scalability and depth scalability have been known. Regarding scalable coding, images which correspond to a resolution, an image quality, a bit depth, a viewpoint, and a depth are distinguished from each other by using an identifier which is referred to as a layer ID, and are coded.

A scalable technology in which HEVC/H.265 is expanded is known in NPL 1. In NPL 1, a layer of which a layer ID is 0 is referred to as a base layer, and a condition in which coded data of the base layer can be decoded for backward compatibility by a non-scalable decoder (for example, main profile decoder of HEVC/H.265) is applied. This is because the non-scalable decoder can easily perform reproduction in a case where only the base layer is extracted. Thus, even when data is image data subjected to scalable coding, in a layer of which the layer ID is 0, the syntax structure is the same as that of the main profile, and the tool to be used is also the same as that of the main profile. The layer ID is coded as "nah_layer_id" by using the header of a NAL unit.

In the scalable coding, coding is performed by using a dependency relationship between layers, as in a case where an image of a certain viewpoint (certain layer) is predicted from an image of another viewpoint (another layer). Such coding is performed more efficiently than in a case where layers are independently coded. The dependency relationship between layers (data on the presence or the absence of the dependency relationship between layers) is coded based on a video parameter set (VPS). However, in a case where a video having a completely different viewpoint from a certain viewpoint is coded as a subsidiary video, correlation between two images is low, and thus an effect obtained by using the dependency relationship is small. Thus, data which has been coded without using the dependency relationship is decoded more easily. Accordingly, in such a case, a certain layer can be set as a layer (hereinafter, independent layer) which does not depend on other layers, and be coded.

The following methods in which a syntax structure as the data structure of the scalable coding technology for HEVC is changed in accordance with a layer ID are known in NPL 1. (1) A technology in which, by coding profile information and the like using the VPS, the profile information and the like coded by the VPS are omitted in a sequence parameter set (SPS) of an extension layer of which a layer ID has a value other than 0, (2) a technology in which, by coding representation information such as image sizes of a plurality of layers using the VPS, the representation information coded by the VPS are omitted in the SPS of an extension layer of which a layer ID has a value other than 0, (3) a technology in which, by predicting from a scaling list of another layer, coding of the scaling list is omitted in the SPS and a picture parameter set (PPS) of an extension layer of which a layer ID has a value other than 0, and (4) a technology in which, in a case where the layer ID does not have a value of 0, a POC LSB which is not coded in an IDR picture and a BLA picture in which a layer ID has a value of 0 is coded, and a POC which has been also designated in the IDR picture and the BLA picture can be coded, and the like have been known. FIGS. 44 and 45 illustrate a configuration of coded data of an SPS, a PPS and a slice header in case of applying these technologies.

CITATION LIST

Non Patent Literature

NPL 1: "Scalable High Efficiency Video Coding Draft 3", JCTVC-N1008, 14th Meeting: Vienna, AT, 25 Jul.-2 Aug. 2013

SUMMARY OF INVENTION

Technical Problem

However, in NPL 1, even in a case where the layer is an independent layer, when the layer ID has a value other than 0, the syntax structure of an SPS, a PPS and a slice header is changed. Thus, there is a problem in that decoding is not allowed in a case where the independent layer is extracted and the extracted independent layer is decoded by a non-scalable decoder, or rewriting of the SPS, the PPS, and the slice header is required in the case where the independent layer is extracted and the extracted independent layer is decoded by the non-scalable decoder.

Considering the above problem, the main object of the present invention is to allow extraction of an independent layer without rewriting of syntax, and causing the non-scalable decoder to reproduce the extracted independent layer, in an image decoding device which decodes image data subjected to scalable coding.

Solution to Problem

To solve the problem, according to an aspect of the present invention, there is an image decoding device which decodes an image subjected to scalable coding. The image decoding device includes header decoding means for decoding a first flag, and POC information decoding means for decoding slice_pic_order_cnt_lsb as one type of POC information. The POC information decoding means decodes the slice_pic_order_cnt_lsb from a slice header in a case where the first flag indicates a first value and a layer ID is greater than 0, or in a case where a NAL unit type does not indicate an IDR picture, and does not decode the slice_pic_order_cnt_lsb in other cases.

Advantageous Effects of Invention

According to an aspect of the present invention, there is an advantage in that the image decoding device can extract an independent layer without rewriting of syntax, and cause a non-scalable decoder to reproduce the extracted independent layer.

BRIEF DESCRIPTION OF DRAWINGS

FIG. 12 is a diagram illustrating a configuration of coded data of the NAL unit according to the embodiment of the present invention.

FIG. 13 is a diagram illustrating a relationship between a value of a NAL unit type and the type of the NAL unit according to the embodiment of the present invention.

FIG. 14 is a diagram illustrating a configuration of coded data of a VPS according to the embodiment of the present invention.

FIG. 15 is a diagram illustrating a configuration of coded data of VPS extension according to the embodiment of the present invention.

FIG. 16 is a diagram illustrating a configuration of coded data of an SPS, a PPS, and a slice header according to the embodiment of the present invention.

FIG. 19 is a functional block diagram illustrating a schematic configuration of the header decoding unit according to the embodiment of the present invention.

FIG. 20 is a functional block diagram illustrating a schematic configuration of a NAL-unit header decoding unit according to the embodiment of the present invention.

FIG. 28 is a diagram illustrating a configuration of coded data which is decoded by a representation information decoding unit included in the header decoding unit of FIG. 19.

FIG. 32(a) is a diagram in which pictures constituting a video are arranged in an order of being displayed; FIG. 32(b) is a diagram illustrating an example of RPS information which is applied to a target picture; FIG. 32(c) is a diagram illustrating an example of the current RPS derived when the RPS information illustrated in FIG. 32(b) is applied in a case where a POC of the target picture is 0; and FIGS. 32(d) and 32(e) are diagrams illustrating an example of the reference picture list generated from a reference picture which is included in the current RPS.

FIG. 33(a) is a diagram illustrating an L0 reference list before modification; FIG. 33(b) is a diagram illustrating RPL modification information; and FIG. 33(c) is a diagram illustrating the L0 reference list after modification.

FIG. 34 is a diagram illustrating a portion of an SPS syntax table used when the SPS is decoded, in the header decoding unit and the reference picture information decoding unit of the image decoding device.

FIG. 35 is a diagram illustrating a syntax table of a short-term reference picture set used when the SPS is decoded and when the slice header is decoded, in the header decoding unit and the reference picture information decoding unit of the image decoding device.

FIG. 36 is a diagram illustrating a portion of a syntax table of the slice header used when the slice header is decoded, in the header decoding unit and the reference picture information decoding unit of the image decoding device.

FIG. 37 is a diagram illustrating a portion of the syntax table of the slice header used when the slice header is decoded, in the header decoding unit and the reference picture information decoding unit of the image decoding device.

FIG. 38 is a diagram illustrating a syntax table of reference list alignment information used when the slice header is decoded, in the header decoding unit and the reference picture information decoding unit of the image decoding device.

FIG. 39 is a diagram illustrating the syntax table of the reference list alignment information used when the slice header is decoded, in the image decoding device.

FIG. 41 is a diagram illustrating a configuration of coded data of a VPS extension and an SPS according to Modification Example 1 of the embodiment of the present invention.

FIG. 42 is a diagram illustrating a configuration of coded data of a PPS and a slice header according to Modification Example 1 of the embodiment of the present invention.

FIG. 43 is a diagram illustrating a configuration of coded data of an SPS, a PPS, and a slice header according to Modification Example 2 of the embodiment of the present invention.

FIG. 44 is a diagram illustrating a configuration of coded data of an SPS in the related art.

FIG. 45 is a diagram illustrating a configuration of coded data of a PPS and a slice header in the related art.

DESCRIPTION OF EMBODIMENTS

First Embodiment

Hereinafter, an embodiment of the present invention will be described with reference to the drawings.

Figure 1:
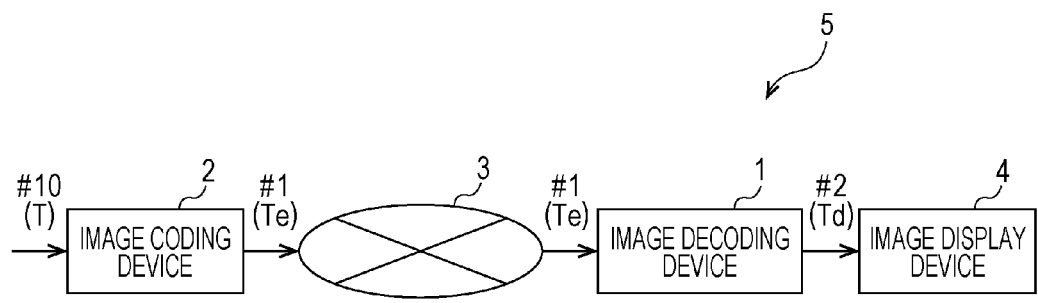
FIG. 1 is a schematic diagram illustrating a configuration of an image transmission system according to an embodiment of the present invention.

FIG. 1 is a schematic diagram illustrating a configuration of an image transmission system 5 according to the embodiment.

The image transmission system 5 is a system in which codes obtained by coding a plurality of layer images are transmitted and images obtained by decoding the transmitted codes are displayed. The image transmission system 5 includes an image coding device 2, a network 3, an image decoding device 1, and an image display device 4.

Signals T (input image #10) indicating a plurality of layer images (also referred to as a texture image) are input to the image coding device 2. The layer image corresponds to an image obtained by visual recognition or capturing at a certain resolution and a certain viewpoint. In a case where view scalable coding in which a three-dimensional image is coded by using a plurality of layer images is performed, each of the plurality of layer images is referred to as a viewpoint image. Here, the viewpoint corresponds to a position or an observation point of a capturing device. For example, a plurality of viewpoint images corresponds to images obtained by capturing of each of right and left capturing devices toward an object. The image coding device 2 codes each of the signals so as to generate coded data #1 (coded data). Details of the coded data #1 will be described later. The viewpoint image corresponds to a two-dimensional image (planar image) obtained by observation at a certain viewpoint. The viewpoint image is indicated, for example, by a luminance value or a color signal value of a pixel disposed in a two-dimension plane. In the following descriptions, one piece of the viewpoint image or a signal indicating this viewpoint image is referred to as a picture. In a case where spatial scalable coding is performed by using a plurality of layer images, the plurality of layer images is formed from a base layer image having low resolution and an extension layer image having high resolution. In a case where SNR scalable coding is performed by using a plurality of layer images, the plurality of layer images is formed from a base layer image having low image quality and an extension layer image having high image quality. An arbitrary combination of the view scalable coding, the spatial scalable coding, and the SNR scalable coding may be performed.

The network 3 causes the coded data #1 generated by the image coding device 2 to be transmitted to the image decoding device 1. The network 3 corresponds to the Internet, a wide area network (WAN), a local area network (LAN), or a combination of the Internet, the WAN and the LAN. The network 3 is not necessarily limited to bi-directional communication network. The network 3 may be a one-directional or bi-directional communication network in which a broadcast wave of terrestrial digital broadcasting, satellite broadcasting, or the like is transmitted. The network 3 may be replaced with a storage medium in which coded data #1 of a digital versatile disc (DVD), a Blue-ray disc (BD), and the like is recorded.

The image decoding device 1 decodes each piece of coded data #1 transmitted over the network 3 and generates a plurality of decoded layer images Td (decoded viewpoint image Td, decoded image #2) which is obtained by decoding pieces of coded data #1.

The image display device 4 displays all or some of the plurality of decoded layer images Td (decoded image #2) which are generated by the image decoding device 1. For example, in view scalable coding, in a case where all decoded layer images Td are displayed, a three-dimensional image (stereoscopic image) or a free viewpoint image is displayed, and in a case where some of the decoded layer images Td are displayed, a two-dimensional image is displayed. The image display device 4 includes, for example, a display device such as a liquid crystal display and an organic electro-luminescence (EL) display. In the spatial scalable coding and the SNR scalable coding, an extension layer image having high image quality is displayed in a case where the image decoding device 1 and the image display device 4 have high processing performance, but in a case where the image decoding device 1 and the image display device 4 have relatively low processing performance, a base layer image which does not need high processing performance and display performance as those for an extension layer, is displayed.

<Structure of Coded Data #1>

Before detailed descriptions for the image coding device 2 and the image decoding device 1 according to the embodiment, a data structure of the coded data #1 which is generated by the image coding device 2 and is decoded by the image decoding device 1 will be described.

(NAL Unit Layer)

Figure 11:
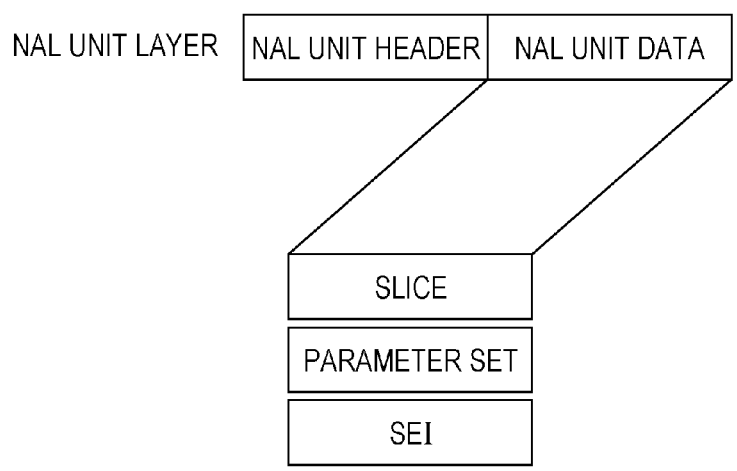
FIG. 11 is a schematic diagram illustrating a configuration of a NAL unit according to the embodiment of the present invention.

FIG. 11 is a diagram illustrating a hierarchy structure of data in the coded data #1. The coded data #1 is coded in a unit referred to as a network abstraction layer (NAL) unit.

A NAL is a layer provided in order to abstract a communication between a video coding layer (VCL) and a backward system. The VCL is a layer in which video coding processing is performed. The backward system transmits and accumulates coded data.

The VCL is provided for each layer which performs image coding processing. In the VCL, coding is performed. The backward system which is referred herein corresponds to a file format of H.264/AVC and HEVC or to a MPEG-2 system. In examples which will be described below, the backward system corresponds to decoding processing in a target layer and a reference layer. In the NAL, a bit stream which is generated in the VCL is divided by a unit referred to as a NAL unit and is transmitted to the backward system set as a destination.

FIG. 12(a) illustrates a syntax table of the network abstraction layer (NAL) unit. The NAL unit includes coded data coded in the VCL and a header (NAL unit header: nal_unit_header( )) for appropriately delivering the coded data to the backward system as a destination. The NAL unit header is represented by syntax illustrated in FIG. 12(b), for example. In the NAL unit header, "nal_unit_type", "nuh_temporal_id_plus1", or "nuh_layer_id" (or nuh_reserved_zero_6bits) is described. "nal_unit_type" represents the type of coded data stored in the NAL unit. "nuh_temporal_id_plus1" represents an identifier (temporal identifier) of a sub-layer to which the stored coded data belongs. "nuh_layer_id" represents an identifier (layer identifier) of a layer to which the stored coded data belongs.

The NAL unit data includes a parameter set, a SEI, a slice, and the like which will be described later.

FIG. 13 is a diagram illustrating a relationship between the value of a NAL unit type and the type of the NAL unit. As illustrated in FIG. 13, a NAL unit which has a NAL unit type of a value from 0 to 15 indicated by SYNA101 is a slice of a non-random access picture (RAP). A NAL unit which has a NAL unit type of a value from 16 to 21 indicated by SYNA102 is a slice of a random access picture (RAP). Roughly divided, a BLA picture, an IDR picture, and a CRA picture are in the RAP picture. The BLA picture is classified into BLA_W_LP, BLA_W_DLP, and BLA_N_LP. The IDR picture is classified into IDR_W_DLP and IDR_N_LP. As a picture other than the RAP picture, a LP picture, a TSA picture, a STSA picture, a TRAIL picture, and the like which will be described later are provided.

(Access Unit)

Each set of NAL unit integrated by using a specific classification rule is referred to as an access unit. In a case where the number of layers is 1, the access unit is a set of NAL units constituting one picture. In a case where the number of layers is greater than 1, the access unit is a set of NAL units constituting pictures of a plurality of layers at the same time (output time). In order to indicate a border of the access unit, the coded data may include a NAL unit referred to as an access unit delimiter. The access unit delimiter is included between a set of NAL units constituting an access unit in coded data, and a set of NAL units constituting another access unit. As a value (AUD_NUT) of the NAL unit type of the access unit delimiter, for example, 35 is used.

(Restriction of POC in Access Unit)

In the related art, as a restriction (conformance condition) for a bit stream, there is a restriction in that a picture order count (POC, PicOrderCntVal) of all pictures included in the same access unit is the same.

In the embodiment, the restriction (conformance condition) for a bit stream is relaxed. Specifically, a restriction in that the picture order count (POC) of pictures of all layers which are not independent and are included in the same access unit is the same is used as the conformance condition. That is, the following CS restriction X1 is used.

(CS Restriction X1)

In a case where a layer A and a layer B have a dependency relationship (in case of direct_dependency_flag [layer ID of layer A][layer ID of layer B]!=0), POCs of pictures of the layer A and the layer B which are included in the same access unit are required to be the same POC as each other.

In the CS restriction X1, conversely, in a case where a certain layer A and a certain layer B does not have a dependency relationship, POCs of the layer A and the layer B which are included in the same access unit may be different from each other. Pictures of layers at the same time (output time) having the same POCs is referred to as "the POCs being aligned between layers". In order to perform POC alignment between layers, processing of a POC reset flag in which the POC is also allowed to be initialized to be 0 in a picture other than the IDR is performed, and processing in which a slice header also includes a POC lower bit in the IDR picture and a POC other than 0 is also allowed to be included in the IDR picture is performed.

As the conformance condition, a CS restriction X2 may be used in addition to the CS restriction X1.

(CS Restriction X2)

In a case where layers of which a layer A and a layer B have a dependency relationship are provided (in case of NumDirectRefLayers[layer ID of layer A]>0 and NumDirectRefLayers[layer ID of layer B]>0), POCs of pictures of the layer A and the layer B which are included in the access unit are required to be the same POC as each other.

The CS restriction X1 and the CS restriction X2 may be variously expressed as long as expressions of the CS restriction X1 have the same meaning as each other and expressions of the CS restriction X2 have the same meaning as each other. For example, each of the CS restrictions X1 and X2 can be expressed as follows.

(CS Restriction X1')

A picture of a reference layer and a picture of a reference target layer which are included in the same access unit are required to have the same POC.

(CS Restriction X2')

Pictures of layers (NumDirectRefLayers[layer ID]>0) which have a dependency relationship are required to have the same POC in the same access unit.

A combination of the CS restrictions X1 and X2 may be expressed as with a CS restriction X3.

(CS Restriction X3)

If a layer may be used as a reference layer or a reference target layer, all pictures belonging to a layer defined in layer dependency information (direct_dependency_type) are required to have the same POC in the same access unit.

The dependency relationship indicated in the CS restriction X1 and the CS restriction X2 corresponds to a dependency relationship indicated by layer dependency information (direct_dependency_type) of a VPS as will be described later. An independent layer is indicated by the number of dependent layers (NumDirectRefLayers[ ]), and an independent layer flag (IndependentLayerFlag[ ]) which will be described later.

Figure 46:
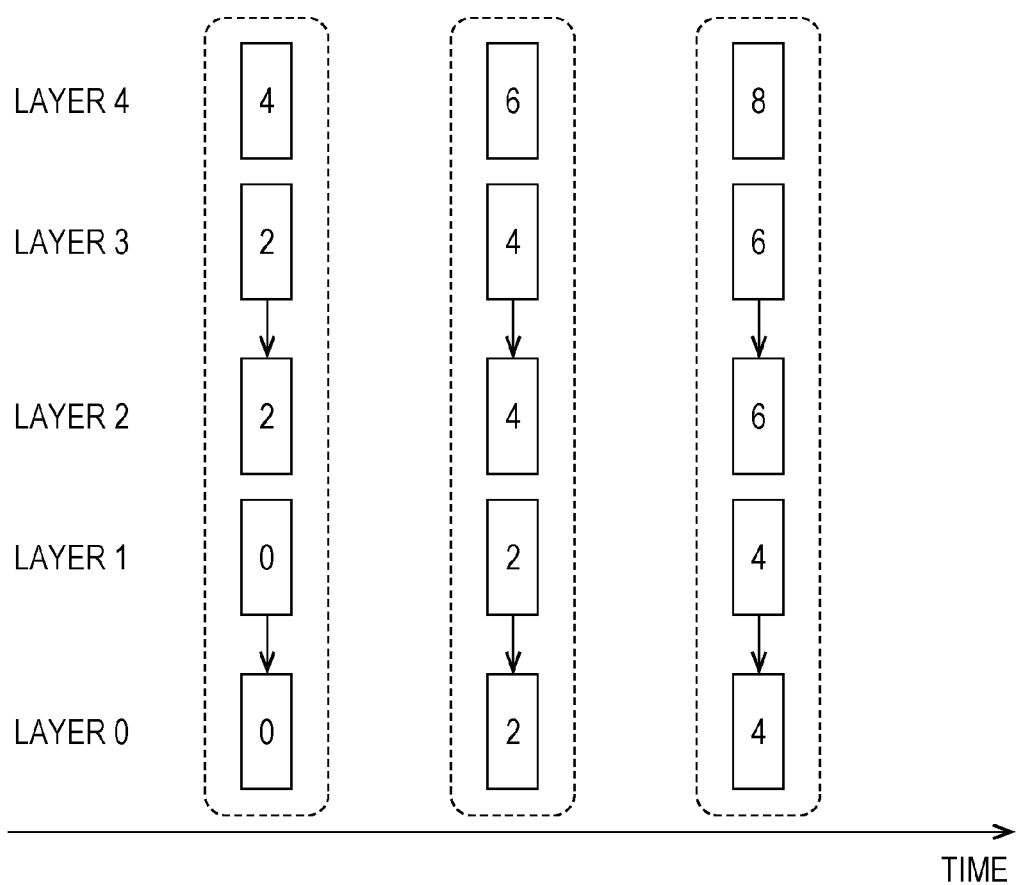
FIG. 46 is a diagram illustrating a CS restriction X1 relating to POC alignment between layers in the embodiment of the present invention.

FIG. 46 is a diagram illustrating the CS restriction X1. In FIG. 46, the access unit is indicated by a dotted line which surrounds a set of pictures, and a number in each of the pictures indicates a POC of the corresponding picture. As illustrated in FIG. 46, regarding a layer 0 and a layer 1 which have a dependency relationship (direct_dependency_flag[1][0]!=0), and a layer 2 and a layer 3 which have a dependency relationship (direct_dependency_flag[3][2]!=0), the pictures included in the same access unit have the same POC. On the contrary, a layer 4 (NumDirectRefLayers[4]==0, IndependentLayerFlag[4]!=0) which is an independent layer can have a POC different from those of the layer 0 to the layer 3.

Figure 47:
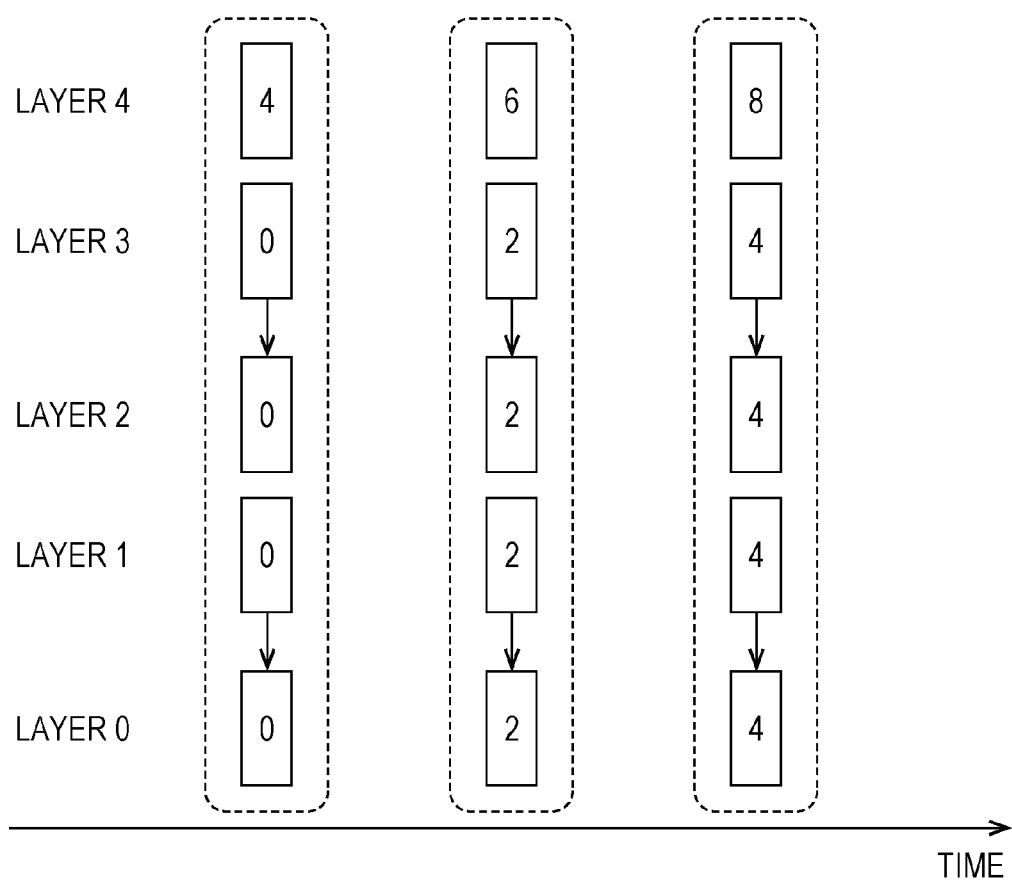
FIG. 47 is a diagram illustrating a CS restriction X2 relating to the POC alignment between layers in the embodiment of the present invention.

FIG. 47 is a diagram illustrating CS restriction X1+CS restriction X2 (CS restriction X3). As illustrated in FIG. 47, regarding a layer 1 and a layer 3 which are not independent layers, pictures included in the same access unit have the same POC. That is, a group of a layer 0 and the layer 1, and a group of a layer 2 and the layer 3 do not have a dependency relationship, and regarding the a group of a layer 0 and the layer 1, and the group of a layer 2 and the layer 3, pictures in the same access unit have the same POC. Because the CS restriction X1 causes pictures which have a dependency relationship to have the same POC, the layer 0 to the layer 3 have the same POC in the same access unit. On the contrary, a layer 4 which is an independent layer can have a POC different from those of the layer 0 to the layer 3.

According to a bit stream restriction of the (CS restriction X1) or the (CS restriction X1+CS restriction X2) described in the embodiment, a restriction relating to a POC is not applied in an independent layer. Thus, in order to hole alignment of POCs between layers, POC information (POC lower bit) in the slice header is not required to be coded. Accordingly, in the independent layer, an effect in that a change of syntax (change from a syntax structure of coded data of a layer ID=0) which causes the POC lower bit to be included is not required is also shown in a picture which has a NAL unit type of an IDR. In this case, the independent layer can be decoded by using a non-scalable decoder. The non-scalable decoder can decode coded data having a structure of syntax in a case where a layer ID is 0.

In a case where a target layer is not the independent layer, as will be described in (S205) and (S206) of FIG. 15, determination by using a POC, in which a reference picture having a POC which is equal to a POC of a target picture is selected, is required in processing in which a picture to which a target picture refers is specified from a picture group in a DPB (decoded picture buffer 12). Thus, in a case where the target layer is not the independent layer (at least between the target layer and the reference layer), POC alignment between the layers is required. In case of satisfying the above-described CS restriction X1, because pictures in the layers of the target picture and the reference layer hold POC alignment between the layers, picture specifying processing between the layers is operated without a problem. In case of satisfying the CS restriction X1 and the CS restriction X2, because all pictures other than in the independent layer have the same POC in the same access unit, an effect in that pictures at the same time are easily specified is shown.

(POC Restriction of Access Unit and Access Unit Delimiter)

In a case where the conformance condition relating to a POC in the access unit is relaxed, that is, in a case where a case where POCs are not equal to each other is allowed in the same access unit, a problem does not occur in image decoding from coded data. However, in case of displaying a decoded image, using of POCs for specifying pictures at the same display time (output time) in layers may be impossible, and synchronized reproduction may be difficult. In practice, in a case where coded data is further stored in a container such as MPEG2TS or MP4, there is no problem in addition of time information to the container in a unit of each picture. However, in case of not being stored in the container, synchronization of display using POCs being not performed may cause a problem to occur. Accordingly, in such a case, it is appropriate that a conformance condition relating to the following access unit is provided.

(CS Restriction AUD1)

All pictures belonging to the same access unit have the same POC. In addition, such pictures have an access unit delimiter as a border of an access unit.

A CS restriction AUD1 can use an expression which is different, but has the same meaning. For example, the following CS restriction AUD2 may be provided.

(CS Restriction AUD2)

All pictures belonging to the same access unit have the same POC. In addition, in a case where all of the picture belonging to the same access unit may not have the same POC, an access unit delimiter is provided ahead of the corresponding access unit.

In a CS restriction AUD2, just ahead of a NAL unit (EOS_NUT) which indicates an end of stream for indicating cutoff and a termination of coded data (coded video stream, CVS), or a NAL unit (EOB_NUT) which indicates an end of bit stream, no access unit delimiter may be provided after a case where all pictures belonging to the same access unit do not have the same POC.

In order to clarify a border of the access unit, the following CS restriction AUD3 may be provided.

(CS Restriction AUD3)

All pictures belonging to the same access unit have the same POC. In addition, in a case where there is a probability that all of the pictures belonging to the same access unit do not have the same POC, an access unit delimiter is provided before and after this access unit.

Because the above problem is especially discussed in a byte stream format (format which includes a start code prefix described in AnnexB of HEVC, and additional padding) which is a format assuming to also be used without being stored in the container, a conformance condition relating to an access unit may be added only in the byte stream format.

Figure 48:
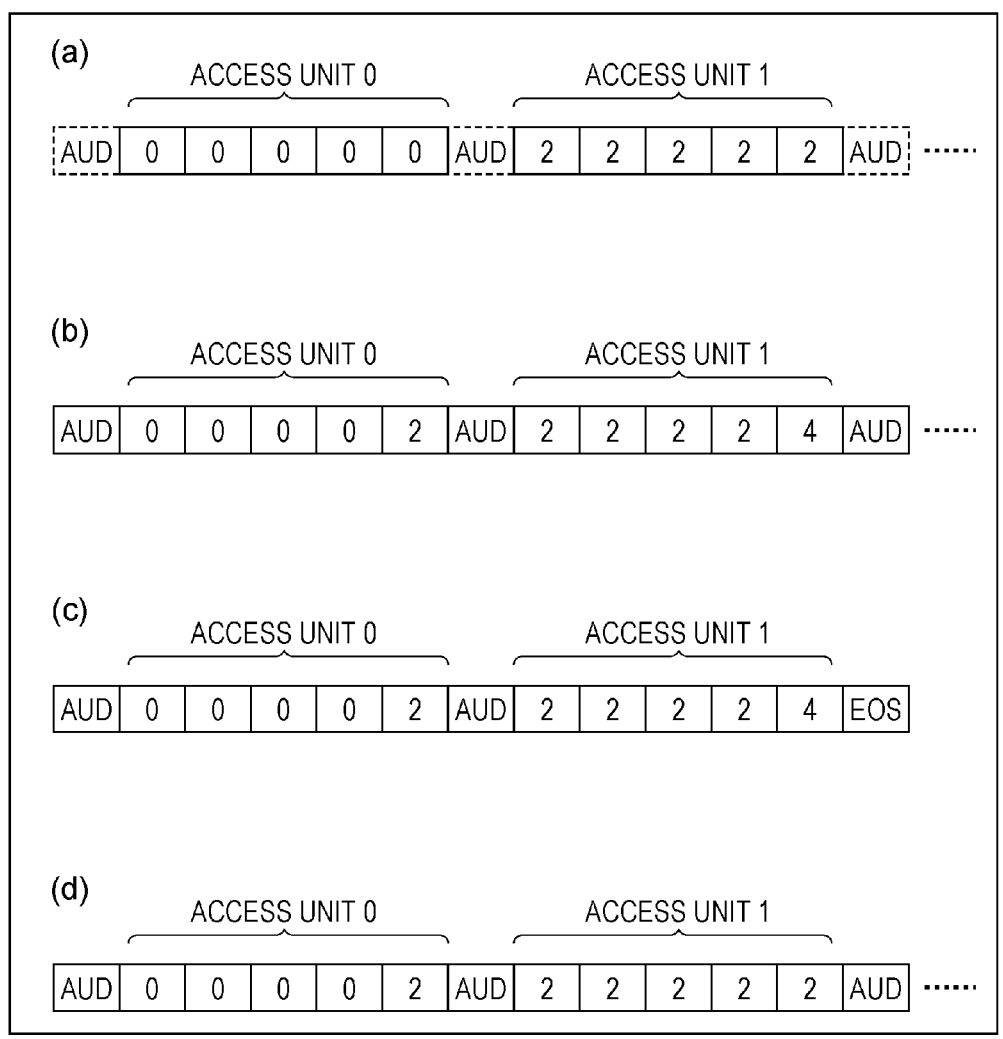
FIG. 48 is a diagram illustrating a restriction of an access unit in the embodiment of the present invention.

FIG. 48 is a diagram illustrating the conformance condition relating to the access unit in the embodiment. FIG. 48(*a*) illustrates a case where all pictures belonging to the same access unit have the same POC, and in FIG. 48(*a*), as an access unit delimiter (AUD) is indicated by a broken line, the AUD is not required. FIG. 48(*b*) illustrates a case where pictures belonging to the same access unit have different POCs, and in FIG. 48(*b*), an access unit delimiter (AUD) is required. FIG. 48(*c*) illustrates a case where pictures belonging to the same access unit have different POCs and a case where coded data is cut by an EOS, and in FIG. 48(*c*), an AUD is required before a case where pictures belonging to the same access unit have different POCs, but the access unit delimiter (AUD) is not required before the EOS, in the (CS restriction AUD2).

In an access unit belonging to certain coded data (CVS) which is configured from the continuative access units, in a case where there is a probability of being pictures in which any one picture which has a different POC in the same access is included, it is preferable that an AUD (normally, AUD right before an access unit) attached to each of all access units is provided. That is, as illustrated in FIG. 48(*d*), in a case where a plurality of access units (here, access unit 0 and access unit 1) is provided in a CVS, an AUD is also added to an access unit in which POC alignment between layers is held in a case where the POC alignment between layers is held in a certain access unit (access unit 1), and the POC alignment between layers is not held in a certain access unit (access unit 0). This condition is used as a conformance condition in the following CS restriction AUD4.

(CS Restriction AUD4)

In a certain CVS, all pictures belonging to the same access unit have the same POC. In a case where a case where all pictures belonging to the same access unit do not have the same POC in a certain CVS may be present, an access unit delimiter is provided before an access unit in this CVS.

Here, the CVS is a unit of coded data and includes a plurality of access units. The CVS is configured from a NAL unit which starts from an IRAP picture. The IRAP picture is a picture which has a NAL unit type belonging to any type of the IDR, the CRA, and the BLA.

(Video Parameter Set)

FIG. 14 is a diagram illustrating a configuration of coded data of a video parameter set (VPS) according to the embodiment of the present invention. The meanings of some syntax components are as follows. The VPS is a parameter set for defining a parameter common with a plurality of layers. In the parameter set, a picture is referred by using an ID (video_parameter_set_id) from coded data which is compressed data.

video_parameter_set_id (SYNA401 in FIG. 14) is an identifier for specifying each VPS.

vps_temporal_id_nesting flag (SYNA402 in FIG. 14) is a flag indicating whether or not addition relating to inter-prediction is restricted in a picture which refers to the VPS.

vps_max_num_sub_layers_minus1 (SYNA403 in FIG. 14) is syntax which relates to hierarchical coded data which includes at least a base layer and is used for calculating an upper limit value (MaxNumLayers) of the number of layers relating to other scalabilities except for time scalability. The upper limit value (MaxNumLayers) of the number of layers is represented by an expression of MaxNumLayers=vps_max_num_sub_layers_minus1+1. In a case where the hierarchical coded data is configured only by the base layer, an expression of vps_max_num_sub_layers_minus1=0 is satisfied.

vps_extension_flag (SYNA404 in FIG. 14) is a flag indicating whether or not the VPS further includes a VPS extension.

vps_extension_data_flag (SYNA405 in FIG. 14) is the main part of the VPS extension and will be specifically described with reference to FIG. 15.

In a case where "flag indicating whether or not XX is provided" is described in this specification, 1 is set in case of being XX and 0 is set in case of not being XX. In logical negation, logical multiply, and the like, 1 is handled as being true and 0 is handled as being false (similar in the following descriptions). In the practical device or the practical method, other values may be used as a true value and a false value.

FIG. 15 is a diagram illustrating a configuration of coded data of a VPS extension according to the embodiment of the present invention. The meanings of some syntax components are as follows.

dimension_id_len_minus1 (SYNA501 in FIG. 15) indicates the number (num_dimensions) of dimensions (IDdimention_id) included for each type of scalability. An expression of num_dimensions=dimension_id_len_minus1[1]+1 is satisfied. For example, the num_dimensions is 2 in a case where the type of scalability is depth, and the number of viewpoints is decoded in case of being a view.

Dimension (IDdimention_id) (SYNA502 in FIG. 15) is information indicating the type of a picture for each type of scalability.

Dependent layer information (direct_dependency_flag[i][j]) (SYNA503 in FIG. 15) is a flag indicating whether or not there is dependency between a target layer i and a reference layer j.

In SYNA504 of FIG. 15, a part indicated by " . . . " is information which is different for each profile or each type of the scalability (details will be described later).

Figure 2:
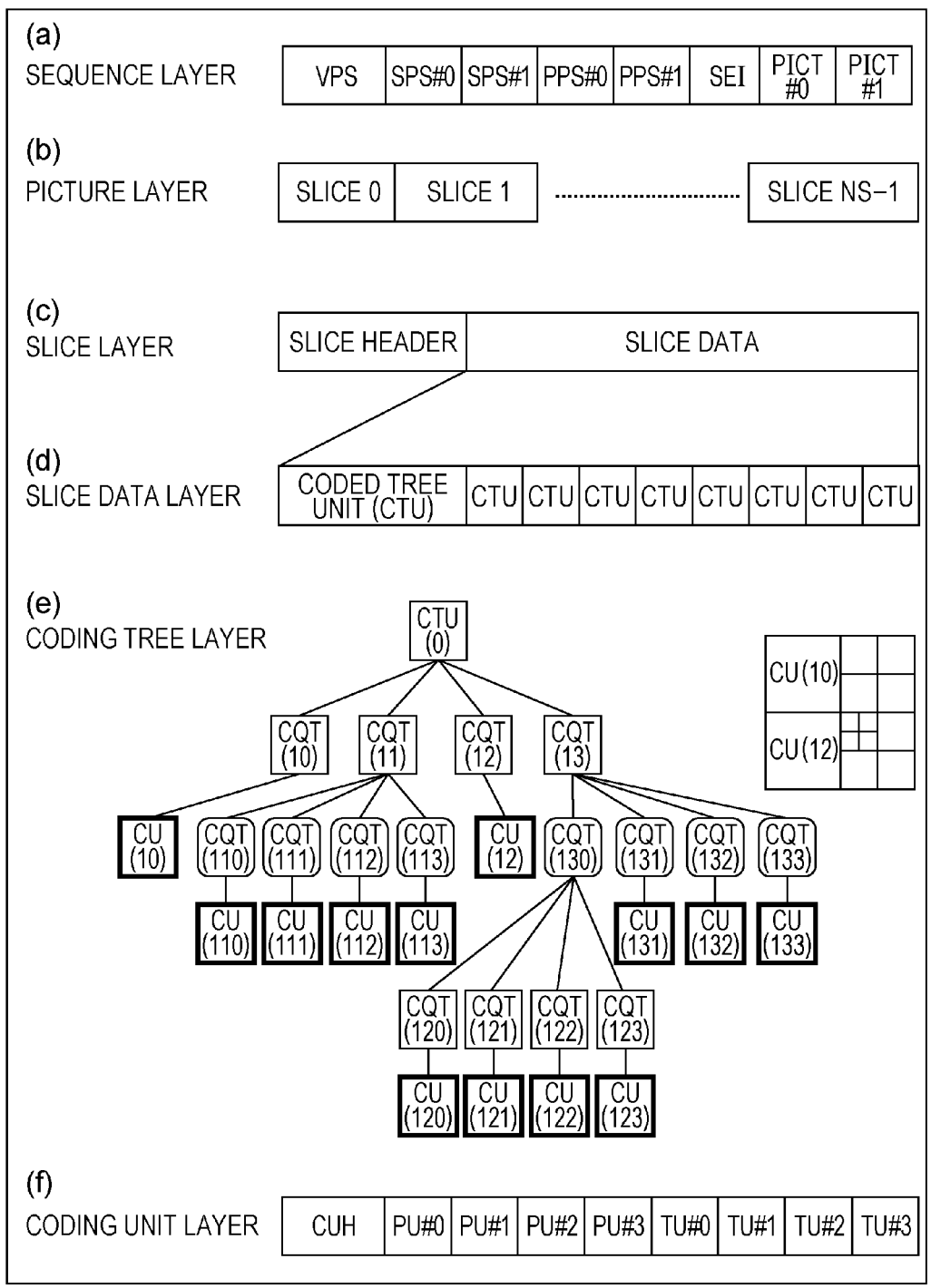
FIG. 2 is a diagram illustrating a hierarchy structure of coded data according to the embodiment.

FIG. 2 is a diagram illustrating a hierarchy structure of data in the coded data #1. For example, the coded data #1 includes a sequence and plurality of pictures which constitute the sequence. FIGS. 2(a) to 2(f) are diagrams which respectively illustrate a sequence layer in which a sequence SEQ is defined, a picture layer in which a picture PICT is defined, a slice layer in which a slice S is defined, a slice data layer in which slice data is defined, a coding tree layer in which a coded tree unit included in the slice data is defined, and a coding unit layer in which a coding unit (CU) included in a coding tree is defined.

(Sequence Layer)

In the sequence layer, a set of pieces of data to which the image decoding device 1 refers in order to decode a sequence SEQ (also referred to as a target sequence below) as a processing target is defined. The sequence SEQ includes a video parameter set, a sequence parameter set SPS, a picture parameter set PPS, a picture PICT, and supplemental enhancement information SEI, as illustrated in FIG. 2(a). Here, a value indicated in the rear of # indicates a layer ID. FIG. 2 illustrates an example in which #0 and #1, that is, coded data having a layer ID of 0 and coded data having a layer ID of 1 are provided. However, the type of a layer and the number of layers are not limited thereto.

In the video parameter set VPS, regarding video configured from a plurality of layers, a set of coding parameters common with a plurality of videos is defined, and a set of coding parameters associated with a plurality of layers included in the video, and each of the layers is defined.

In the sequence parameter set SPS, a set of coding parameters to which the image decoding device 1 refers in order to decode a target sequence is defined. For example, the width or the height of a picture is defined. In the picture parameter set PPS, a set of coding parameters to which the image decoding device 1 refers in order to decode each picture in a target sequence is defined. For example, the picture parameter set PPS includes a base value (pic_init_qp_minus26) of a quantization width, which is used in decoding of a picture, a flag (weighted_pred_flag) indicating application of a weighted prediction, and a scaling list (quantization matrix). A plurality of PPSs may be provided. In this case, any of the plurality of PPSs is selected based on each picture in a target sequence.

(Picture Layer)

In the picture layer, a set of pieces of data to which the image decoding device 1 refers in order to decode a picture PICT (also referred to as a target picture below) as a processing target is defined. The picture PICT includes slices S0 to SNS-1 (NS is the total number of slices included in the picture PICT), as illustrated in FIG. 2(b).

In a case where distinguishing of the slices S0 to SNS-1 from each other is not required, the following descriptions may be made in a state where the letter attached to the sign is omitted. This is similarly applied to other pieces of data which are data included in the coded data #1 (which will be described below) and have an attached letter.

(Slice Layer)

In the slice layer, a set of pieces of data to which the image decoding device 1 refers in order to decode a slice S (also referred to as a target slice below) as a processing target is defined. The slice S includes a slice header SH (slice segment header SH) and slice data SDATA, as illustrated in FIG. 2(c).

The slice header SH includes a coding parameter group to which the image decoding device 1 refers in order to determine a decoding method for the target slice. Slice type designation information (slice_type) for designating a slice type is an example of the coding parameter included in the slice header SH.

Examples of the slice type which is allowed to be designated by the slice type designation information include (1) an I slice using only an intra-prediction when coding is performed; (2) a P slice using an uni-directional prediction or an intra-prediction when coding is performed; (3) a B slice using an uni-directional prediction, a bi-directional prediction, or an intra-prediction when coding is performed.

The slice header SH may include a reference (pic_parameter_set_id) to the picture parameter set PPS, which is included in the sequence layer.

(Slice Data Layer)

In the slice data layer, a set of pieces of data to which the image decoding device 1 refers in order to decode the slice data SDATA as a processing target is defined. The slice data SDATA includes a coded tree block (CTB) (coded tree unit CTU), as illustrated in FIG. 2(d). The CTB is a block of a fixed size (for example, 64×64) forms a slice. The CTB is referred to as a largest cording unit (LCU).

(Coding Tree Layer)

As illustrated in FIG. 2(e), in the coding tree layer, a set of pieces of data to which the image decoding device 1 refers in order to decode the coded tree block as a processing target is defined. The coded tree unit is divided through a recursive quad tree division. A portion at a node in a tree structure obtained by the recursive quad tree division is referred to as a coding tree. An intermediate node among quad trees is a coded quad tree (CQT). The CTU is defined as a unit including the top CQT. The CQT includes a split flag (split_flag). In a case where the split_flag is 1, division into 4 CQTs is performed (4 CQTs are included). In a case where the split_flag is 0, the CQT includes a coding unit (CU). The coding unit CU is set as a basic unit for coding processing.

(Coding Unit Layer)

In the coding unit layer, a set of pieces of data to which the image decoding device 1 refers in order to decode the coding unit as a processing target is defined, as illustrated in FIG. 2(f). Specifically, the coding unit is configured from a CU header CUH, a prediction tree, a transform tree, and a CU header CUF. In the CU header CUH, whether or not the coding unit is a unit using an intra-prediction or a unit using an inter-prediction. The coding unit is used as a route of the prediction tree (PT) and the transform tree (TT). The CU header CUF is included between the prediction tree and the transform tree or included in the rear of the transform tree.

In the prediction tree, a position and the size of each of prediction blocks obtained by dividing the coding unit into one or a plurality of prediction blocks is defined. As another expression, the prediction blocks correspond to one or a plurality of areas which constitute the coding unit and do not overlap each other. The prediction tree includes one or the plurality of prediction blocks which are obtained by the above-described division.

Prediction processing is performed for each of the prediction blocks. Each of the prediction blocks, which corresponds to a unit of a prediction is also referred to as a prediction unit (PU) below.

As the type of the division in the prediction tree, roughly speaking, two cases which are a case of an intra-prediction and a case of an inter-prediction are provided. The intra-prediction corresponds to a prediction in the same picture and the inter-prediction corresponds to prediction processing performed between pictures which are different from each other (for example, between pictures at different display points of time, between layer images).

In case of the intra-prediction, as a division method, 2N×2N (size the same as the coding unit) and N×N are provided.

In case of the inter-prediction, as a division method, 2N×2N (size the same as the coding unit), 2N×N, 2N×nU, 2N×nD, N×2N, nL×2N, nR×2N, N×N, and the like are provided. In these methods, coding is performed by part_mode of coded data. 2N×nU indicates that a coding unit of 2N×2N is divided into two areas of 2N×0.5N and 2N×1.5N in an order from the top. 2N×nD indicates that a coding unit of 2N×2N is divided into two areas of 2N×1.5N and 2N×0.5N in an order from the top. nL×2N indicates that a coding unit of 2N×2N is divided into two areas of 0.5N×2N and 1.5N×2N in an order from the left. nR×2N indicates that a coding unit of 2N×2N is divided into two areas of 1.5N×2N and 0.5N×1.5N in an order from the left. The number of divisions may be any of 1, 2, and 4, and thus a PU included in a CU is one to four. PUs are respectively expressed as a PU0, a PU1, a PU2, and a PU3 in order.

In the transform tree, a position and the size of each of transform blocks obtained by dividing the coding unit into one or a plurality of transform blocks is defined. As another expression, the transform blocks correspond to one or a plurality of areas which constitute the coding unit and do not overlap each other. The transform tree includes one or the plurality of transform blocks which are obtained by the above-described division.

As division in the transform tree, division in which areas having the same size as the coding unit are allocated as the transform block and division which is performed by recursive 4-tree division similarly to the division of the above-described tree block are provided.

Transform processing is performed for each of the prediction blocks. Each of the transform blocks, which corresponds to a unit of a transform is also referred to as a transform unit (TU) below.

(Prediction Parameter)

A prediction image of a prediction unit is inferred by using a prediction parameter attached to the prediction unit. As the prediction parameter, a prediction parameter for the intra-prediction and a prediction parameter for the inter-prediction are provided. The prediction parameter for the inter-prediction (inter-prediction parameter) will be described below. The inter-prediction parameter is configured from prediction list use flags (predFlagL0 and predFlagL1), reference picture indices (refIdxL0 and refIdxL1), and vectors (mvL0 and mvL1). The prediction list use flags (predFlagL0 and predFlagL1) are flags indicating whether or not reference picture lists which are respectively referred to as a L0 reference list and a L1 reference list is used. The reference picture list corresponding to a case where the values of the prediction list use flags are 1 is used. A case where two reference picture lists are used, that is, a case of predFlagL0=1 and predFlagL1=1 corresponds to bi-directional prediction. A case where one reference picture list is used, that is, a case of (predFlagL0, predFlagL1)=(1,0) or (predFlagL0, predFlagL1)=(0,1) corresponds to a uni-directional prediction. In formation of the prediction list use flag may be expressed by an inter-prediction flag (inter_pred_idx) which will be described later. Normally, the prediction list use flag is used in a prediction image generation unit and a prediction parameter memory which will be described later, and the inter-prediction flag (inter_pred_idx) is used in a case where information indicating which reference picture list is decoded.

As syntax elements for inferring the inter-prediction parameter included in coded data, for example, a division mode (part_mode), a mergence flag (merge_flag), a mergence index (merge_idx), an inter-prediction flag (inter_pred_idx), a reference picture index (refIdxLX), a predictive vector index (mvp_LX_idx), and a differential vector (mvdLX) are provided.

(Example of Reference Picture List)

Figure 3:
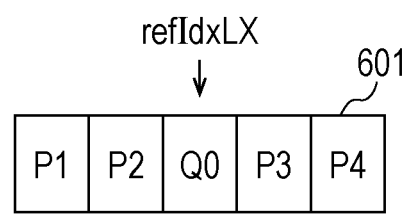
FIG. 3 is a conceptual diagram illustrating an example of a reference picture list.

Next, an example of the reference picture list will be described. The reference picture list is a row formed from reference pictures stored in the decoded picture buffer 12. FIG. 3 is a conceptual diagram illustrating an example of the reference picture list. In a reference picture list 601, each of five rectangles which are horizontally arranged in a row indicates a reference picture. Signs of P1, P2, Q0, P3, and P4 which are indicated in a rightward order from the left end correspond to signs which respectively indicate the reference picture. P such as the P1 indicates a viewpoint P and Q such as the Q0 indicates a viewpoint Q different from the viewpoint P. A suffix of P and Q indicates a picture order count (POC). A downward arrow just under of refIdxLX indicates that the reference picture index (refIdxLX) is an index referring to the reference picture Q0 in the decoded picture buffer 12.

(Example of Reference Picture)

Figure 4:
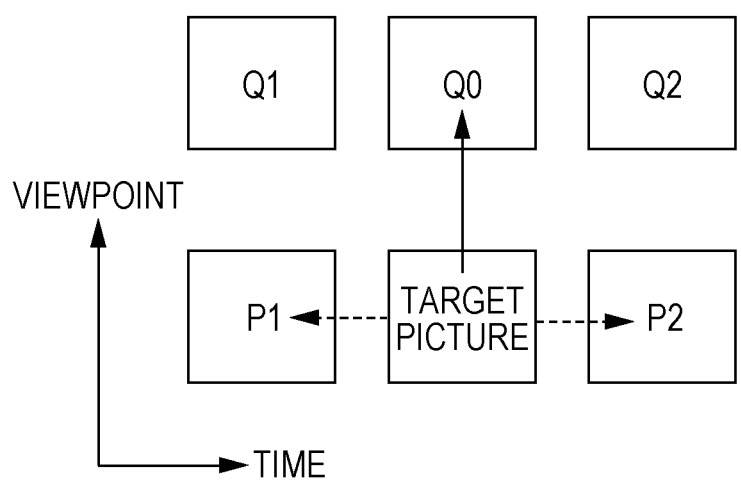
FIG. 4 is a conceptual diagram illustrating an example of a reference picture.

Next, an example of a reference picture used when a vector is inferred will be described. FIG. 4 is a conceptual diagram illustrating an example of the reference picture. In FIG. 4, a horizontal axis indicates display time and a vertical axis indicates a viewpoint. Rectangles of two rows and three lines (total six pieces) which are illustrated in FIG. 4 respectively indicate pictures. A rectangle at second line from the left of the lower row among six rectangles indicates a picture (target picture) of a decoding target and the five remaining rectangles respectively indicate reference pictures. A reference picture Q0 which is indicated by an upward arrow from the target picture is a picture which has the same display time as the target picture and a viewpoint different from the target picture. The reference picture Q0 is used in a disparity prediction in which the target picture is used as a base. A reference picture P1 which is indicated by a leftward arrow from the target picture is the previous picture which has the same viewpoint as the target picture. A reference picture P2 which is indicated by a rightward arrow from the target picture is the future picture which has the same viewpoint as the target picture. The reference picture P1 or P2 is used in a motion prediction in which the target picture is used as a base.

(Random Access Picture)

Figure 17:
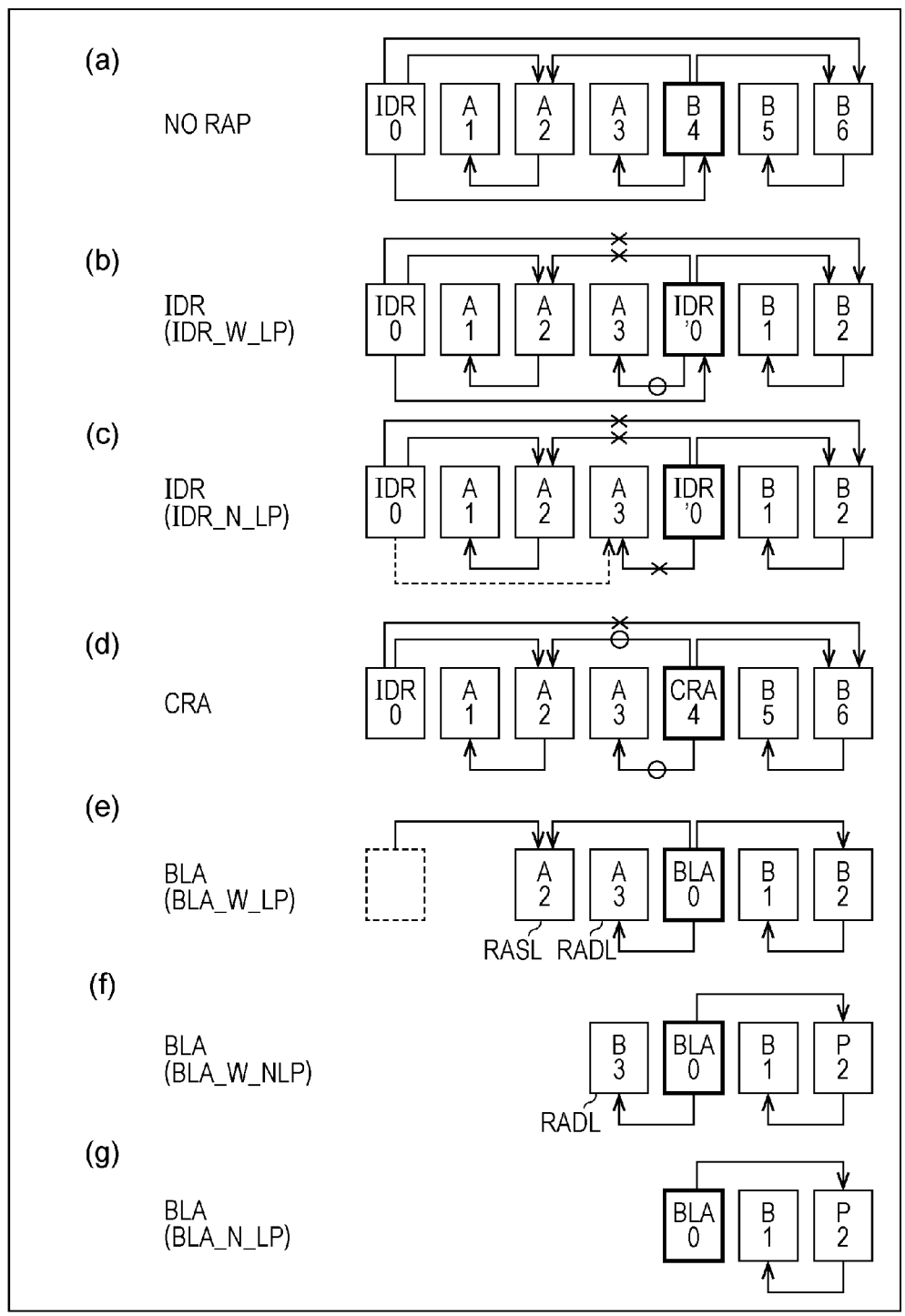
FIG. 17 is a diagram illustrating a configuration of a random access picture according to the embodiment of the present invention.

A configuration of a random access picture (RAP) which is handled in this example will be described. FIG. 17 is a diagram illustrating a configuration of the random access picture. The RAP has three types of an instantaneous decoding refresh (IDR), a clean random access (CRA), and a broken link access (BLA). The recognition of whether or not a certain NAL unit corresponds to a NAL unit including a slice of the RAP picture is performed by using the NAL unit type. NAL unit types of IDR_W_LP, IDR_N_LP, CRA, BLA_W_LP, BLA_W_DLP, and BLA_N_LP respectively correspond to a IDR_W_LP picture, an IDR_N_LP picture, a CRA picture, a BLA_W_LP picture, a BLA_W_DLP picture, and a BLA_N_LP picture which will be described later. That is, a NAL unit including a slice of the above picture has the above-described NAL unit type.

FIG. 17(*a*) illustrates a case where a RAP picture is not a picture other than the leading picture. An alphabetical character in a box indicates the name of a picture and the number indicates a POC (similar in the following descriptions). Pictures are arranged in a display order from the left to the right in FIG. 17(*a*). Pictures of IDR0, A1, A2, B4, B5, and B6 are decoded in an order of IDR0, B4, A1, A2, B6, and B5. FIG. 17(*b*) to FIG. 17(*g*) illustrate a case where the picture indicated by B4 in FIG. 17(*a*) is changed to be a RAP picture.

FIG. 17(*b*) illustrates an example in which an IDR picture (especially, IDR_W_LP picture) is inserted. In this example, the pictures are decoded in an order of IDR0, IDR'0, A1, A2, B2, and B1. In order to distinguish two IDR picture from each other, a picture having the preceding time (preceding decoding order) is referred to as IDR0 and a picture having the late time is referred to as a IDR'0 picture. All RAP pictures including the IDR picture in this example is prohibited from referring to other pictures. Referring to other pictures is performed by limiting a slice of the RAP picture to an intra I_SLICE, as will be described later (this limitation is relaxed with regard to a layer having a layer ID of a value other than 0). Thus, the RAP picture itself can be independently decoded without decoding of other pictures. At a point of time when the IDR picture is decoded, a reference picture set (RPS) which will be described later is initialized. Thus, a prediction using a picture decoded prior to the IDR picture, for example, a prediction from B2 to IDR0 is prohibited. The picture A3 has display time POC prior to display time POC of the RAP (herein, IDR'0). However, the picture A3 is decoded after the RAP picture. A picture which is decoded after the RAP picture, but is reproduced prior to the RAP picture in this manner is referred to as a leading picture (LP picture). A picture other than the RAP picture and the LP picture is generally referred to as a TRAIL picture which is a picture which is decoded after the RAP picture and is reproduced prior to the RAP picture. IDR_W_LP is an abbreviation of an instantaneous decoding refresh with leading picture, and may include the LP picture such as the picture A3. In the example of FIG. 17(*a*), the picture A2 refers to pictures of IDR0 and POC4. However, in case of the IDR picture, since the RPS is initialized when the IDR'0 picture is decoded, referring to IDR'0 from A2 is prohibited. When the IDR picture is decoded, the POC is initialized.

Summarizing the above descriptions, the IDR picture is a picture which has the following restrictions.

The POC is initialized when the picture is decoded

The RPS is initialized when the picture is decoded

Prohibition of referring to other pictures

Prohibition of referring to pictures prior to the IDR picture in a decoding order from pictures after the IDR in the decoding order Prohibition of a RASL picture (which will be described later)

A RADL picture (which will be described later) may be taken (in case of an IDR_W_LP picture)

A RADL picture (which will be described later) may be taken (in case of a BLA_W_LP and a BLA_W_DLP picture)

FIG. 17(*c*) illustrates an example in which an IDR picture (especially, an IDR_N_LP picture) is inserted. IDR_N_LP is an abbreviation of an instantaneous decoding refresh no leading picture and the presence of a LP picture is prohibited. Thus, the presence of the A3 picture in FIG. 17(*b*) is prohibited. The A3 picture is required to be decoded prior to the IDR'0 picture, by referring to the IDR0 picture instead of the IDR'0 picture.

FIG. 17(d) illustrates an example in which a CRA picture is inserted. In this example, pictures are decoded in an order of IDR0, CRA4, A1, A2, B6, and B5. The CRA picture is different from the IDR picture in that the RPS is not initialized. Thus, referring to a picture prior to the RAP (herein, CRA) in the decoding order from pictures after the RAP (herein CRA) in the decoding order is not required to be prohibited (prohibition of referring from A2 to CRA4). However, in a case where decoding is started from the CRA picture which corresponds to the RAP picture, because it is necessary that a picture having a display order later than the CRA can be decoded, referring to a picture prior to the RAP (CRA) in the decoding order is necessarily prohibited from a picture after the RAP (CRA) in the display order (referring from B6 to IDR0 is prohibited). In the CRA, the POC is not initialized.

Summarizing the above descriptions, the CRA picture is a picture which has the following restrictions.

The POC is not initialized when the picture is decoded
The RPS is not initialized when the picture is decoded
Prohibition of referring to other pictures
Prohibition of referring to pictures prior to the CRA picture in the decoding order from pictures after the CRA in the display order
The RADL picture and the RASL picture can be taken FIGS. 17(e) to 17(g) illustrate an example of the BLA picture. The BLA picture is a RAP picture used in a case where a sequence is restructured using the CRA picture as the leading, by, for example, editing coded data which includes the CRA picture. The BLA picture has the following restrictions.

The POC is initialized when the picture is decoded
Prohibition of referring to other pictures
Prohibition of referring to pictures prior to the BLA in the decoding order from pictures after the BLA in the display order
The RASL picture (which will be described later) can be taken (in case of BLA_W_LP)
The RADL picture (which will be described later) can be taken (in case of BLA_W_LP, BLA_W_DLP picture)

For example, descriptions will be made by using a case where decoding of a sequence is started from the position of a CRA4 picture in FIG. 6(d), as an example.

FIG. 17(e) illustrates an example of using the BLA picture (especially, BLA_W_LP picture). BLA_W_LP is an abbreviation of a broken link access with leading picture, and the presence of the LP picture is allowed. In a case where the CRA4 picture is substituted with the BLA_W_LP picture, the A2 picture and the A3 picture which correspond to the LP picture of the BLA picture may be in coded data. However, since the A2 picture is a picture decoded prior to the BLA_W_LP picture, the A2 picture is not in coded data in which the BLA_W_LP picture is edited as the leading picture. In the BLA_W_LP picture, such the LP picture of which decoding is not allowed is handled as a random access skipped leading (RASL) picture, and is not decoded and displayed. The A3 picture is the LP picture of which decoding is allowed, and such a picture is referred to as a random access decodable leading (RADL) picture. The RASL picture and the RADL picture are identified by NAL unit types of RASL_NUT and RADL_NUT.

FIG. 17(f) illustrates an example of using the BLA picture (especially, BLA_W_DLP picture). BLA_W_DLP is an abbreviation of a broken link access with decorable leading picture, and the presence of the LP picture of which decoding is allowed is permitted. Thus, being different from FIG. 17(e), in the BLA_W_DLP picture, the A2 picture which is the LP picture (RASL) of which decoding is not allowed is not permitted to be in in coded data. The A3 picture which is the LP picture (RADL) of which decoding is allowed is permitted to be in the coded data.

FIG. 17(g) illustrates an example of using the BLA picture (especially, BLA_N_LP picture). BLA_N_LP is an abbreviation of a broken link access no leading picture, and the presence of the LP picture is not allowed. Thus, being different from FIG. 17(e) and FIG. 17(f), in the BLA_N_DLP picture, in addition to the A2 picture (RASL), the A3 picture (RADL) is also not permitted to be in the coded data.

(Inter-Prediction Flag and Prediction List Use Flag)

The inter-prediction flag and the prediction list use flag (predFlagL0 and predFlagL1) have a relationship in which these flags are transformed into each other. Thus, the prediction list use flag may be used as the inter-prediction parameter or the inter-prediction flag may be used. Determination using the prediction list use flag can be also performed by being substituted with the inter-prediction flag. Conversely, determination using the inter-prediction flag can be also performed by being substituted with the prediction list use flag.

Inter-prediction flag=(predFlagL1<<1)+predFlagL0
predFlagL0=inter-prediction flag&1
predFlagL1=inter-prediction flag>>1

Here, a mark of >> indicates a right shift and a mark of << indicates a left shift.

(Mergence Prediction and AMVP Prediction)

As a decoding (coding) method of the prediction parameter, a mergence prediction (merge) mode and an adaptive motion vector prediction (AMVP) mode are provided. The mergence flag (merge_flag) is a flag for distinguishing these modes. In the mergence prediction mode and in the AMVP mode, a prediction parameter of a target PU is inferred by using a prediction parameter of a block which has been already processed. The mergence prediction mode is a mode in which a prediction list use flag (predFlagLX) (inter-prediction flag (inter_pred_idx)), a reference picture index (refIdxLX), and a vector (mvLX) are not included in coded data and a prediction parameter which has been already inferred is used as it is. The AMVP mode is a mode in which the inter-prediction flag (inter_pred_idx), the reference picture index (refIdxLX), and the vector (mvLX) are included in the coded data. The vector (mvLX) is coded as a predictive vector index (mvp_LX_idx) and a differential vector (mvdLX). The predictive vector index (mvp_LX_idx) indicates a predictive vector.

The inter-prediction flag (inter_pred_idc) is data indicating the type of the reference picture and the number of reference pictures. The inter-prediction flag (inter_pred_idc) has any of Pred_L0, Pred_L1, and Pred_Bi, as a value. The Pred_L0 and Pred_L1 indicate that reference pictures stored in reference picture lists which are respectively referred to as the L0 reference list and the L1 reference list are used, and indicate that one reference picture is commonly used (uni-directional prediction). Prediction using the L0 reference list is referred to as a L0 prediction, and prediction using the L1 reference list is referred to as a L1 prediction. The Pred_Bi indicates that two reference pictures are used (bi-directional prediction), and indicates that two of reference pictures stored in the L0 reference list and the L1 reference list are used. The predictive vector index (mvp_LX_idx) is an index indicating a predictive vector. The reference picture index (refIdxLX) is an index indicating a reference picture stored in the reference picture list. LX is a description method used in a case where the L0 prediction and the L1 prediction are not distinguished from each other. The LX is substituted with L0 and L1 and thus a parameter for the L0 reference list and a parameter for the L1 reference list are distinguished from each other. For example, refIdxL0 indicates a reference picture index used in the L0 prediction, refIdxL1 indicates a reference picture index used in the L1 prediction, and refIdx (refIdxLX) is a mark used in a case where refIdxL0 and refIdxL1 are not distinguished from each other.

The mergence index (merge_idx) is an index indicating which prediction parameter is used as a prediction parameter of a decoding target block, among prediction parameter candidates (mergence candidates) inferred from the processed block.

(Motion Vector and Disparity Vector)

The vector (mvLX) includes a motion vector and a disparity vector (parallax vector). The motion vector is a vector indicating a shift in position between a position of a block in a picture of a certain layer at certain display time, and a position of the corresponding block in a picture of the same layer at different display time (for example, adjacent discontinuous time). The disparity vector is a vector indicating a shift in position between a position of a block in a picture of a certain layer at certain display time, and a position of the corresponding block in a picture of a different layer at the same display time. As a picture of a different layer, there is a case of being a picture having a different viewpoint, or a case of being a picture having a different resolution. Particularly, a disparity vector corresponding pictures having different viewpoints from each other is referred to as a parallax vector. In a case where the motion vector and the disparity vector are not distinguished from each other, simply, the vector is referred to as a vector (mvLX). The predictive vector and the differential vector which relate to the vector (mvLX) are respectively referred to as a predictive vector (mvpLX) and a differential vector (mvdLX). Determination of whether the vector (mvLX) and the differential vector (mvdLX) are motion vectors or disparity vectors is performed by using a reference picture index (refIdxLX) attached to the vector.

(Supplementary Information for Structure of Coded Data)

The structure of syntax included in a NAL unit may be changed in accordance with whether or not the layer ID is 0, as long as the NAL unit is a NAL unit of a layer other than an independent layer. With this structure, the structure of syntax included in a NAL unit of an independent layer in a case where the layer ID is 0 is the same as in a case where the layer ID has a value other than 0. Thus, all or almost of pieces of data are not required to be rewritten and an independent layer can be decoded by using a non-scalable decoder. The non-scalable decoder decodes coded data having a structure of syntax in a case where the layer ID is 0, as it is. An effect in that processing of extracting data which is allowed to be decoded by the non-scalable decoder is easily performed is shown. Strictly, processing of rewriting the layer ID of an independent layer to be 0 is required for being allowed to be decoded by the non-scalable decoder. However, because a layer ID subjected to fixed length coding in a NAL unit header of which a position on coded data is specific is easily rewritten, the processing quantity of this processing is a negligible degree in comparison to a case where another syntax is changed.

If a non-scalable decoder which ignores a check of the layer ID is used, coded data as it is can be decoded without the processing in which the layer ID is rewritten to be 0. Since the layer ID has a value equal to or greater than 0, determination (branching) of whether the layer ID has a value other than 0 may be used as determination (branching) of whether or not the layer ID is greater than 0 (similar in the following descriptions).

Because an SPS and a PPS are revised with relative ease in comparison to a change of a slice header (slice segment header), in the slice header, a syntax structure in case of an independent layer may be caused to be the same as a structure of syntax in a case where the layer ID is 0. The syntax structure of the SPS and the PPS may be different from a structure of the syntax in a case where the layer ID is 0, even in an independent layer. In this case, rewriting processing for the SPS and the PPS in the independent layer is required for being allowed to be decoded by the non-scalable decoder. However, since the rewriting processing for (a slice header of) a picture in the independent layer is not required, such a configuration is also effective. Similarly, in a modification example which will be described later, a structure of coded data may be also used based on an independent layer only in the slice header, and decoding and coding may be also used.

(Configuration of Image Decoding Device)

Figure 18:
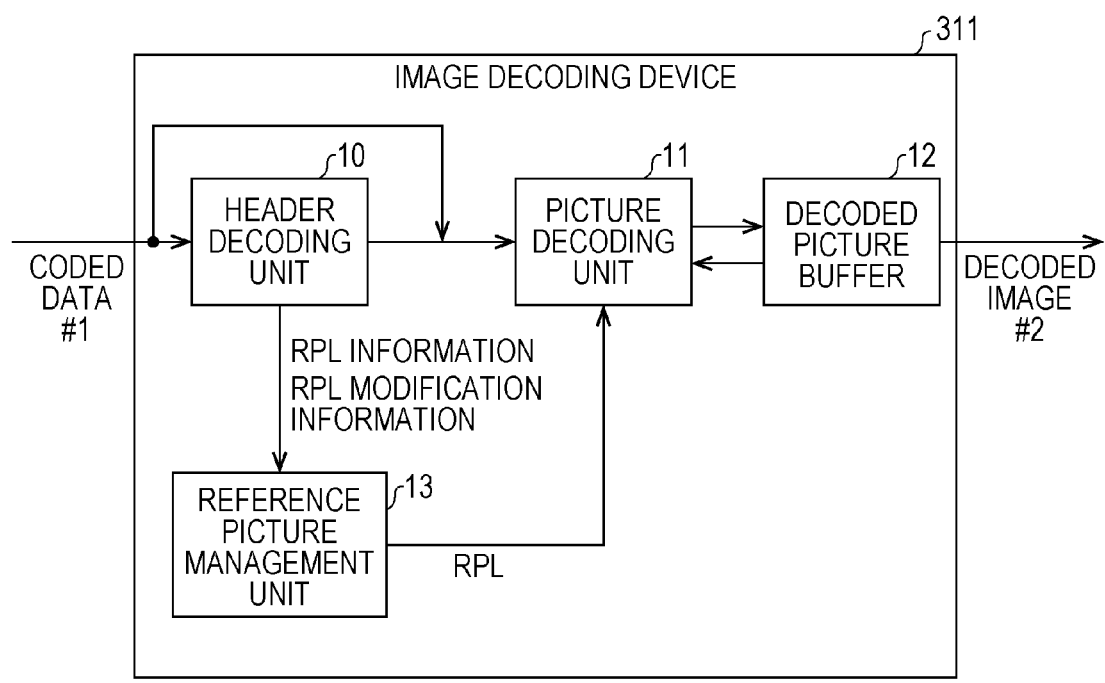
FIG. 18 is a functional block diagram illustrating a schematic configuration of the image decoding device according to the embodiment of the present invention.

A configuration of the image decoding device 1 according to the embodiment will be described. FIG. 18 is a schematic diagram illustrating the configuration of the image decoding device 1 according to the embodiment. The image decoding device 1 includes a header decoding unit 10, picture decoding unit 11, a decoded picture buffer 12, and a reference picture management unit 13. The image decoding device 1 can perform random access decoding processing in which decoding is started from a picture at specific time in an image including a plurality of layers.

[Header Decoding Unit 10]

The header decoding unit 10 decodes information which is used in decoding in a unit of a NAL unit, a unit of a sequence, a unit of a picture, or a unit of slice, from coded data #1 supplied by the image coding device 2. The decoded information is output to the picture decoding unit 11 and the reference picture management unit 13.

The header decoding unit 10 parses a VPS, an SPS, and a PPS included in coded data #1, based on a predetermined syntax definition and decodes information used in decoding in a unit of a sequence. For example, the header decoding unit 10 decodes information regarding the number of layers, from the VPS. In a case where representation information is in the VPS, the header decoding unit 10 decodes information regarding an image size of a decoded image, from the VPS. In a case where the representation information is in the SPS, the header decoding unit 10 decodes information associated with the image size of a decoded image, from the SPS.

The header decoding unit 10 parses a slice header included in the coded data #1, based on a predetermined syntax definition and decodes information used in decoding in a unit of a slice. For example, a slice type is decoded from the slice header.

As illustrated in FIG. 19, the header decoding unit 10 includes a NAL-unit header decoding unit 211, a dependent layer information decoding unit 2101, a profile level information decoding unit 2102, a representation information decoding unit 2103, a scaling list decoding unit 2104, a POC information decoding unit 2105, and a reference picture information decoding unit 218.

Figure 21:
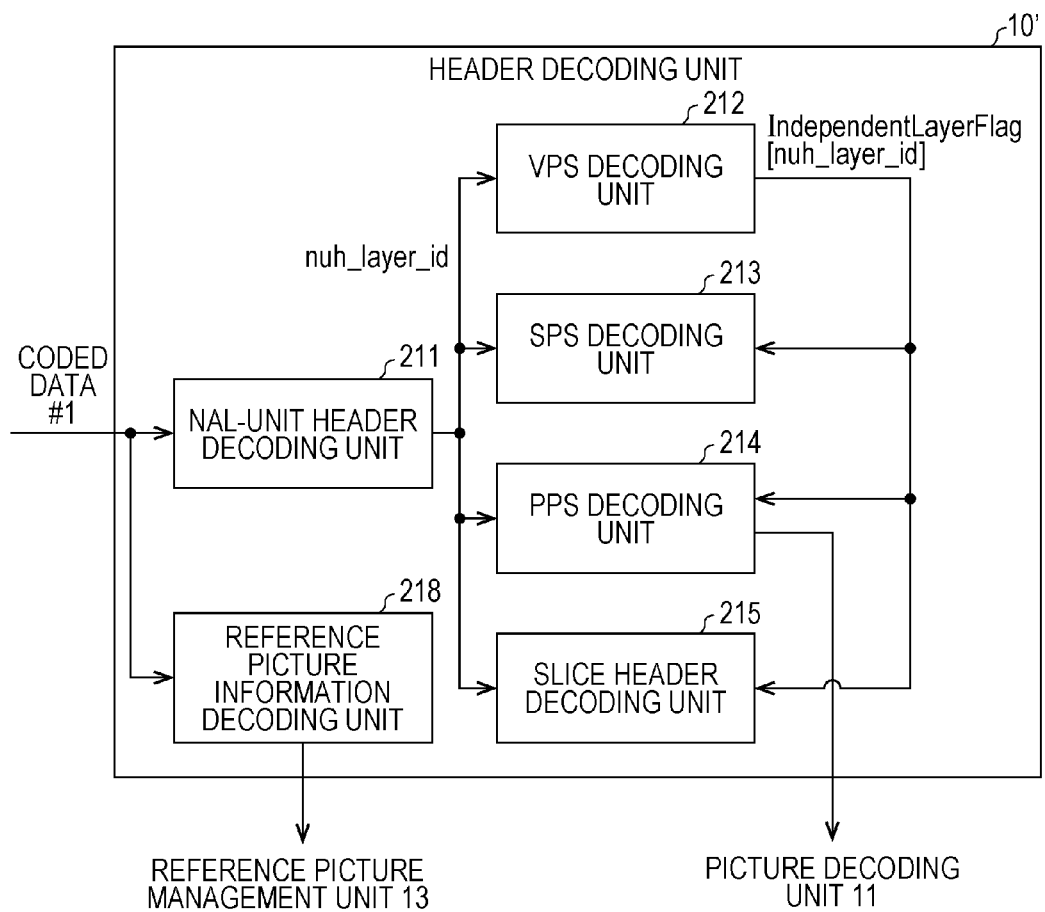
FIG. 21 is a functional block diagram illustrating a schematic configuration of a header decoding unit according to an embodiment different from the header decoding unit in FIG. 19.

The header decoding unit 10 touches various types of header information such as dependent layer information, profile level information, representation information, and scaling list. However, the header decoding unit may have a configuration in which decoding units which decodes the corresponding type of header for each type of header are provided. In this case, as illustrated in FIG. 21, the header decoding unit may be set as a header decoding unit 10'. The header decoding unit 10' includes the NAL-unit header decoding unit 211, a VPS decoding unit 212, an SPS decoding unit 213, a PPS decoding unit 214, and a slice header decoding unit 215.

Figure 22:
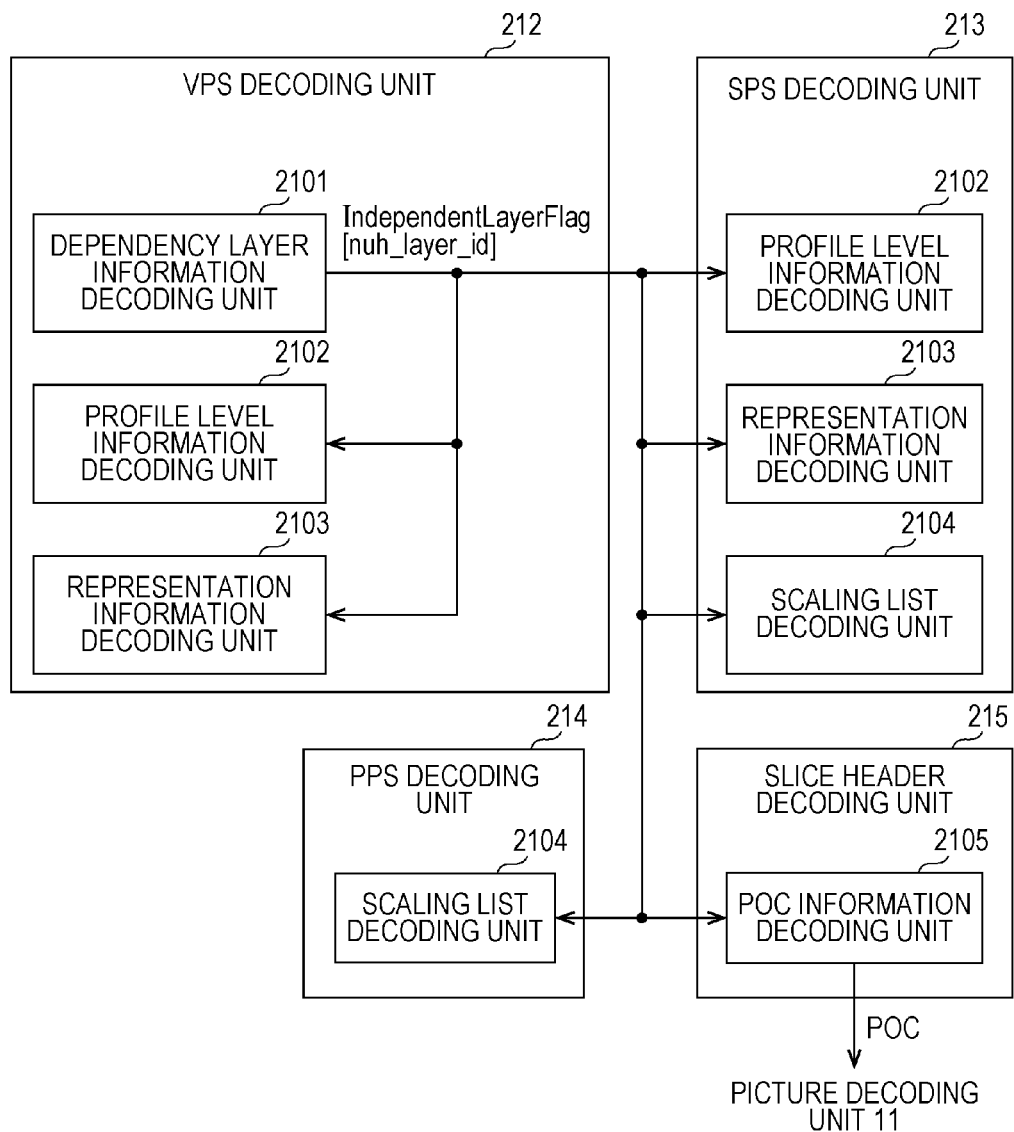
FIG. 22 is a functional block diagram illustrating a schematic configuration of decoding units constituting the header decoding unit in FIG. 21.

Each of decoding units, that is, the VPS decoding unit 212, the SPS decoding unit 213, the PPS decoding unit 214, and the slice header decoding unit 215 may have a configuration as illustrated in FIG. 22.

Figure 23:
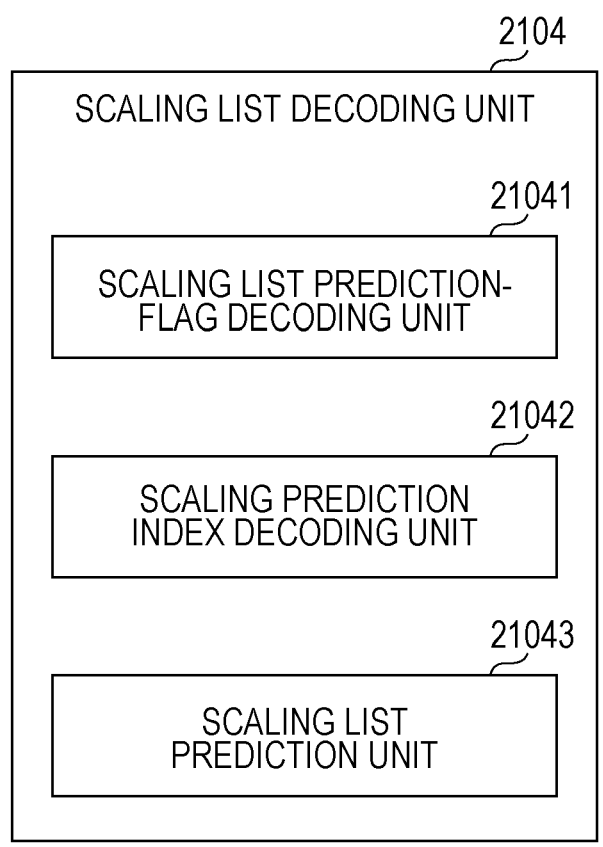
FIG. 23 is a functional block diagram illustrating a schematic configuration of a scaling list decoding unit which is included in an SPS decoding unit and a PPS decoding unit in FIG. 22.

That is, the VPS decoding unit 212 may include the dependent layer information decoding unit 2101, the profile level information decoding unit 2102, and the representation information decoding unit 2103. The SPS decoding unit 213 may include the profile level information decoding unit 2102, the representation information decoding unit 2103, and the scaling list decoding unit 2104. The PPS decoding unit 214 may include the scaling list decoding unit 2104. The slice header decoding unit 215 may include the POC information decoding unit 2105. The scaling list decoding unit 2104 may have a configuration as illustrated in FIG. 23, for example.

In this case, a plurality of header decoding units (for example, the VPS decoding unit 212 and the SPS decoding unit 213) has the same means X (for example, the profile level information decoding unit 2102). However, one header decoding unit may have the means X therein, and another header decoding unit may use the means X. Each of the header decoding units in which the means X is included on the outside of the header decoding units may use the means X. Each of the VPS decoding unit 212 and the SPS decoding unit 213 includes the profile level information decoding unit 2102. However, the profile level information decoding unit 2102 may be provided in one of the VPS decoding unit 212 and the SPS decoding unit 213, and the profile level information decoding unit 2102 may be not provided in another decoding unit. In addition, a configuration in which the profile level information decoding unit 2102 is provided on the outside of the VPS decoding unit 212 and the SPS decoding unit 213, and the VPS decoding unit 212 and the SPS decoding unit 213 use the profile level information decoding unit 2102 may be made.

[NAL-Unit Header Decoding Unit 211]

FIG. 20 is a functional block diagram illustrating a schematic configuration of the NAL-unit header decoding unit 211. As illustrated in FIG. 20, the NAL-unit header decoding unit 211 includes a layer ID decoding unit 2111 and a NAL unit type decoding unit 2112.

The layer ID decoding unit 2111 decodes a layer ID (layer ID included in a NAL unit header) from coded data. The NAL unit type decoding unit 2112 decodes a NAL unit type from the coded data. The layer ID is 6-bit information of 0 to 63, for example. In a case where the layer ID is 0, the layer ID indicates a base layer. In order to cause a portion of coded data subjected to scalable coding to be used for support backward compatibility in which coding is performed by the non-scalable decoder, the base layer can be decoded by the non-scalable decoder. The NAL unit type is 6-bit information of 0 to 63, for example. The NAL unit type indicates the type of data included in a NAL unit. As will be described later, examples of the type of data include a parameter set such as a VPS, an SPS, and a PPS, a RPS picture such as an IDR picture, a CRA picture, and a BLA picture, a non-RAP picture such as a LP picture, and a SEI, and these are identified by the NAL unit type.

[Dependency Layer Information Decoding Unit 2101]

The dependent layer information decoding unit 2101 decodes dependent layer information based on a syntax definition defined from a VPS and VPS extension which are included in coded data. For example, the dependent layer information decoding unit 2101 decodes syntax illustrated in FIG. 14, from the VPS, and decodes syntax illustrated in FIG. 15, from the VPS extension. The VPS extension is decoded in a case where a flag (vps_extension_flag) is 1. In this specification, a configuration (syntax table) of coded data, and the meaning or the limitation (semantics) of syntax elements included in the configuration of the coded data are referred to as a coded data structure. The coded data structure is an important technological element which has an influence on coding efficiency of coded data along with a random access property or a memory size in a case where the coded data is decoded in an image decoding device, and association with compensation of the same operation between different image decoding devices.

The dependent layer information decoding unit 2101 decodes dependent layer information (direct_dependency_flag[ ][ ]) of each layer, from coded data. The dependent layer information decoding unit 2101 infers an independent layer flag (IndependentLayerFlag[ ]) of each layer.

The dependent layer information decoding unit 2101 infers the number (NumDirectRefLayers[i]) of dependent layers on a target layer i by using a flag (direct_dependency_flag[i][j]) which indicates whether or not there is dependency between the target layer i and a reference layer j (0<=j<i). Specifically, the number of layers in which direct_dependency_flag[i][j] has a value other than 0 is inferred among reference layers having an index j from 0 to (i−1) for the target layer i. The dependent layer information decoding unit 2101 sets IndependentLayerFlag[i] to 1, in a case where there is no dependent layer on the target layer i (that is, a case where the number of dependent layers (NumDirectRefLayers[i]) satisfies 0). The dependent layer information decoding unit 2101 sets IndependentLayerFlag[i] to 0, in a case where there is a dependent layer on the target layer (that is, a case where an expression of NumDirectRefLayers[i]==0 is false). In a case where there is no IndependentLayerFlag[i], 1 is inferred for IndependentLayerFlag[i] so as to indicate that the layer is independent.

The dependent layer information decoding unit 2101 determines whether or not the layer indicated as a layer of nuh_layer_id is an independent layer (IndependentLayerFlag[nuh_layer_id]!=0), based on the inferred dependent layer information (IndependentLayerFlag[ ]) of the layer. Instead of the flag IndependentLayerFlag[i] which indicates whether or not a certain layer i is an independent layer, a flag (DependentLayerFlag[i]) which indicates whether or not a certain layer i is a dependent layer may be used. In this case, the entirety of determination (branching) of "whether or not a layer is an independent layer (IndependentLayerFlag[nuh_layer_id]!=0)" is substituted with determination (branching) of whether or not a layer is a dependent layer (DependentLayerFlag[nuh_layer_id]==0)".

In the scalable coding, in many cases, tool expansion using dependency between layers is performed and a tool is not expanded for dependency in a layer. That is, an independent layer which does not use dependency between layers (independent layer using only dependency in a layer) is generated by using only a tool which can be also used in the non-scalable decoder. Thus, an independent layer can be also decoded by the non-scalable decoder as long as the independent layer has a syntax structure the same as that of the base layer.

[Profile Level Decoding Unit 2102]

The profile level decoding unit 2102 decodes profile level information of each layer, from the VPS.

In case of decoding the SPS, the profile level decoding unit 2102 also decodes the profile level information from the SPS in a case where a layer indicated by a layer ID (nuh_layer_id) of the SPS is an independent layer (for example, a value of IndependentLayerFlag[nuh_layer_id] is true), or the layer ID of the SPS is 0 (see FIG. 16(a)). Specifically, if an input of a layer ID included in a NAL unit header in which the NAL unit type is the SPS, is received from the NAL-unit header decoding unit 211, the profile level decoding unit 2102 decodes also decodes the profile level information from the SPS, in a case where dependent layer information decoded from the VPS indicates that a layer indicated by the layer ID is an independent layer, or in a case where the layer ID is 0. With such processing, it is possible to prevent an increase of a bit length of the SPS in a case where a use of SPS sharing is not allowed (due to, for example, a difference between resolutions).

[Representation Information Decoding Unit 2103]

The representation information decoding unit 2103 decodes syntax in FIG. 28(a), from the VPS, and decodes syntax in FIG. 28(b), from the SPS. Specifically, the representation information decoding unit 2103 decodes rep_format( ) included in the VPS, and decodes representation information such as chroma_format_idc, separate_colour_plane_flag, pic_width_in_luma_samples, pic_height_in_luma_samples, bit_depth_luma_minus8, and bit_depth_chroma_minus8. A representation information update flag (update_rep_format_flag) is included in the SPS, in a case where a layer indicated by the layer ID (nuh_layer_id) of the SPS is not an independent layer (for example, a value of IndependentLayerFlag[nuh_layer_id] is false). The representation information decoding unit 2103 decodes this flag from the SPS. In a case where update_rep_format_flag is not included in the SPS, update_rep_format_flag is inferred to be 0. In a case where update_rep_format_flag is 1, the representation information decoding unit 2103 decodes representation information such as chroma_format_idc, separate_colour_plane_flag, pic_width_in_luma_samples, pic_height_in_luma_samples, bit_depth_luma_minus8, and bit_depth_chroma_minus8. In a case where update_rep_format_flag is 0, the representation information which has been already decoded is used as representation information for the target layer in rep_format( ) of the VPS.

The determination of "whether a layer indicated by the layer ID is a layer other than an independent layer" may be substituted with determination of "whether a layer indicated by the layer ID is a layer other than an independent layer and the layer ID is greater than 0 (case where the layer ID has a value other than 0)". Since a layer having a layer ID of 0 is generally an independent layer, in a case where a Boolean value of the former is true (case where a layer indicated by the layer ID is a layer other than an independent layer), the layer ID is also greater than 0. Thus, determination of the Boolean value of the latter is not necessary. However, in case of a base layer (layer ID=0), determination relating to the layer ID may be performed in addition to determination relating to an independent layer, in order to clarify that the representation information update flag (update_rep_format_flag) is not included (similar in the following descriptions).

[Scaling List Decoding Unit 2104]

The scaling list decoding unit 2104 decodes a scaling list prediction flag (sps_infer_scaling_list_flag) from the SPS in a case where a layer indicated by the layer ID is a layer other than an independent layer (for example, a value of IndependentLayerFlag[nuh_layer_id] is 0, that is, !IndependentLayerFlag[nuh_layer_id] is true) (see FIG. 16(a)). In a case where sps_infer_scaling_list_flag has a value other than 0, the scaling list decoding unit 2104 further decodes sps_scaling_list_ref_layer_id. In a case where sps_infer_scaling_list_flag is 0, the scaling list decoding unit 2104 decodes sps_scaling_list_data_present_flag and scaling_list_data( ) so as to decodes a scaling list.

In a case where a layer indicated by the layer ID is a layer other than an independent layer, the scaling list decoding unit 2104 decodes pps_infer_scaling_list_flag from the PPS (see FIG. 16(b)). In a case where pps_infer_scaling_list_flag is 0, the scaling list decoding unit 2104 further decodes pps_scaling_list_ref_layer_id. In a case where pps_infer_scaling_list_flag is 0, the scaling list decoding unit 2104 decodes pps_scaling_list_data_present_flag and scaling_list_data( ) so as to decodes a scaling list.

Specifically, in case of decoding the SPS and the PPS, if an input of the layer ID included in the NAL unit header of the SPS and PPS is received from the NAL-unit header decoding unit 211, the scaling list decoding unit 2104 decodes flags (sps_infer_scaling_list_flag and pps_infer_scaling_list_flag) when dependent layer information decoded from the VPS indicates that a layer indicated by the layer ID is a layer other than an independent layer. The flags (sps_infer_scaling_list_flag and pps_infer_scaling_list_flag) indicate whether or not the scaling list is predicted.

With such processing, it is possible to prevent an increase of a bit length of the SPS and the PPS in a case where a use of SPS/PPS sharing is not allowed.

[POC Information Decoding Unit 2105]

Figure 29:
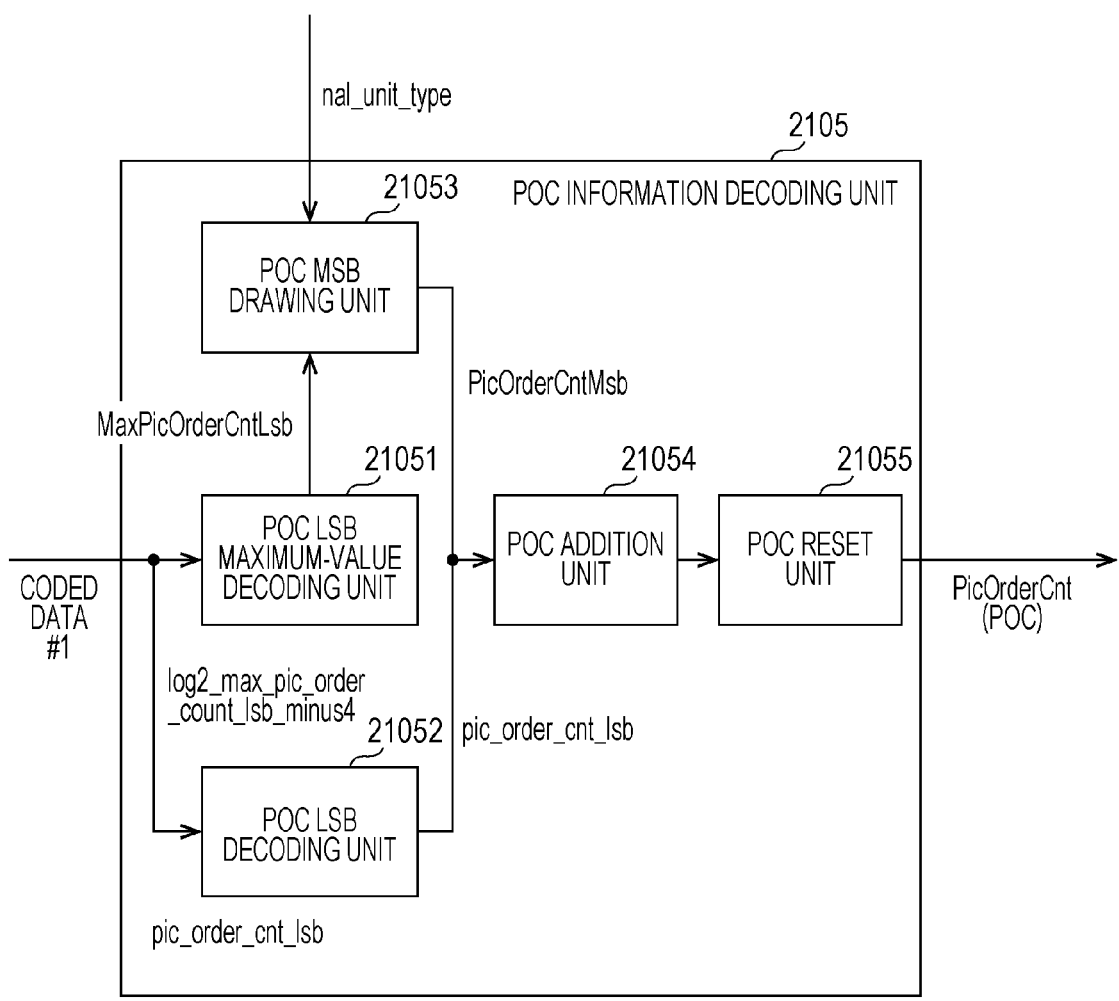
FIG. 29 is a schematic diagram illustrating a configuration of a POC information decoding unit according to the embodiment of the present invention.

FIG. 29 is a functional block diagram illustrating a schematic configuration of the POC information decoding unit 2105 (POC inferring unit). As illustrated in FIG. 29, the POC information decoding unit 2105 includes a POC LSB maximum-value decoding unit 21051, a POC LSB decoding unit 21052, a POC MSB inferring unit 21053, a POC addition unit 21054, and a POC reset unit 21055. The POC information decoding unit 2105 decodes a higher bit of the POC (PicOrderCntMsb) and a lower bit of the POC (pic_order_cnt_lsb). Thus, the POC information decoding unit 2105 infers the POC and outputs the inferred POC to the picture decoding unit 11 and the reference picture management unit 13.

The POC LSB maximum-value decoding unit 21051 decodes the maximum value of the lower bit of the POC (MaxPicOrderCntLsb) of the target picture from the coded data. Specifically, a syntax element (log 2_max_pic_order_cnt_lsb_minus4) is coded as a value obtained by subtracting the constant of 4 from logarithm of the maximum value of the lower bit of the POC (MaxPicOrderCntLsb). The POC LSB maximum-value decoding unit 21051 decodes the coded syntax element (log 2_max_pic_order_cnt_lsb_minus4) from coded data of the PPS for defining a parameter of the target picture, and infers the maximum value of the lower bit of the POC (MaxPicOrderCntLsb) by using the following expression.

$$MaxPicOrderCntLsb = 2^{(\log 2\_max\_pic\_order\_cnt\_lsb\_minus4 + 4)}$$

MaxPicOrderCntLsb indicates a border between the higher bit (PicOrderCntMsb) and the lower bit (pic_order- _cnt_lsb) of the POC. For example, in a case where MaxPicOrderCntLsb is 16 (log 2_max_pic_order_cnt_lsb_minus4=0), lower four bits of 0 to 15 are indicated by pic_order_cnt_lsb, and bits higher than the lower four bits are indicated by PicOrderCntMsb.

The POC LSB decoding unit 21052 decodes a POC lower bit (pic_order_cnt_lsb) which is the lower bit of the POC of the target picture, in the following case: a) in a case where a layer indicated by the layer ID of a picture is a layer other than an independent layer (for example, the value of IndependentLayerFlag[nuh_layer_id] is 0), or b) in a case where the NAL unit type of a picture is not an IDR (case where the NAL unit type of a picture is not IDR_W_RADL and IDR_N_LP). Specifically, the POC LSB decoding unit 21052 decodes pic_order_cnt_lsb included in the slice header of the target picture.

The POC MSB inferring unit 21053 infers a POC higher bit (PicOrderCntMsb) which is the higher bit of the POC of the target picture. Specifically, the POC MSB inferring unit 21053 initializes the POC higher bit (PicOrderCntMsb) to be 0 by using the following expression, in a case where the NAL unit type of the target picture, which has been input from the NAL-unit header decoding unit 211 indicates a RAP picture in which initialization of the POC is required (case of BLA or IDR).

PicOrderCntMsb=0

A timing of initialization is time when the leading slice of the target picture is decoded. The leading slice corresponds to a slice of which a slice address included in the slice header is 0 or a first slice input to the image decoding device among slices input as the target picture.

In case of other NAL unit types, the POC MSB inferring unit 21053 infers the POC higher bit (PicOrderCntMsb) through the following expression by using the maximum value (MaxPicOrderCntLsb) of the POC lower bit which is decoded by the POC LSB maximum-value decoding unit 21051, and using temporary variables (prevPicOrderCntLsb and prevPicOrderCntMsb) which will be described later.

```
if((pic_order_cnt_lsb<prevPicOrderCntLsb) &&
    ((prevPicOrderCntLsb-
pic_order_cnt_lsb)>=(MaxPicOrderCntLsb/2)))
    PicOrderCntMsb=prevPicOrderCntMsb+MaxPicOrderCntLsb
else if((pic_order_cnt_lsb>prevPicOrderCntLsb) &&
    ((pic_order_cnt_lsb-
prevPicOrderCntLsb)>(MaxPicOrderCntLsb/2)))
    PicOrderCntMsb=prevPicOrderCntMsb-MaxPicOrderCntLsb
else
    PicOrderCntMsb=prevPicOrderCntMsb
```

That is, in a case where pic_order_cnt_lsb is smaller than prevPicOrderCntLsb, and a difference between prevPicOrderCntLsb and pic_order_cnt_lsb is equal to or greater than the half of MaxPicOrderCntLsb, the POC MSB inferring unit 21053 sets a value obtained by adding MaxPicOrderCntLsb to prevPicOrderCntMsb, as PicOrderCntMsb. In addition, in a case where pic_order_cnt_lsb is greater than prevPicOrderCntLsb, and the difference between prevPicOrderCntLsb and pic_order_cnt_lsb is greater than the half of MaxPicOrderCntLsb, the POC MSB inferring unit 21053 sets a value obtained by subtracting MaxPicOrderCntLsb from prevPicOrderCntMsb, as PicOrderCntMsb. In other cases, the POC MSB inferring unit 21053 sets prevPicOrderCntMsb as PicOrderCntMsb.

The POC MSB inferring unit 21053 infers the temporary variables (prevPicOrderCntLsb and prevPicOrderCntMsb) through the following procedures. In a case where a reference picture just before which TemporalId of a picture in a decoding order is 0 is set as prevTid0Pic, the POC MSB inferring unit 21053 sets a POC (PicOrderCntVal) of the picture (prevTid0Pic) as prevPicOrderCnt and infers prevPicOrderCntMsb and prevPicOrderCntMsb by using the following expression.

prevPicOrderCntMsb=prevPicOrderCnt & (MaxPicOrderCntLsb-1)

prevPicOrderCntMsb=prevPicOrderCnt-prevPicOrderCntLsb

Figure 30:
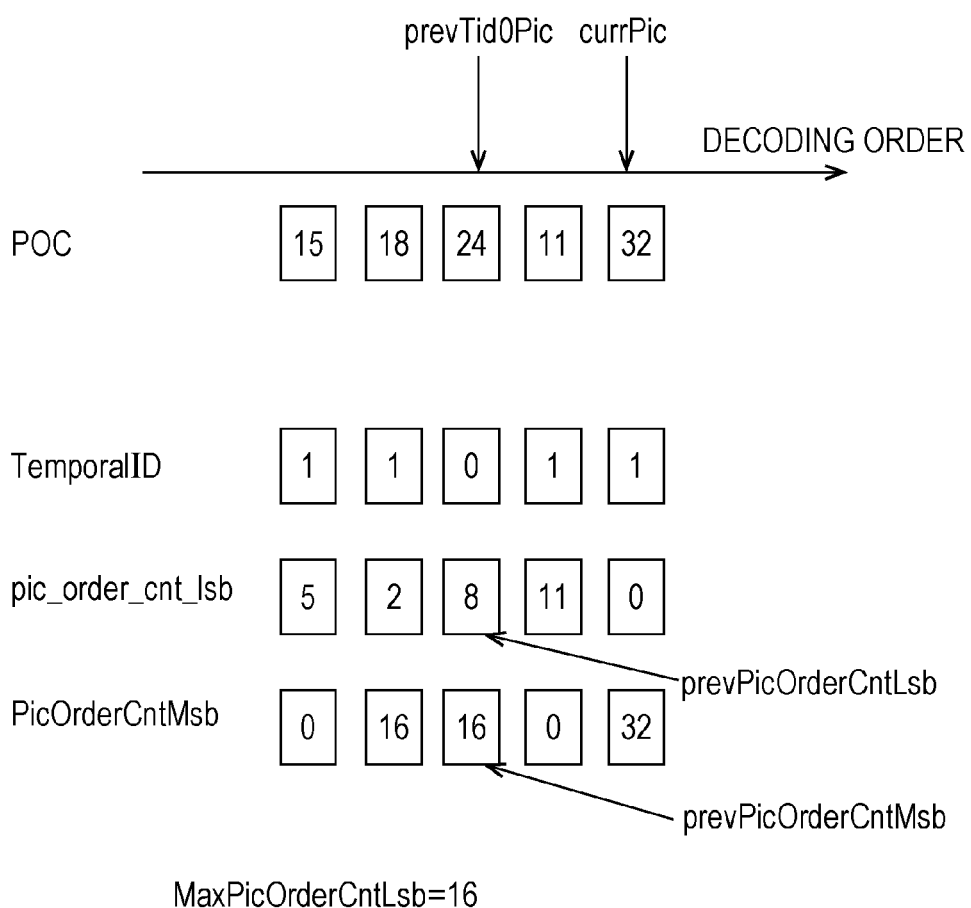
FIG. 30 is a diagram illustrating an operation of the POC information decoding unit according to the embodiment of the present invention.

FIG. 30 is a diagram illustrating an operation of the POC information decoding unit 2105. As illustrated in FIG. 30, an example in which pictures having a POC of 15, 18, 24, 11, and 32 is decoded in a rightward order from the left in case of MaxPicOrderCntLsb=16, is described. Here, in a case where a picture at the right end (picture having a POC of 32) is set as a target picture, when the target picture is decoded, a picture just before which a picture having TemporalID of 0 in the decoding order is a picture having a POC of 24. Thus, the POC information decoding unit 2105 sets the picture having a POC of 24, as a picture (prevTid0Pic). The POC information decoding unit 2105 infers prevPicOrderCntLsb and prevPicOrderCntMsb to be respectively 8 and 16 by using a POC lower bit and a POC higher bit of the picture (prevTid0Pic). Since pic_order_cnt_lsb of the target picture is 0, the inferred prevPicOrderCntLsb is 8, and the half of MaxPicOrderCntLsb is 8, the above-described determination, that is, a case where pic_order_cnt_lsb is smaller than prevPicOrderCntLsb, and the difference between prevPicOrderCntLsb and pic_order_cnt_lsb is equal to or greater than the half of MaxPicOrderCntLsb is established. The POC information decoding unit 2105 sets a value obtained by adding MaxPicOrderCntLsb to prevPicOrderCntMsb, as PicOrderCntMsb. That is, PicOrderCntMsb of the target picture is inferred to be 32 (=16+16).

The POC addition unit 21054 adds the POC lower bit (pic_order_cnt_lsb) which is decoded by the POC LSB decoding unit 21052, and the POC higher bit which is inferred by the POC MSB inferring unit 21053. The POC addition unit 21054 infers the POC (PicOrderCntVal) by using the following expression.

PicOrderCntVal=PicOrderCntMsb+pic_order_cnt_lsb

In the example of FIG. 30, since PicOrderCntMsb is 32 and pic_order_cnt_lsb is 0, PicOrderCntVal which is the POC of the target picture is inferred to be 32.

In a case where poc_reset_flag is 1, the POC reset unit 21055 subtracts PicOrderCntVal which is inferred by the POC addition unit 21054, from PicOrderCntVal of each of reference pictures in the same access unit, which are stored in the DPB. The POC reset unit 21055 sets PicOrderCntVal of the target picture to 0.

The POC information decoding unit 2105 decodes slice_pic_order_cnt_lsb from the slice header, a) in a case where a layer indicated by the layer ID of a picture is a layer other than an independent layer, or b) in a case where the NAL unit type of the picture is not IDR (case where the NAL unit type of the picture is not IDR_W_RADL and IDR_N_LP) (see FIG. 16(c)). With such processing, even in a case where the NAL unit type is IDR, when a layer indicated by the layer ID of a picture is a layer other than an independent layer, slice_pic_order_cnt_lsb may be determined and it is possible to prevent occurrence of a problem in alignment of the POC.

[Reference Picture Information Decoding Unit 218]

The reference picture information decoding unit 218 is a component of the header decoding unit 10. The reference picture information decoding unit 218 decodes information regarding a reference picture, from coded data #1. The information regarding a reference picture includes reference picture set information (hereinafter, RPS information) and reference picture list modification information (hereinafter, RPL modification information).

The reference picture set (RPS) indicates a set of pictures which have a probability of being used as a reference picture among pictures subsequent to the target picture in a decoding order. The RPS information is information which is decoded from the SPS or the slice header. The RPS information is information used in inferring of a reference picture set which is set when each picture is decoded.

The reference picture list (RPL) is a list of candidates for a reference picture which is to be referred when motion compensation prediction is performed. Two or more reference picture lists may be provided. In the embodiment, it is assumed that a L0 reference picture list (L0 reference list) and a L1 reference picture list (L1 reference list) are used. The RPL modification information is information decoded from the SPS or the slice header. The RPL modification information indicates an order of reference pictures in the reference picture list.

In the motion compensation prediction, a reference picture which is recorded at a position of a reference image index (refIdx) on a reference image list is used. For example, in a case where a value of refIdx is 0, a reference picture at a position of 0 in the reference image list, that is, the leading reference picture in the reference image list is used in the motion compensation prediction.

Because decoding processing of the RPS information and the RPL modification information, which is performed by the reference picture information decoding unit 218 is important processing in the embodiment, details thereof will be described later.

Figure 32:
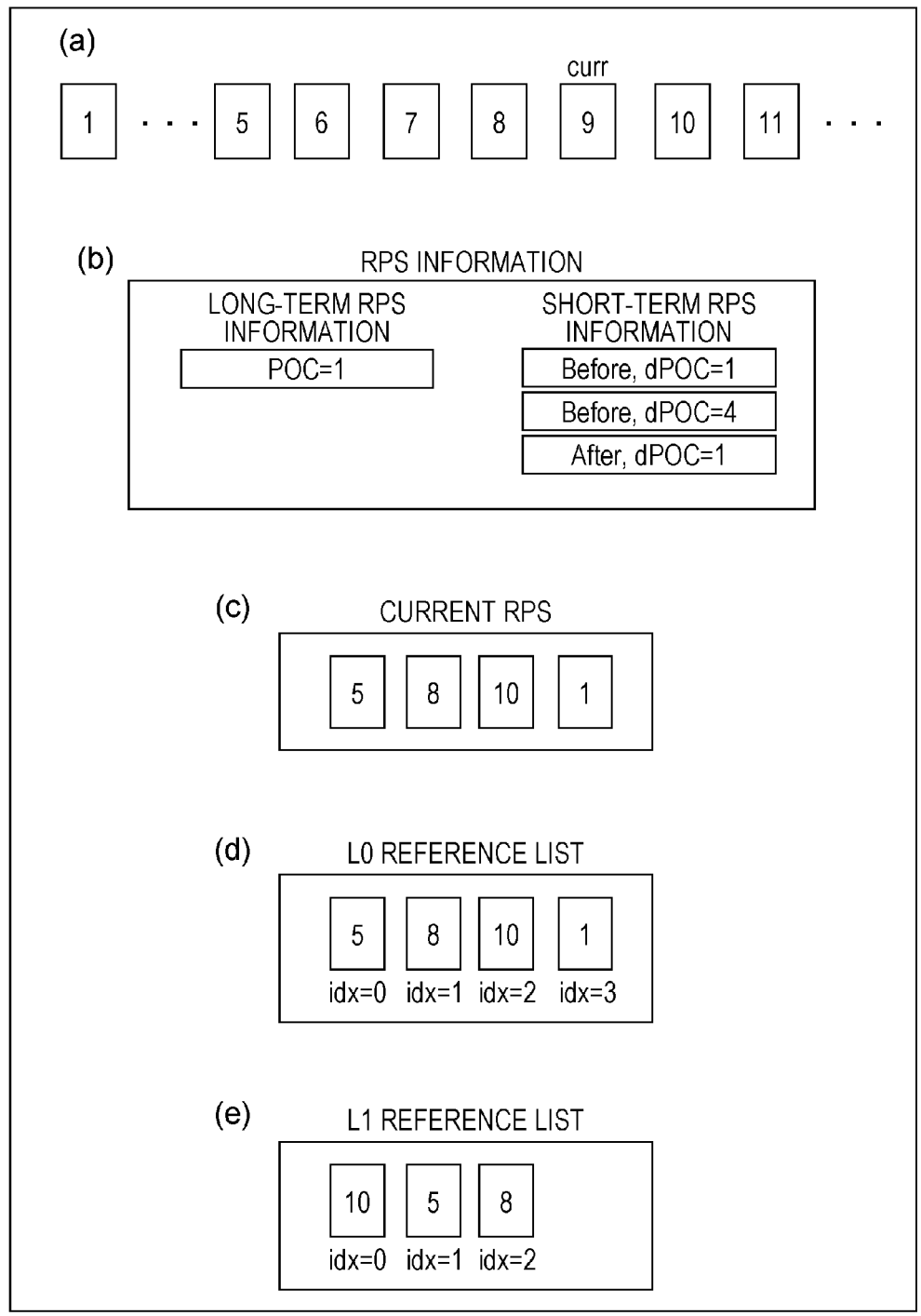
FIG. 32 is a diagram illustrating an example of a reference picture set and the reference picture list.

Here, examples of the reference picture set and the reference picture list will be described with reference to FIG. 32. FIG. 32(a) illustrates a form in which pictures constituting a video are arranged in a display order. The number in FIG. 32(a) indicates a POC corresponding to each of the pictures. The POC is assigned to each of the pictures so as to be in ascending order in an output order, as will be described in descriptions for the decoded picture buffer. A picture of which a POC indicated by "curr" is 9 is a target picture of the current decoding.

FIG. 32(b) illustrates an example of the RPS information applied to the target picture. The reference picture set (current RPS) in the target picture is inferred based on the RPS information. The RPS information includes long-term RPS information and short-term RPS information. As the long-term RPS information, a POC of a picture included in the current RPS is directly illustrated. In the example illustrated in FIG. 32(b), the long-term RPS information indicates that a picture having a POC of 1 is included in the current RPS. A picture included in the current RPS is recorded in the short-term RPS information in a state where the picture has a difference from the POC of the target picture. The short-term RPS information illustrated as "Before, dPOC=1" in FIG. 32(b) indicates that a picture of a POC which is smaller than the POC of the target picture by 1 is included in the current RPS. Similarly, "Before, dPOC=4" in FIG. 32(b) indicates a picture of a POC which is smaller by 4. "After, dPOC=1" indicates that a picture of a POC which is greater by 1 is included in the current RPS. "Before" indicates a picture ahead of the target picture, that is, a picture prior to the target picture in a display order. "After" indicates a picture rearward of the target picture, that is, a picture which is later than the target picture in the display order.

FIG. 32(c) illustrates an example of the current RPS inferred when the RPS information illustrated in FIG. 32(b) is applied in a case where the POC of the target picture is 0. A picture which has a POC of 1 and is illustrated as the long-term RPS information is included. A picture which is illustrated as the short-term RPS information and has a POC which is smaller than the target picture (POC=9) by 1, that is, a picture having a POC of 8 is included. Similarly, pictures which are illustrated as the short-term RPS information and have a POC of 5 and 10 are included.

FIGS. 32(d) and 32(e) illustrate an example of the reference picture list which is generated from reference pictures included in the current RPS. An index (reference picture index) is added to each element of the reference picture list (described as idx in FIGS. 32(d) and 32(e)). FIG. 32(d) illustrates an example of the L0 reference list. The L0 reference list includes reference pictures which have a POC of 5, 8, 10, and 1 and are included in the current RPS, in this order. FIG. 32(e) illustrates an example of the L1 reference list. The L1 reference list includes reference pictures which have a POC of 10, 5, and 8 and are included in the current RPS, in this order. As illustrated in the example of the L1 reference list, the reference picture list is not required to include all reference pictures (referable picture) which are included in the current RPS. However, the number of elements of the reference picture list is used as the number of reference pictures included in the current RPS, even in the maximum. In other words, the length of the reference picture list is equal to or smaller than the number of pictures to which the current picture can refer.

Figure 33:
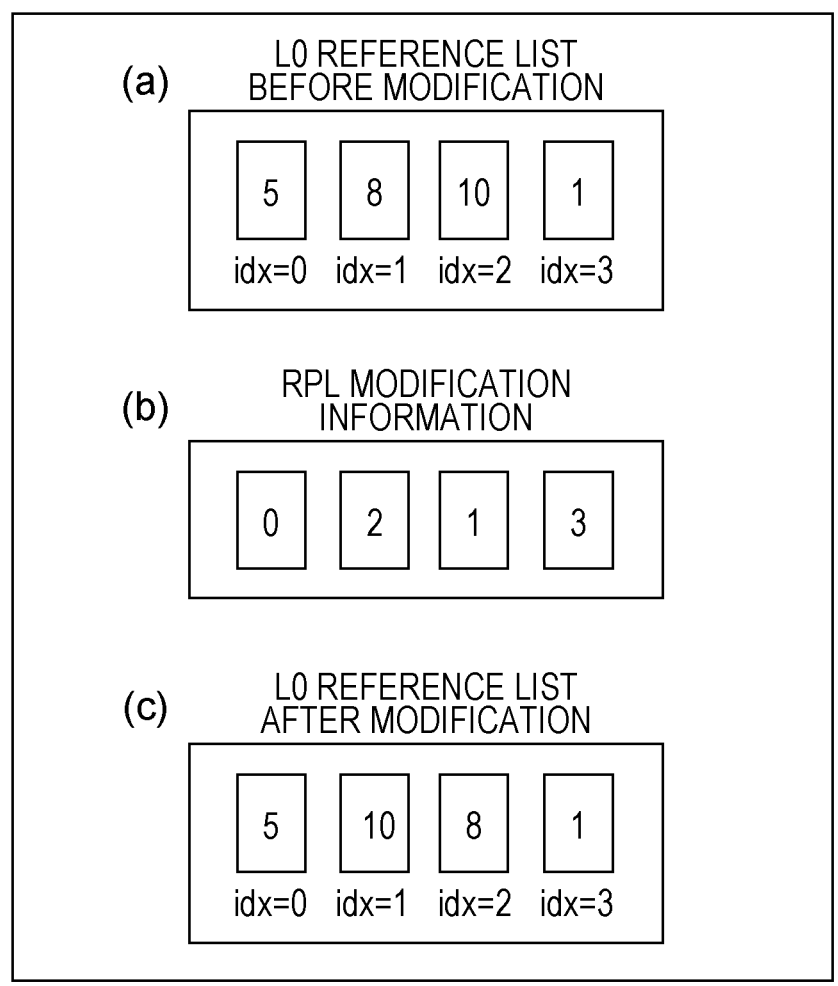
FIG. 33 is a diagram illustrating a modification example of the reference picture list.

Next, an example of modification of the reference picture list will be described with reference to FIG. 33. FIG. 33 illustrates a modified reference picture list (FIG. 33(c)) which is obtained in a case where the RPL modification information (FIG. 33(b)) is applied to a specific reference picture list (FIG. 33(a)). A L0 reference list before modification, which is illustrated in FIG. 33(a) is the same as the L0 reference list illustrated in FIG. 32(d). The RPL modification information illustrated in FIG. 33(b) is a list in which a value of the reference picture index is used as an element, and values of 0, 2, 1, and 3 are stored in an order from the head. The RPL modification information indicates that reference pictures indicated by reference picture indices of 0, 2, 1, and 3, which are included in a reference list before modification is changed to reference pictures of a modified L0 reference list in this order. FIG. 33(c) illustrates the modified L0 reference list which includes pictures having a POC of 5, 10, 8, and 1 are included in this order.

(Video Decoding Processing Procedures)

Procedures in which the image decoding device 1 generates a decoded image #2 from input coded data #1 are as follows.

(S11) The header decoding unit 10 decodes a VPS and an SPS from the coded data #1.

(S12) The header decoding unit 10 decodes a PPS from the coded data #1.

(S13) Pictures of the coded data #1 are sequentially set to be a target picture. The processes of S14 to S17 are performed for each of target pictures.

(S14) The header decoding unit 10 decodes a slice header of each slice included in the target picture, from the coded data #1. The reference picture information decoding unit 218 included in the header decoding unit 10 decodes RPS information from the slice header and outputs the decoded RPS information to a reference picture set setting unit 131 included in the reference picture management unit 13. The reference picture information decoding unit 218 decodes RPL modification information from the slice header and output the decoded RPL modification information to a reference picture list inferring unit 132.

(S15) The reference picture set setting unit 131 generates a reference picture set RPS which is applied to the target picture, based on the RPS information and a combination of a POC of a local decoded image recorded in the decoded picture buffer 12 and position information on a memory. The reference picture set setting unit 131 outputs the generated reference picture set RPS to the reference picture list inferring unit 132.

(S16) The reference picture list inferring unit 132 generates a reference picture list (RPL) based on the reference picture set RPS and the RPL modification information, and outputs the generated reference picture list to the picture decoding unit 11. (S17) The picture decoding unit 11 creates a local decoded image of the target picture from the coded data #1, based on slice data of each slice included in the target picture and the reference picture list (RPL). The picture decoding unit 11 associates the created local decoded image with a POC of the target picture and records a result of association in the decoded picture buffer. The local decoded image recorded in the decoded picture buffer is output as a decoded image #2 to the outside at an appropriate timing which is determined based on the POC.

[Decoded Picture Buffer 12]

In the decoded picture buffer 12, a local decoded image of each of pictures decoded by the picture decoding unit are recorded in association with a layer ID and a picture order count (POC, picture order information) of the corresponding picture. The decoded picture buffer 12 determines a POC of an output target at a predetermined output timing. Then, a local decoded image corresponding to the POC is output as one of pictures constituting the decoded image #2, to the outside.

Figure 24:
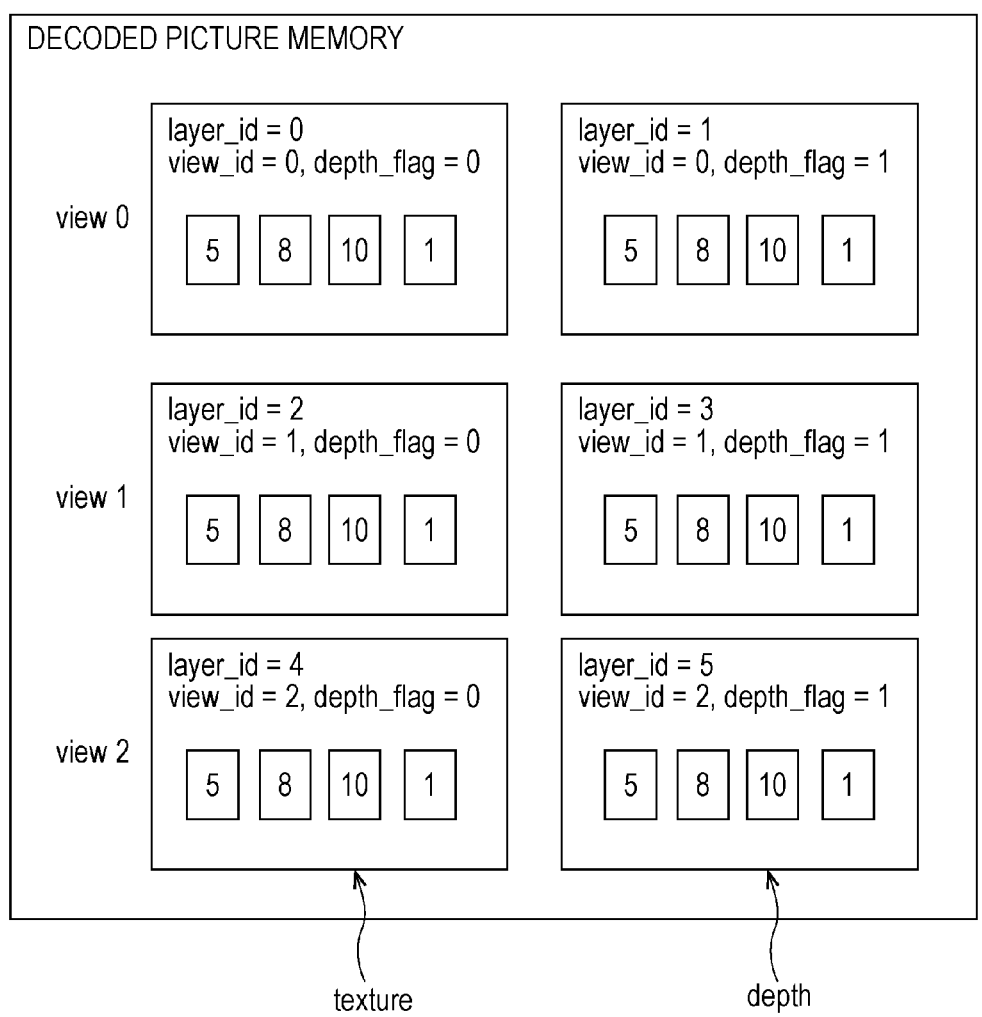
FIG. 24 is a schematic diagram illustrating a configuration of a picture structure according to the embodiment.

FIG. 24 is a conceptual diagram illustrating a configuration of a decoded picture memory. In FIG. 24, a box in which the number is described indicates a local decoded image. The number indicates a POC. As illustrated in FIG. 24, local decoded images of a plurality of layers are recorded in association with a layer ID, a POC, and a local decoded image. A view ID (view_id) and a depth flag (depth_flag) which correspond to the layer ID are recorded in association with the local decoded image.

[Reference Picture Management Unit 13]

Figure 31:
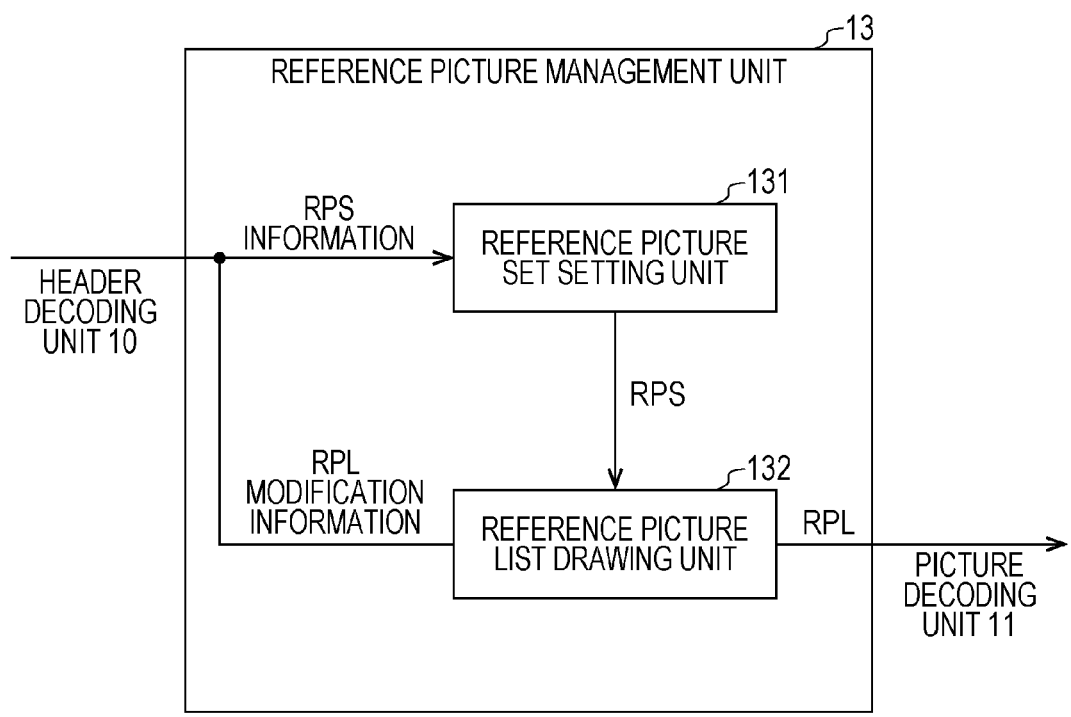
FIG. 31 is a functional block diagram illustrating a schematic configuration of a reference picture management unit according to the embodiment.

FIG. 31 is a schematic diagram illustrating a configuration of the reference picture management unit 13 according to the embodiment. The reference picture management unit 13 includes the reference picture set setting unit 131 and the reference picture list inferring unit 132.

The reference picture set setting unit 131 constructs a reference picture set (RPS) based on the RPS information decoded by the reference picture information decoding unit 218, the local decoded image and the layer ID which are recorded in the decoded picture buffer 12, and information of a POC. The reference picture set setting unit 131 outputs the constructed reference picture set (RPS) to the reference picture list inferring unit 132. Details of the reference picture set setting unit 131 will be described later.

The reference picture list inferring unit 132 generates a reference picture list (RPL) based on the RPL modification information decoded by the reference picture information decoding unit 218 and the reference picture set (RPS) input from the reference picture set setting unit 131. The reference picture list inferring unit 132 outputs the generated reference picture list (RPL) to the picture decoding unit 11. Details of the reference picture list inferring unit 132 will be described later.

(Details of Reference Picture Information Decoding Processing)

In the process of S14 among the decoding procedures, details of decoding processing for the RPS information and the RPL modification information will be described.

(RPS Information Decoding Processing)

The RPS information is information decoded by using an SPS and a slice header in order to construct a reference picture set. The RPS information includes the following elements.

1. SPS short-term RPS information: short-term reference picture set information included in the SPS
2. SPS long-term RP information: long-term reference picture information included in the SPS
3. SH short-term RPS information: short-term reference picture set information included in the slice header
4. SH long-term RP information: long-term reference picture information included in the slice header.

(1. SPS Short-Term RPS Information)

The SPS short-term RPS information includes information of a plurality of short-term reference picture sets which may be used from each picture referring to the SPS. The short-term reference picture set is a set of pictures which may be reference pictures (short-term reference pictures) designated by a position relative to the target picture (for example, a difference in POC from the target picture).

Decoding of the SPS short-term RPS information will be described with reference to FIG. 34. FIG. 34 illustrates a portion of an SPS syntax table used when the SPS is decoded, in the header decoding unit 10 and the reference picture information decoding unit 218. A part of (A) in FIG. 34 corresponds to the SPS short-term RPS information. The SPS short-term RPS information includes the number (num_short_term_ref_pic_sets) of short-term reference picture sets included in the SPS and information (short_term_ref_pic_set(i)) of each of the short-term reference picture sets.

The short-term reference picture set information will be described with reference to FIG. 35. FIG. 35 illustrates a syntax table of the short-term reference picture set used when the SPS is decoded and when the slice header is decoded, in the header decoding unit 10 and the reference picture information decoding unit 218.

The short-term reference picture set information includes the number (num_negative_pics) of short-term reference pictures prior to the target picture in a display order, and the number (num_positive_pics) of short-term reference pictures later than the target picture in the display order. In the following descriptions, a short-term reference picture which is prior to the target picture in the display order is referred to as a forward short-term reference picture, and a short-term reference picture which is later than the target picture in the display order is referred to as a backward short-term reference picture.

The short-term reference picture set information includes an absolute value (delta_poc_s0_minus1[i]) of a POC difference from the target picture, and the presence or absence (used_by_curr_pic_s0_flag[i]) of a probability of being used as a reference picture of the target picture, for each forward short-term reference picture. In addition, short-term reference picture set information includes an absolute value (delta_poc_s1_minus1[i]) of a POC difference from the target picture, and the presence or absence (used_by_curr_pic_s1_flag[i]) of a probability of being used as a reference picture of the target picture, for each backward short-term reference picture.

(2. SPS Long-Term RP Information)

The SPS long-term RP information includes information of a plurality of long-term reference pictures which can be used from each picture referring to the SPS. The long-term reference picture is a picture designated by an absolute position (for example, the POC) in a sequence.

Decoding of the SPS long-term RP information will be described again with reference to FIG. 34. A part of (B) in FIG. 34 corresponds to the SPS long-term RP information. The SPS long-term RP information includes information (long_term_ref_pics_present_flag), the number (num_long_term_ref_pics_sps) of long-term reference pictures included in the SPS, and information of each long-term reference picture. The information (long_term_ref_pics_present_flag) indicates whether or not there is a long-term reference picture transmitted by using the SPS. The information of the long-term reference picture includes a POC (lt_ref_pic_poc_lsb_sps[i]) of a reference picture, and information (used_by_curr_pic_lt_sps_flag[i]) regarding whether or not this picture may be used as a reference picture of the target picture.

The POC of the reference picture may be a value of the POC itself associated with the reference picture. The least significant bit (LSB) of the POC, that is, a value of the remainder obtained by dividing the POC by 2 to the power of a predetermined value may be used as the POC of the reference picture.

(3. SH Short-Term RPS Information)

The SH short-term RPS information includes information of a single short-term reference picture set which can be used from pictures referring to the slice header.

Figure 7:
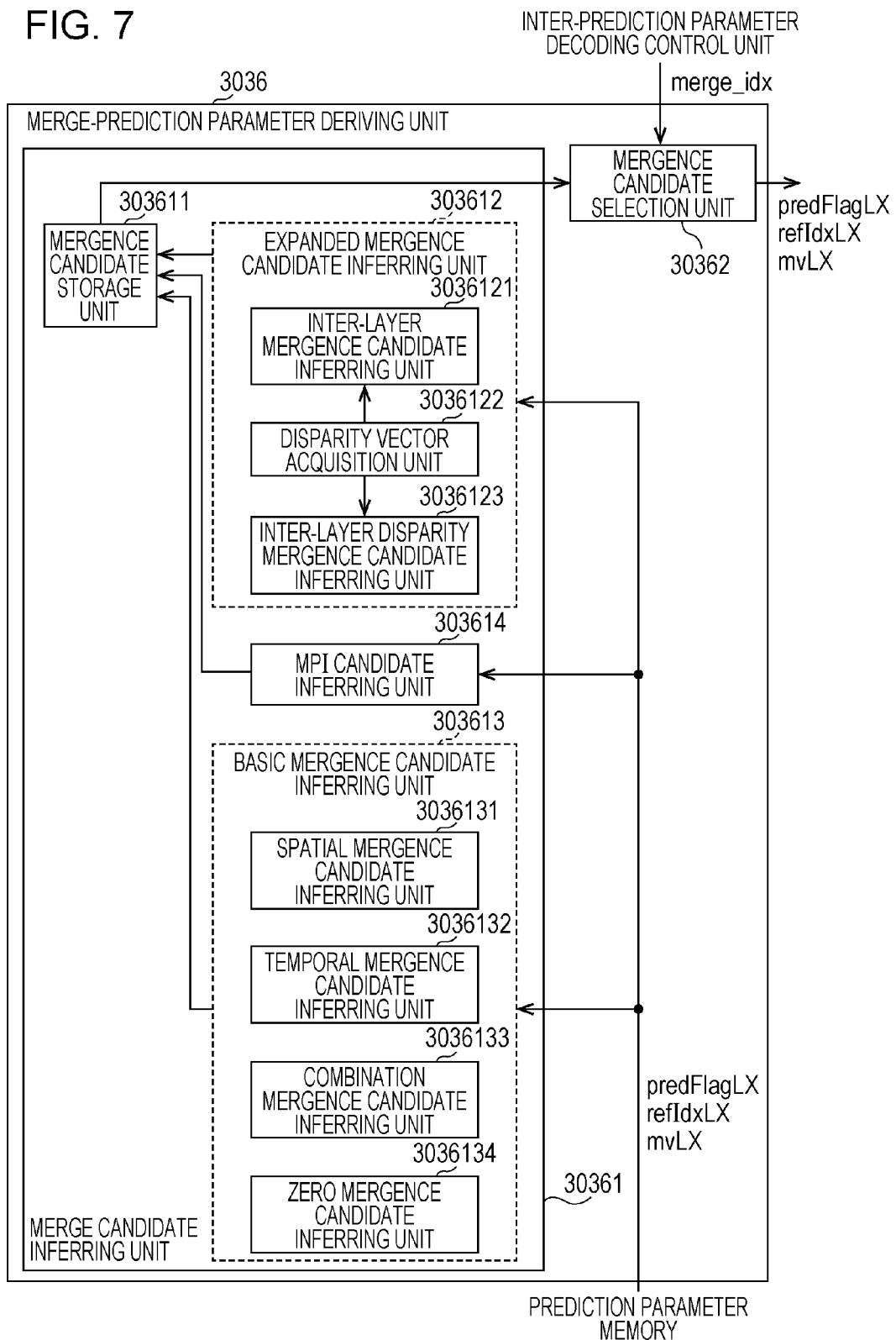
FIG. 7 is a schematic diagram illustrating a configuration of a mergence-prediction parameter deriving unit according to the embodiment.

Decoding of the SPS short-term RPS information will be described again with reference to FIG. 36. FIG. 36 illustrates a portion of the syntax table of a slice header used when the slice header is decoded, in the header decoding unit 10 and the reference picture information decoding unit 218. A part of (A) in FIG. 36 corresponds to the SH short-term RPS information. The SH short-term RPS information includes a flag (short_term_ref_pic_set_sps_flag) which indicates whether a short-term reference picture set is selected from a short-term reference picture set which has been decoded by using the SPS, or the short-term reference picture set is explicitly included in the slice header. In case of being selected from the short-term reference picture set which has been decoded by using the SPS, an identifier (short_term_ref_pic_set_idx) for selecting one of decoded short-term reference picture sets is included. In case of being explicitly included in the slice header, information corresponding to the above-described syntax table (short_term_ref_pic_set (idx)) which has been described with reference to FIG. 7 is included in the SPS short-term RPS information.

(4. SH Long-Term RP Information)

The SH long-term RP information includes information of a long-term reference picture which can be used from pictures referring to the slice header.

Decoding of the SH long-term RP information will be described again with reference to FIG. 36. A part of (B) in FIG. 36 corresponds to the SH long-term RP information. The SH long-term RP information is included in the slice header only in a case where a long-term reference picture is usable by the target picture (long_term_ref_pic_present_flag). In a case (num_long_term_ref_pics_sps>0) where one or more long-term reference pictures are completely decoded by using the SPS, the number (num_long_term_sps) of reference pictures which can be referred by the target picture, among long-term reference pictures which have been decoded by using the SPS is included in the SH long-term RP information. The number (num_long_term_pics) of long-term reference pictures which are obviously transmitted by using the slice header is included in the SH long-term RP information. In addition, information (lt_idx_sps[i]) is included in the SH long-term RP information. The information (lt_idx_sps[i]) is used for selecting long-term reference pictures of the number of num_long_term_sps from long-term reference pictures which have been transmitted by using the SPS. As information of the long-term reference picture which is explicitly included in the slice header, POCs (poc_lsb_lt [i]) of reference pictures corresponding to the number of num_long_term_pics and information regarding whether or not this picture may be used as a reference picture of the target picture (used_by_curr_pic_lt_flag[i]) are included.

(RPL Modification Information Decoding Processing)

The RPL modification information is information which is decoded by using the SPS or the slice header in order to construct a reference picture list RPL. The RPL modification information includes SPS list modification information and SH list modification information.

(SPS List Modification Information)

The SPS list modification information is information included in the SPS and is information relating to a restriction on modification of a reference picture list. The SPS list modification information will be described again with reference to FIG. 34. A part of (C) in FIG. 34 corresponds to the SPS list modification information. The SPS list modification information includes a flag (restricted_ref_pic_lists_flag) and a flag (lists_modification_present_flag).

The flag (restricted_ref_pic_lists_flag) indicates whether or not the reference picture list is commonly used for the previous slice included in a picture. The flag (lists_modification_present_flag) indicates whether or not information regarding list alignment is in the slice header.

(SH List Modification Information)

The SH list modification information is information included in the slice header. The SH list modification information includes update information of the length (reference list length) of a reference picture list applied to the target picture, and alignment information (reference list alignment information) of the reference picture list. The SH list modification information will be described with reference to FIG. 37. FIG. 37 illustrates a portion of the syntax table of a slice header used when the slice header is decoded, in the header decoding unit 10 and the reference picture information decoding unit 218. A part of (C) in FIG. 37 corresponds to the SH list modification information.

As the update information of a reference list length, a flag (num_ref_idx_active_override_flag) indicating whether or not the length of a list is updated is included. In addition, information (num_ref_idx_l0_active_minus1) and information (num_ref_idx_l1_active_minus1) are included. The information (num_ref_idx_l0_active_minus1) indicates the reference list length after a L0 reference list is updated. The information (num_ref_idx_l1_active_minus1) indicates the reference list length after a L1 reference list is updated.

Information which is included in a slice header and is used as the reference list alignment information will be described with reference to FIG. 38. FIG. 38 illustrates the syntax table of the reference list alignment information used when a slice header is decoded, in the header decoding unit 10 and the reference picture information decoding unit 218.

The reference list alignment information includes a flag (ref_pic_list_modification_flag_10) indicating whether or not a L0 reference list is aligned. In a case where a value of the flag is 1 (case where the L0 reference list is aligned) and NumPocTotalCurr is greater than 2, the reference list alignment information includes a L0 reference list alignment order (list_entry_10[i]). Here, NumPocTotalCurr is a variable indicating the number of reference pictures which are usable for the current picture. Accordingly, the slice header includes a L0 reference alignment order in a case where the number of reference pictures which are usable for the current picture is greater than 2 in a case where the L0 reference list is aligned.

Similarly, in a case where a reference picture is a B slice, that is, in a case where a L1 reference list is usable for the target picture, a L1 reference list alignment state flag (ref_pic_list_modification_flag_11) is included in the reference list alignment information. In a case where the value of the flag is 1 and NumPocTotalCurr is greater than 2, a L1 reference list alignment order (list_entry_11[i]) is included in the reference list alignment information. In other words, the slice header includes the L1 reference list alignment order only in a case where the number of reference pictures which are usable for the current picture is greater than 2 in a case where the L1 reference list is aligned.

(Details of Reference Picture Set Inferring Processing)

The process of S15 in the above-described video decoding procedures, that is, reference picture set inferring processing performed by the reference picture set setting unit will be described in detail.

As described above, the reference picture set setting unit 131 generates a reference picture set RPS used in decoding of a target picture, based on the RPS information and information recorded in the decoded picture buffer 12.

The reference picture set RPS is a set of pictures (referable pictures) which can be used as a reference image when decoding is performed, for a target picture or the subsequent picture in a decoding order. The reference picture set is classified into the following two subsets in accordance with the type of referable pictures.

Current picture referable list (ListCurr): list of referable pictures for the target picture, among pictures on the decoded picture buffer Subsequent picture referable list (ListFoll): list of pictures on the decoded picture buffer, which are not referred for the target picture, but are referable for a picture subsequent to the target picture in the decoding order The number of pictures included in the current picture referable list is referred to as a current-picture referable picture number (NumCurrList). NumPocTotalCurr which has been described above with reference to FIG. 38 is the same as NumCurrList.

The current picture referable list is configured from three partial lists.

Current picture long-term referable list (ListLtCurr): current-picture referable pictures designated by the SPS long-term RP information or the SH long-term RP information Current picture short-term forward referable list (ListStCurrBefore): current-picture referable pictures which are designated by the SPS short-term RPS information or the SH short-term RPS information, and are prior to the target picture in a display order Current picture short-term backward referable list (ListStCurrAfter): current-picture referable pictures which are designated by the SPS short-term RPS information or the SH short-term RPS information, and are prior to the target picture in the display order The subsequent picture referable list is configured from two partial lists Subsequent picture long-term referable list (ListLtFoll): subsequent-picture referable pictures designated by the SPS long-term RP information or the SH long-term RP information Subsequent picture short-term referable list (ListStFoll): current-picture referable pictures designated by the SPS short-term RPS information or the SH short-term RPS information In a case where the NAL unit type is not IDR, the reference picture set setting unit 131 generates a reference picture set RPS. That is, the reference picture set setting unit 131 generates the current picture short-term forward referable list (ListStCurrBefore), the current picture short-term backward referable list (ListStCurrAfter), the current picture long-term referable list (ListLtCurr), the subsequent picture short-term referable list (ListStFoll), and the subsequent picture long-term referable list (ListLtFoll) through the following procedures. In addition, the reference picture set setting unit 131 generates a variable (NumPocTotalCurr) which indicates the number of current-picture referable pictures. Each of the referable lists is assumed to be set to be null before the following processing is started. The reference picture set setting unit 131 infers a reference picture set RPS to be null, in a case where the NAL unit type is IDR.

(S201) A single short-term reference picture set used in decoding of the target picture is specified based on the SPS short-term RPS information and the SH short-term RPS information. Specifically, in a case where the value of short_term_ref_pic_set_sps included in the SH short-term RPS information is 0, a short-term RPS which is included in the SH short-term RPS information and is explicitly transmitted by using the slice header is selected. In other cases (case where the value of short_term_ref_pic_set_sps is 1), a short-term RPS which is included in the SH short-term RPS information and is indicated by short_term_ref_pic_set_idx is selected from a plurality of short-term RPSs included in the SPS short-term RPS information.

(S202) A value of a POC of each of reference pictures which are included in the selected short-term RPS is inferred. A position of a local decoded image which is recorded on the decoded picture buffer 12, in association with the value of the POC. The detected position is inferred as a recorded position of the reference picture on the decoded picture buffer.

In a case where a reference picture is a forward short-term reference picture, the value of the POC of the reference picture is inferred by subtracting a value of "delta_poc_s0_minus1[i]+1" from the value of the POC of the target picture. In a case where the reference picture is a backward short-term reference picture, the value of the POC of the reference picture is inferred by adding a value of "delta_poc_s1_minus1[i]+1" to the value of the POC of the target picture.

(S203) Forward reference pictures included in the short-term RPS are confirmed in an order of being transmitted. In a case where the value of used_by_curr_pic_s0_flag[i] which is associated therewith is 1, the forward reference picture is added to the current picture short-term forward referable list (ListStCurrBefore). In other cases (case where the value of used_by_curr_pic_s0_flag[i] is 0), the forward reference picture is added to the subsequent picture short-term referable list (ListStFoll).

(S204) Backward reference pictures included in the short-term RPS are confirmed in an order of being transmitted. In a case where the value of used_by_curr_pic_s1_flag[i] which is associated therewith is 1, the backward reference picture is added to the current picture short-term backward referable list (ListStCurrAfter). In other cases (case where the value of used_by_curr_pic_s1_flag[i] is 0), the forward reference picture is added to the subsequent picture short-term referable list (ListStFoll).

(S205) A long-term reference picture set used in decoding of the target picture is specified based on the SPS long-term RP information and the SH long-term RP information. Specifically, reference pictures corresponding to the value of num_long_term_ sps are selected from reference pictures which are included in the SPS long-term RP information and have a layer ID which is the same as the target picture. The selected reference pictures are sequentially added to the long-term reference picture set. Each of the selected reference pictures is a reference picture indicated by lt_idx_sps [i]. Then, reference pictures which correspond to the value of num_long_term_pics and are included in the SH long-term RP information are sequentially added to the long-term reference picture set. In a case where the layer ID of the target picture has a value other than 0, reference pictures which have a POC equal to the POC of the target picture are selected from pictures which have a layer ID different from the target picture, and the selected reference pictures are added to the long-term reference picture set.

(S206) A value of a POC of each of the reference pictures included in the long-term reference picture set is inferred. A position of a local decoded image which is recorded in association with the inferred value of the POC is detected based on reference pictures on the decoded picture buffer 12, which have a layer ID the same as the target picture. The detected position is inferred as a recorded position of the reference picture on the decoded picture buffer. Regarding a reference picture which has a layer ID different from the target picture, a position of a local decoded image which is recorded in association with the layer ID and the value of the POC of the target picture is detected, and the detected position is inferred as a recorded position of the reference picture on the decoded picture buffer.

Regarding a reference picture which has a layer ID the same as the target picture, a POC of a long-term reference picture is directly inferred from a value of poc_lst_lt[i] or a value of lt_ref_pic_poc_lsb_sps[i] which is decoded in association with the picture. Regarding a reference picture which has a layer ID different from the target picture, the POC of the target picture is set.

(S207) Reference pictures included in the long-term reference picture set are sequentially confirmed. In a case where a value of used_by_curr_pic_lt_flag[i] or a value of used_by_curr_pic_lt_sps_flag[i] which is associated with the picture is 1, the long-term reference picture is added to the current picture long-term referable list (ListLtCurr).

In other cases (case where the value of used_by_curr_pic_lt_flag[i] or used_by_curr_pic_lt_sps_flag[i] is 0), the long-term reference picture is added to the subsequent picture long-term referable list (ListLtFoll).

(S208) A value of the variable (NumPocTotalCurr) is set to the sum of reference pictures which are referable from the current picture. That is, the value of the variable (NumPocTotalCurr) is set to the sum of the number of elements in three lists, that is, the sum of the number of elements in the current picture short-term forward referable list (ListStCurrBefore), the number of elements in the current picture short-term backward referable list (ListStCurrAfter), and the number of elements in the current picture long-term referable list (ListLtCurr).

(Details of Reference Picture List Construction Processing)

The process of S16 in the decoding procedures, that is, reference picture list construction processing will be described in detail with reference to FIG. 1. As described above, the reference picture list inferring unit 132 generates a reference picture list RPL based on the reference picture set RPS and the RPL modification information.

The reference picture list is configured from two lists of the L0 reference list and the L1 reference list. Firstly, construction procedures of the L0 reference list will be described. The L0 reference list is constructed through the following procedures indicated by S301 to S307.

(S301) A provisional L0 reference list is generated and is initialized so as to be a null list.

(S302) Reference pictures included in the current picture short-term forward referable list are sequentially added to the provisional L0 reference list.

(S303) Reference pictures included in the current picture short-term backward referable list are sequentially added to the provisional L0 reference list.

(S304) Reference pictures included in the current picture long-term referable list are sequentially added to the provisional L0 reference list.

(S305) In a case where the reference picture list is modified (case where a value of lists_modification_present_flag included in the RPL modification information is 1), the following processes of S306a to S306b are performed. In case of not being modified (case where the value of lists_modification_present_flag is 0), the process of S307 is performed.

(S306a) The process of S306b is performed in the current-picture referable picture number (NumCurrList) is equal to 2 in a case where modification of the L0 reference picture is effective (case where a value of ref_pic_list_modification_flag_l0 included in the RPL modification information is 1). In case of not being effective, the process of S306c is performed.

(S306b) A value of a list alignment order (list_entry_l0 [i]) included in the RPL modification information is set by using the following expression, and then, the process of S306c is performed.

$$\text{list\_entry\_l0}[0]=1$$

$$\text{list\_entry\_l0}[1]=0$$

(S306c) Elements in the provisional L0 reference list are rearranged based on the value of the reference list alignment order (list_entry_l0[i]), and a result of the rearrangement is set as a L0 reference list. Elements (RefPicList0[rIdx]) in the L0 reference list corresponding to the reference picture index (rIdx) are inferred by using the following expression. Here, RefListTemp0[i] indicates an i-th element in the provisional L0 reference list.

$$\text{RefPicList0}[r\text{Idx}]=\text{RefPicListTemp0}[\text{list\_entry\_l0}[r\text{Idx}]]$$

According to the above expression, a value recorded at a position indicated by the reference picture index (rIdx) in the reference list alignment order (list_entry_l0[i]) is referred, and a reference picture recorded at a position of the recorded value in the provisional L0 reference list is stored as a reference picture at a position of rIdx in the L0 reference list.

(S307) The provisional L0 reference list is set as the L0 reference list.

Then, a L1 reference list is constructed. The L1 reference list may be constructed by using procedures similar to the L0 reference list. In the construction procedures (S301 to S307) of the L0 reference list, the L0 reference picture may be substituted with a L1 reference picture, the L0 reference list may be substituted with a L1 reference list, the provisional L0 reference list may be substituted with a provisional L1 reference list, and list_entry_10 may be substituted with list_entry_11.

In the above descriptions, FIG. 38 illustrates an example in which the RPL modification information is omitted in a case where the current-picture referable picture number is 2. However, it is not limited thereto. In a case where the current-picture referable picture number is 1, the RPL modification information may be omitted. Specifically, the reference picture information decoding unit 218 parses the reference list alignment information based on the syntax table illustrated in FIG. 39, in decoding processing of the SH list modification information. FIG. 39 illustrates a syntax table of reference list alignment information used when the slice header is decoded.

[Picture Decoding Unit 11]

The picture decoding unit 11 generates a local decoded image of each picture based on coded data #1, header information input by the header decoding unit 10, a reference picture recorded in the decoded picture buffer 12, a reference picture list input by the reference picture list inferring unit 132. The picture decoding unit 11 records the generated local decoded image in the decoded picture buffer 12.

Figure 5:
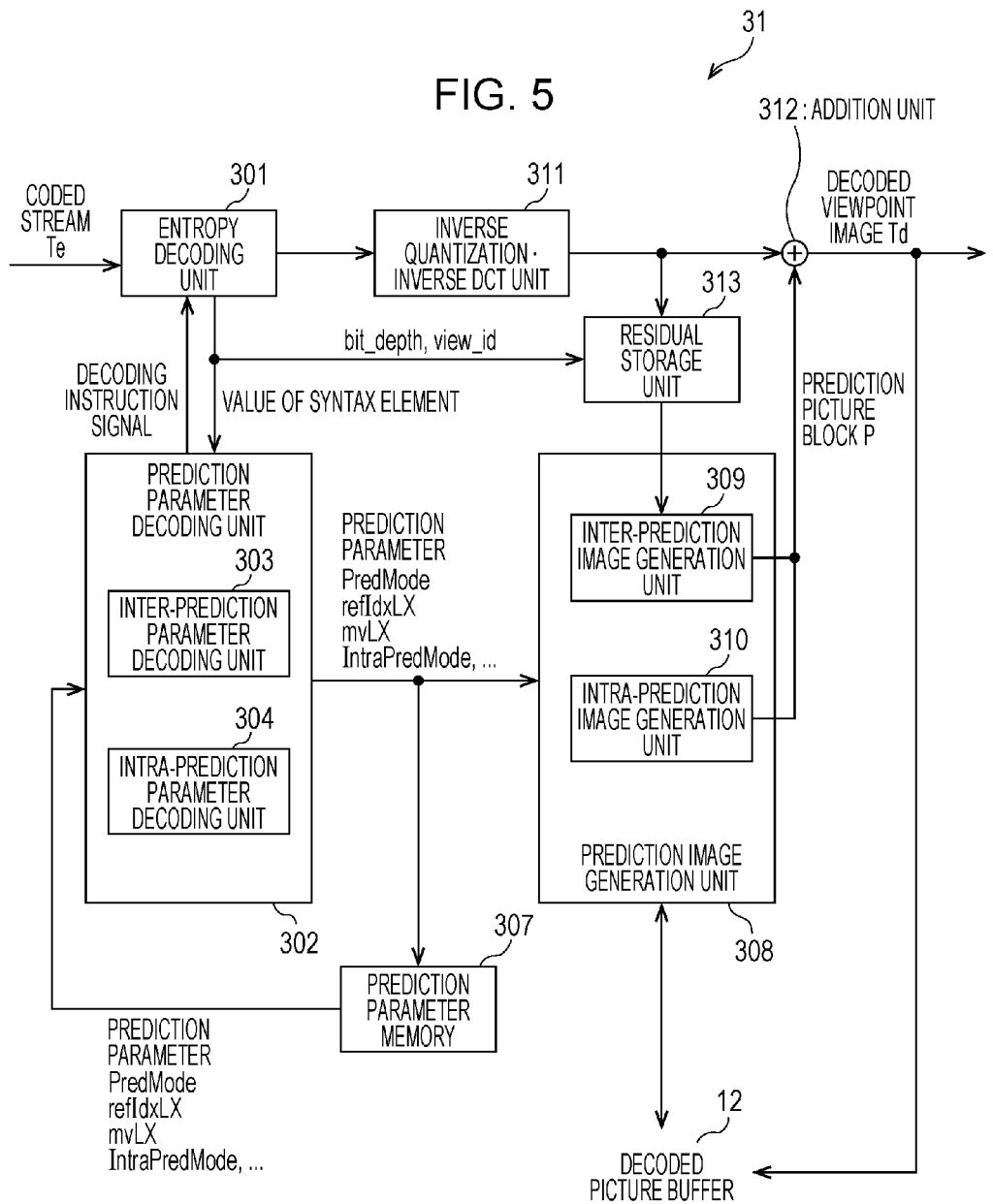
FIG. 5 is a schematic diagram illustrating a configuration of an image decoding device according to the embodiment.

FIG. 5 is a schematic diagram illustrating a configuration of the picture decoding unit 11 according to the embodiment. The picture decoding unit 11 includes an entropy decoding unit 301, a prediction parameter decoding unit 302, a prediction parameter memory (prediction parameter storage unit) 307, a prediction image generation unit 308, an inverse quantization•inverse DCT unit 311, and an addition unit 312.

The prediction parameter decoding unit 302 includes an inter-prediction parameter decoding unit 303 and an intra-prediction parameter decoding unit 304. The prediction image generation unit 308 includes an inter-prediction image generation unit 309 and an intra-prediction image generation unit 310.

The entropy decoding unit 301 performs entropy decoding on coded data #1 input from the outside. The entropy decoding unit 301 separates codes (syntax elements) from each other and performs decoding. As the separated codes, prediction information for generating a prediction image, residual information for generating a differential image, and the like are provided.

The entropy decoding unit 301 outputs some of the separated codes to the prediction parameter decoding unit 302. Examples of some of the separated codes includes a prediction mode (PredMode), a division mode (part_mode), a mergence flag (merge_flag), a mergence index (merge_idx), an inter-prediction flag (inter_pred_idx), a reference picture index (refIdxLX), a predictive vector index (mvp_LX_idx), and a differential vector (mvdLX). Selection of a code to be decoded and determination of whether or not a code is decoded is controlled based on an instruction of the prediction parameter decoding unit 302. The entropy decoding unit 301 outputs a quantization coefficient to the inverse quantization•inverse DCT unit 311. The quantization coefficient is a coefficient obtained by quantizing a residual signal in coding processing. In the quantization, discrete cosine transform (DCT) is performed.

The inter-prediction parameter decoding unit 303 decodes an inter-prediction parameter with reference to a prediction parameter stored in the prediction parameter memory 307, based on a code input from the entropy decoding unit 301.

The inter-prediction parameter decoding unit 303 outputs the decoded inter-prediction parameter to the prediction image generation unit 308 and causes the decoded inter-prediction parameter to be stored in the prediction parameter memory 307. Details of the inter-prediction parameter decoding unit 303 will be described later.

The intra-prediction parameter decoding unit 304 generates an intra-prediction parameter with reference to a prediction parameter stored in the prediction parameter memory 307, based on a code input from the entropy decoding unit 301. The intra-prediction parameter is information required when a prediction image of a decoding target block is generated by using intra-prediction. For example, the intra-prediction parameter is an intra-prediction mode (IntraPredMode).

The intra-prediction parameter decoding unit 304 decodes a depth intra-prediction mode (dmm_mode) from an input code. The intra-prediction parameter decoding unit 304 generates an intra-prediction mode (IntraPredMode) based on the following expression, by using the depth intra-prediction mode (dmm_mode).

$$IntraPredMode=dmm\_mode+35$$

In a case where the depth intra-prediction mode (dmm_mode) is 0 or 1, that is, in a case where the depth intra-prediction mode (dmm_mode) indicates MODE_DMM_WFULL or MODE_DMM_WFULLDELTA, the intra-prediction parameter decoding unit 304 decodes a wedgelet pattern index (wedge_full_tab_idx) from an input code.

In a case where the depth intra-prediction mode (dmm_mode) is MODE_DMM_WFULLDELTA or MODE_DMM_CPREDTEXDELTA, the intra-prediction parameter decoding unit 304 decodes a DC1 absolute value, a DC1 code, a DC2 absolute value, and a DC2 code from an input code. The depth intra-prediction mode (dmm_mode) causes a quantization offset (DC1DmmQuantOffsetDC1) and a quantization offset (DC2DmmQuantOffsetDC2) to be generated based on the DC1 absolute value, the DC1 code, the DC2 absolute value, and the DC2 code by using the following expressions.

$$DmmQuantOffsetDC1=(1-2*dmm\_dc\_1\_sign\_flag)*dmm\_dc\_1\_abs$$

$$DmmQuantOffsetDC2=(1-2*dmm\_dc\_2\_sign\_flag)*dmm\_dc\_2\_abs$$

The intra-prediction parameter decoding unit 304 sets the intra-prediction mode (IntraPredMode), a delta-end, the quantization offset (DC1DmmQuantOffsetDC1), the quantization offset (DC2DmmQuantOffsetDC2) which have been generated, and the decoded wedgelet pattern index (wedge_full_tab_idx) to be prediction parameters.

The intra-prediction parameter decoding unit 304 outputs the intra-prediction parameters to the prediction image generation unit 308, and causes the intra-prediction parameters to be stored in the prediction parameter memory 307.

The prediction parameter memory 307 stores the prediction parameters at positions which have been predetermined for each picture and each block of a decoding target. Specifically, the prediction parameter memory 307 stores the inter-prediction parameter decoded by the inter-prediction parameter decoding unit 303, the intra-prediction parameter decoded by the intra-prediction parameter decoding unit 304, and the prediction mode (predMode) separated by the entropy decoding unit 301. As the inter-prediction parameter stored in the prediction parameter memory 307, for example, the prediction list use flag (predFlagLX) (inter-prediction flag (inter_pred_idx)), the reference picture index (refIdxLX), and the vector (mvLX) are provided.

The prediction mode (predMode) which has been input from the entropy decoding unit 301 is input to the prediction image generation unit 308. The prediction parameter is input from the prediction parameter decoding unit 302 to the prediction image generation unit 308. The prediction image generation unit 308 reads a reference picture from the decoded picture buffer 12. The prediction image generation unit 308 generates a prediction picture block P (prediction image) by using the input prediction parameter and the read reference picture in a prediction mode indicated by the prediction mode (predMode).

Here, in a case where the prediction mode (predMode) indicates an inter-prediction mode, the inter-prediction image generation unit 309 generates a prediction picture block P through inter-prediction by using the inter-prediction parameter input from the inter-prediction parameter decoding unit 303 and the reference picture read by the prediction image generation unit. The prediction picture block P corresponds to a PU. The PU corresponds to a portion of a picture which is formed from a plurality of pixels and is set as a unit for performing prediction processing. That is, the PU corresponds to a decoding target block subjected to the prediction processing one time.

The inter-prediction image generation unit 309 reads a reference picture block from the decoded picture buffer 12. The reference picture block is formed by pictures from reference pictures indicated by reference picture indices (refIdxLX) in a reference picture list (L0 reference list or L1 reference list) in which the prediction list use flag (predFlagLX) is 1. The reference picture block is at a position indicated by the vector (mvLX) based on a decoding target block as a base. The inter-prediction image generation unit 309 performs prediction on the reference picture block which has been read, so as to generate a prediction picture block P. The inter-prediction image generation unit 309 outputs the generated prediction picture block P to the addition unit 312.

In a case where the prediction mode (predMode) indicates the intra-prediction mode, the intra-prediction image generation unit 310 performs intra-prediction by using the intra-prediction parameter input from the intra-prediction parameter decoding unit 304 and the reference picture which has been read. Specifically, the intra-prediction image generation unit 310 reads a reference picture block which is a picture of the decoding target, from the decoded picture buffer 12. Reference picture blocks in a predetermined range from the decoding target block are read out among blocks which have been already decoded. The predetermined range is, for example, any of the left adjacent block, the left upper adjacent block, the upper block, and the right upper block in a case where the decoding target block is sequentially moved in an order of so-called raster scan. The predetermined range varies depending on the intra-prediction mode. The order of raster scan is an order in which moving from the left end to the right end is sequentially performed for each of lines from the top to the bottom in each picture.

The intra-prediction image generation unit 310 generates a prediction picture block by using the reference picture block which has been read, and the input prediction parameter.

The intra-prediction image generation unit 310 outputs the generated prediction picture block P to the addition unit 312.

The inverse quantization•inverse DCT unit 311 performs inverse quantization on a quantization coefficient which has been input from the entropy decoding unit 301, so as to obtain a DCT coefficient. The inverse quantization•inverse DCT unit 311 performs inverse discrete cosine transform (inverse DCT) on the obtained DCT coefficient so as to calculate a decoded residual signal. The inverse quantization•inverse DCT unit 311 outputs the calculated decoded residual signal to the addition unit 312.

The addition unit 312 adds the prediction picture block P input from the inter-prediction image generation unit 309 and the intra-prediction image generation unit 310, and a signal value of the decoded residual signal input from the inverse quantization•inverse DCT unit 311, to each of pixels so as to generate a reference picture block. The addition unit 312 causes the generated reference picture block to be stored in the reference picture buffer 12. The addition unit 312 outputs a decoded layer image Td which is obtained by integrating generated reference picture blocks for each picture, to the outside.

(Configuration of Inter-Prediction Parameter Decoding Unit)

Next, a configuration of the inter-prediction parameter decoding unit 303 will be described.

Figure 6:
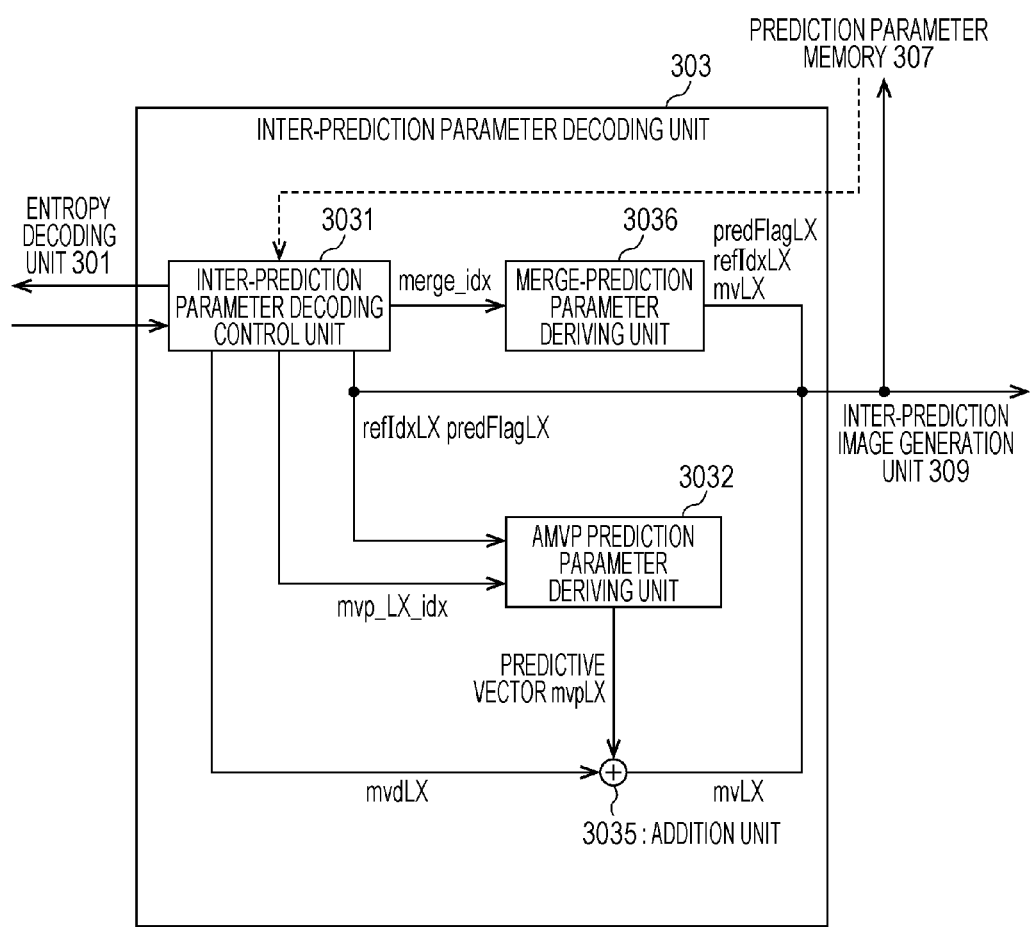
FIG. 6 is a schematic diagram illustrating a configuration of an inter-prediction parameter decoding unit according to the embodiment.

FIG. 6 is a schematic diagram illustrating the configuration of the inter-prediction parameter decoding unit 303 according to the embodiment. The inter-prediction parameter decoding unit 303 includes an inter-prediction parameter decoding control unit 3031, an AMVP prediction parameter deriving unit 3032, an addition unit 3035, and a merge-prediction parameter deriving unit 3036.

The inter-prediction parameter decoding control unit 3031 instructs the entropy decoding unit 301 to decode a code (syntax element) associated with inter-prediction, and extracts, for example, the division mode (part_mode), the mergence flag (merge_flag), the mergence index (merge_idx), the inter-prediction flag (inter_pred_idx), the reference picture index (refIdxLX), the predictive vector index (mvp_LX_idx), the differential vector (mvdLX), from codes (syntax element) included in coded data.

The inter-prediction parameter decoding control unit 3031 extracts the mergence flag, firstly. In case of being an expression that the inter-prediction parameter decoding control unit 3031 extracts a certain syntax element, the expression means that the inter-prediction parameter decoding control unit 3031 instructs the entropy decoding unit 301 to decode the certain syntax element and reads the syntax element from coded data. Here, in a case where the a value indicated by the mergence flag is 1, that is, a case where a mergence prediction mode is indicated, the inter-prediction parameter decoding control unit 3031 extracts the mergence index (merge_idx) as a prediction parameter relating to mergence prediction. The inter-prediction parameter decoding control unit 3031 outputs the extracted mergence index (merge_idx) to the merge-prediction parameter deriving unit 3036.

In a case where the mergence flag (merge_flag) is 0, that is, a case where an AMVP prediction mode is indicated, the inter-prediction parameter decoding control unit 3031 extracts an AMVP prediction parameter from coded data by using the entropy decoding unit 301. An example of the AMVP prediction parameter includes the inter-prediction flag (inter_pred_idc), the reference picture index (refIdxLX), the vector index (mvp_LX_idx), and the differential vector (mvdLX). The inter-prediction parameter decoding control unit 3031 outputs the prediction list use flag (predFlagLX) which has been inferred from the extracted inter-prediction flag (inter_pred_idx), and the reference picture index (refIdxLX) to the AMVP prediction parameter deriving unit 3032 and the prediction image generation unit 308 (FIG. 5). The inter-prediction parameter decoding control unit 3031 stores the flag (predFlagLX) and the index (refIdxLX) in the prediction parameter memory 307 (FIG. 5). The inter-prediction parameter decoding control unit 3031 outputs the extracted vector index (mvp_LX_idx) to the AMVP prediction parameter deriving unit 3032. The inter-prediction parameter decoding control unit 3031 outputs the extracted differential vector (mvdLX) to the addition unit 3035.

FIG. 7 is a schematic diagram illustrating a configuration of the merge-prediction parameter deriving unit 3036 according to the embodiment. The merge-prediction parameter deriving unit 3036 includes a mergence candidate inferring unit 30361 and a mergence candidate selection unit 30362. The mergence candidate inferring unit 30361 includes a mergence candidate storage unit 303611, an expanded mergence candidate inferring unit 303612, a basic mergence candidate inferring unit 303613, and a MPI candidate inferring unit 303614.

The mergence candidate storage unit 303611 stores mergence candidates which are input from the expanded mergence candidate inferring unit 303612 and the basic mergence candidate inferring unit 303613. Each of the mergence candidates includes the prediction list use flag (predFlagLX), the vector (mvLX), and the reference picture index (refIdxLX). In the mergence candidate storage unit 303611, indices are assigned to the stored mergence candidates in accordance with a predetermined rule. For example, "0" is assigned as an index to the mergence candidate which is input from the expanded mergence candidate inferring unit 303612 or the MPI candidate inferring unit 303614.

If a layer of a target block is a depth layer and motion parameter succession can be used, that is, in a case where the depth flag (depth_flag) and a motion parameter succession flag (use_mpi_flag) are commonly 1, the MPI candidate inferring unit 303614 infers the mergence candidates by using a motion compensation parameter of a layer which is different from the target layer. An example of the layer different from the target layer includes a picture of a texture layer which has the same view ID (view_id) and the same POC as a depth picture of a target.

The MPI candidate inferring unit 303614 reads a prediction parameter of a block (also referred to as a correspondence block) from the prediction parameter memory 307. The correspondence block is a block which has the same coordinates as the target block in a picture of a layer different from the target layer.

In a case where the size of the correspondence block is smaller than the target block, the MPI candidate inferring unit 303614 reads a split flag (split_flag) of a CTU which has the same coordinates as the target block in the corresponding texture picture, and prediction parameters of a plurality of blocks included in the CTU.

In a case where the size of the correspondence block is larger than the target block, the MPI candidate inferring unit 303614 reads a prediction parameter of the correspondence block.

The MPI candidate inferring unit 303614 outputs the prediction parameter which has been read to the mergence candidate storage unit 303611 as the mergence candidates.

In a case where the split flag (split_flag) of the CTU has been also read, this split information is also included in the mergence candidates.

The expanded mergence candidate inferring unit 303612 includes a disparity vector acquisition unit 3036122, an inter-layer mergence candidate inferring unit 3036121, and an inter-layer disparity mergence candidate inferring unit 3036123.

The expanded mergence candidate inferring unit 303612 infers mergence candidates, if the layer of the target block is not the depth layer or use of the motion parameter succession is not allowed, that is, in a case where either of the depth flag (depth_flag) and the motion parameter succession flag (use_mpi_flag) is 0. In a case where the depth flag (depth_flag) and the motion parameter succession flag (use_mpi_flag) are commonly 1, the expanded mergence candidate inferring unit 303612 may draw mergence candidates. In this case, the mergence candidate storage unit 303611 assigns different indices to the mergence candidates which are inferred by the expanded mergence candidate inferring unit 303612 and the MPI candidate inferring unit 303614.

Firstly, the disparity vector acquisition unit 3036122 sequentially acquires a disparity vector from a plurality of block candidates (for example, blocks which are adjacent leftwardly, upwardly, upper-rightwardly) which are adjacent to a decoding target block. Specifically, the disparity vector acquisition unit 3036122 selects one of the block candidates, and determines whether a vector of the selected block candidate is a disparity vector or a motion vector, by using a reference picture index (refIdxLX) of the block candidate. In a case where the selected block candidate has the disparity vector, the disparity vector acquisition unit 3036122 sets the vector as a disparity vector. In a case where the disparity vector is not included in the block candidate, the disparity vector acquisition unit 3036122 sequentially scans the next block candidate. In a case where the disparity vector is not included in the adjacent block, the disparity vector acquisition unit 3036122 attempts to acquire a disparity vector of a block at a position corresponding to the target block of a block which is included in a reference picture in another display order in time domain. In a case where acquiring the disparity vector is not possible, the disparity vector acquisition unit 3036122 sets a zero vector as the disparity vector. The disparity vector acquisition unit 3036122 outputs the disparity vector to the inter-layer mergence candidate inferring unit 3036121 and the inter-layer disparity mergence candidate inferring unit.

The inter-layer mergence candidate inferring unit 3036121 receives an input of the disparity vector from the disparity vector acquisition unit 3036122. The inter-layer mergence candidate inferring unit 3036121 selects a block indicated by the disparity vector which is input from the disparity vector acquisition unit 3036122. The selection is performed among pictures having the same POC as the decoding target picture of another layer (for example, base layer, base view). The inter-layer mergence candidate inferring unit 3036121 reads a prediction parameter which is a motion vector included in the block, from the prediction parameter memory 307. More specifically, the prediction parameter which is read by the inter-layer mergence candidate inferring unit 3036121 is a prediction parameter of a block which has coordinates obtained by adding the disparity vector to coordinates of a start point, when the center point of the target block is set as the start point.

Coordinates (xRef, yRef) of a reference block are inferred by using the following expression in a case where coordinates of the target block are (xP, yP), those of the disparity vector are (mvDisp[0], mvDisp[1]), the width and the height of the target block are respectively nPSW and nPSH.

$x$Ref=Clip3(0,PicWidthInSamples$_L$−1,$x$P+((nPSW−1)
>>1)+((mvDisp[0]+2)>>2))

$y$Ref=Clip3(0,PicHeightInSamples$_L$−1,$y$P+((nPSH−1)
>>1)+((mvDisp[1]+2)>>2))

The inter-layer disparity mergence candidate inferring unit 3036123 receives an input of the disparity vector from the disparity vector acquisition unit 3036122. The inter-layer disparity mergence candidate inferring unit 3036123 outputs the input disparity vector, and a reference picture index (refIdxLX) of a layer image which is a destination indicated by the disparity vector to the mergence candidate storage unit 303611 as a mergence candidate. The reference picture index (refIdxLX) is, for example, an index of a base layer image having the same POC as the decoding target picture. The mergence candidate is also described as an inter-layer mergence candidate (disparity prediction) which is an inter-layer candidate (inter-view candidate) for the disparity prediction.

The basic mergence candidate inferring unit 303613 includes a spatial mergence candidate inferring unit 3036131, a temporal mergence candidate inferring unit 3036132, a combination mergence candidate inferring unit 3036133, and a zero mergence candidate inferring unit 3036134.

The spatial mergence candidate inferring unit 3036131 reads a prediction parameter (prediction list use flag (predFlagLX), vector (mvLX), and reference picture index (refIdxLX)) which is stored in the prediction parameter memory 307, in accordance with a predetermined rule. The spatial mergence candidate inferring unit 3036131 infers the prediction parameter which has been read, as a mergence candidate. The prediction parameter which has been read is a prediction parameter relating to each of blocks (for example, all or some of blocks which respectively come into contact with a lower-left end, an upper-left end, and an upper-right end of the decoding target block) in a predetermined range from the decoding target block. The mergence candidate which has been inferred is stored in the mergence candidate storage unit 303611.

The temporal mergence candidate inferring unit 3036132 reads a prediction parameter of a block in a reference image including lower-right coordinates of the decoding target block, from the prediction parameter memory 307. The temporal mergence candidate inferring unit 3036132 sets the prediction parameter which has been read, as a mergence candidate. As a designation method of a reference image, for example, using the reference picture index (refIdxLX) which is in the slice header and designated, or performing designation by using the minimum among reference picture indices (refIdxLX) of blocks adjacent to the decoding target block may be provided. The mergence candidate which has been inferred is stored in the mergence candidate storage unit 303611.

The combination mergence candidate inferring unit 3036133 infers a mergence combination candidate by respectively setting vectors of two different inferred mergence candidates as vectors of L0 and L1, and combining the vectors with a reference picture index. The two different inferred mergence candidates have been already inferred and stored in the mergence candidate storage unit 303611. The mergence candidate which has been inferred is stored in the mergence candidate storage unit 303611.

The zero mergence candidate inferring unit 3036134 infers a mergence candidate for which the reference picture index (refIdxLX) is 0, and an X component and a Y component of the vector (mvLX) are commonly 0. The mergence candidate which has been inferred is stored in the mergence candidate storage unit 303611.

The mergence candidate selection unit 30362 selects a mergence candidate as the inter-prediction parameter of a target PU, among mergence candidates stored in the mergence candidate storage unit 303611. An index corresponding to the mergence index (merge_idx) which is input from the inter-prediction parameter decoding control unit 3031 is assigned to the selected mergence candidate. The mergence candidate selection unit 30362 stores the selected mergence candidate in the prediction parameter memory 307 (FIG. 5) and outputs the mergence candidate to the prediction image generation unit 308 (FIG. 5). In a case where the mergence candidate selection unit 30362 selects the mergence candidate which has been inferred by the MPI candidate inferring unit 303614, and the mergence candidates includes the split flag (split_flag), a plurality of prediction parameters corresponding to blocks which are obtained by performing split with the split flag (split_flag) is stored in the prediction parameter memory 307 and is output to the prediction image generation unit 308.

Figure 8:
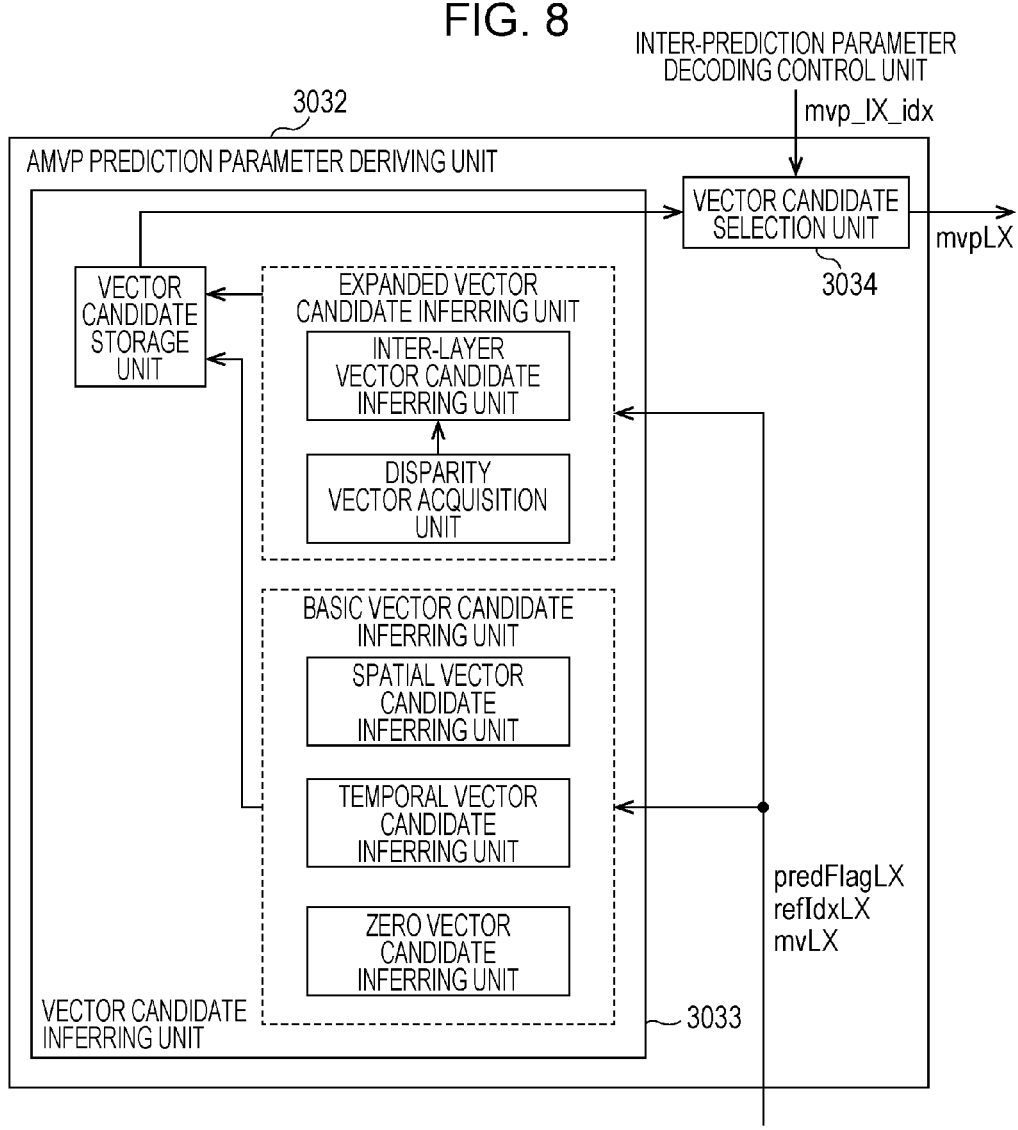
FIG. 8 is a schematic diagram illustrating a configuration of an AMVP prediction parameter deriving unit according to the embodiment.

FIG. 8 is a schematic diagram illustrating a configuration of the AMVP prediction parameter deriving unit 3032 according to the embodiment. The AMVP prediction parameter deriving unit 3032 includes a vector candidate inferring unit 3033 and a predictive vector selection unit 3034. The vector candidate inferring unit 3033 reads a vector (motion vector or disparity vector) which is stored in the prediction parameter memory 307 (FIG. 5), as a vector candidate based on the reference picture index (refIdx). The vector to be read is a vector relating to each of blocks (for example, all or some of blocks which respectively come into contact with a lower-left end, an upper-left end, and an upper-right end of the decoding target block) in a predetermined range from the decoding target block.

The predictive vector selection unit 3034 selects a vector candidate as the predictive vector (mvpLX) among vector candidates which have been read by the vector candidate inferring unit 3033. The selected vector candidate is a vector candidate indicated by the vector index (mvp_LX_idx) which is input from the inter-prediction parameter decoding control unit 3031. The predictive vector selection unit 3034 outputs the selected predictive vector (mvpLX) to the addition unit 3035.

Figure 9:
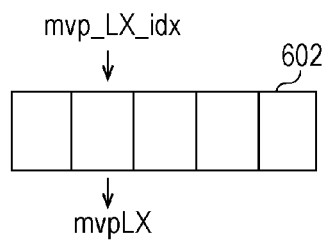
FIG. 9 is a conceptual diagram illustrating an example of candidates for a vector.

FIG. 9 is a conceptual diagram illustrating an example of the vector candidate. A predictive vector list 602 illustrated in FIG. 9 is a list formed from a plurality of vector candidates which are inferred by the vector candidate inferring unit 3033. In the predictive vector list 602, five rectangles which are horizontally arranged in series indicate areas which respectively indicate predictive vectors. A downward arrow just under mvp_LX_idx which is positioned secondly from the left end, and mvpLX under the downward arrow indicate that the vector index (mvp_LX_idx) is an index referring to the vector (mvpLX) in the prediction parameter memory 307.

The vector candidate refers to a block (for example, adjacent block) which is a completely-decoded block and is in a predetermined range from the decoding target block, and is generated based on a vector relating to the referring block. An example of the adjacent block includes a block which is spatially adjacent to the target block, and a block which is adjacent to the target block in time domain. An example of the block which is spatially adjacent to the target block includes the left block and an upper block. An example of the a block which is adjacent to the target block in time domain includes a block obtained from blocks which are disposed at the same position as the target block and have display time different from each other.

The addition unit 3035 adds the predictive vector (mvpLX) which is input from the predictive vector selection unit 3034, and the differential vector (mvdLX) which is input from the inter-prediction parameter decoding control unit, to each other so as to calculate a vector (mvLX). The addition unit 3035 outputs the calculated vector (mvLX) to the prediction image generation unit 308 (FIG. 5).

(Configuration of Inter-Prediction Parameter Decoding Control Unit)

Figure 10:
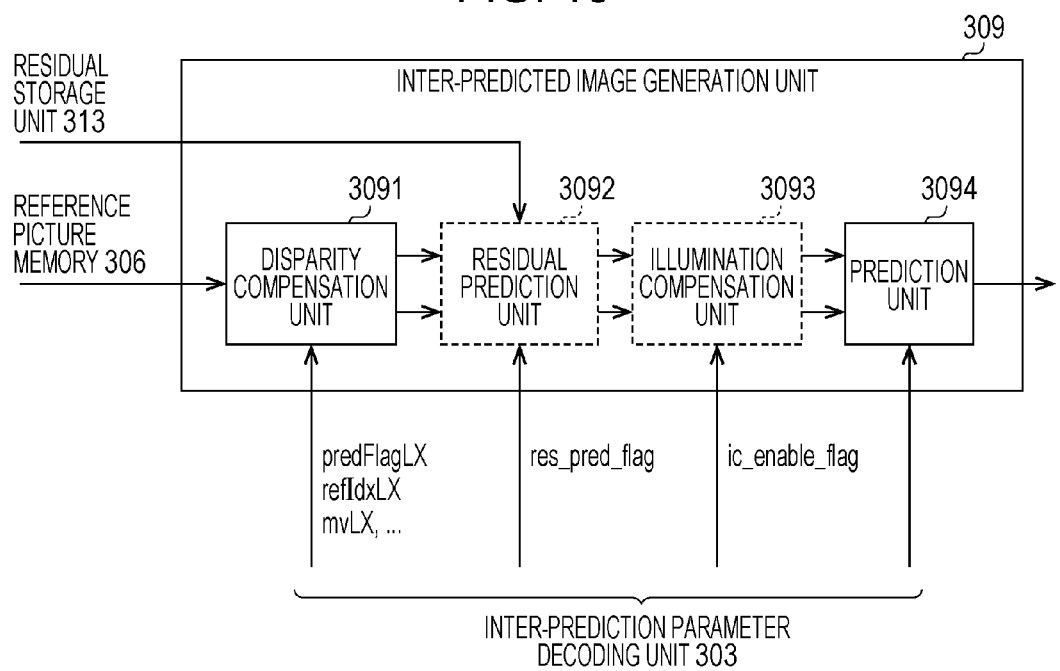
FIG. 10 is a schematic diagram illustrating a configuration of an inter-prediction image generation unit according to the embodiment.

Next, a configuration of the inter-prediction parameter decoding control unit 3031 will be described. The inter-prediction parameter decoding control unit 3031 includes a mergence index decoding unit 30312, a vector-candidate index decoding unit 30313 (as illustrated in FIG. 10), a division mode decoding unit, a mergence flag decoding unit, an inter-prediction flag decoding unit, a reference picture index decoding unit, and a vector difference decoding unit (which are not illustrated in FIG. 10). The division mode decoding unit decodes the division mode (part_mode). The mergence flag decoding unit decodes the mergence flag (merge_flag). The mergence index decoding unit decodes the mergence index (merge_idx). The inter-prediction flag decoding unit decodes the inter-prediction flag (inter_pred_idx). The reference picture index decoding unit decodes the reference picture index (refIdxLX). The vector-candidate index decoding unit 30313 decodes the predictive vector index (mvp_LX_idx). The vector difference decoding unit decodes the differential vector (mvdLX).

The additional prediction-flag decoding unit 30311 includes an additional prediction-flag determination unit 30314 therein. The additional prediction-flag determination unit 30314 determines whether or not coded data includes an additional prediction flag (xpred_flag), that is, whether or not the additional prediction flag (xpred_flag) is read and decoded from the coded data. In a case where the additional prediction-flag determination unit 30314 determines that the additional prediction flag is included in the coded data, the additional prediction-flag decoding unit 30311 notifies the entropy decoding unit 301 to decode the additional prediction flag. Then, the additional prediction-flag decoding unit 30311 extracts a syntax element corresponding to the additional prediction flag, from the coded data through the entropy decoding unit 301. Conversely, in a case where the additional prediction-flag determination unit 30314 determines that the additional prediction flag is not included in the coded data, the additional prediction-flag determination unit 30314 infers a value (here, 1) indicating additional prediction to the additional prediction flag. The additional prediction-flag determination unit 30314 will be described later.

(Disparity Vector Acquisition Unit)

In a case where a block adjacent to the target PU has a disparity vector, the disparity vector acquisition unit extracts the disparity vector from the prediction parameter memory 307. The disparity vector acquisition unit reads a prediction flag (predFlagLX) of the block adjacent to the target PU, the reference picture index (refIdxLX), and the vector (mvLX) with reference to the prediction parameter memory 307. The disparity vector acquisition unit sequentially reads the prediction parameter of a block adjacent to the target PU, and determines whether or not the adjacent block includes a disparity vector, based on the reference picture index of the adjacent block. In a case where the adjacent block includes the disparity vector, the disparity vector acquisition unit outputs the disparity vector. In a case where the adjacent block includes does not include any disparity vector as the prediction parameter, the disparity vector acquisition unit outputs a zero vector as the disparity vector.

(Inter-Prediction Image Generation Unit 309)

FIG. 10 is a schematic diagram illustrating a configuration of the inter-prediction image generation unit 309 according to the embodiment. The inter-prediction image generation unit 309 includes a motion disparity compensation unit 3091, a residual prediction unit 3092, an illumination compensation unit 3093, and a weighted-prediction unit 3094.

(Motion Disparity Compensation)

The motion disparity compensation unit 3091 reads a block from a reference picture memory 306, and generates a motion disparity compensation image based on the prediction list use flag (predFlagLX), the reference picture index (refIdxLX), and the motion vector (mvLX) which are input from the inter-prediction parameter decoding unit 303. The block which has been read is a block at a position shifted by the vector (mvLX), by using a position of the target block of a reference picture designated by the reference picture index (refIdxLX), as a start point. Here, in a case where the vector (mvLX) is not an integer vector, the motion disparity compensation unit 3091 performs filtering which is referred to as motion compensation filtering (or disparity compensation filtering) and is used for generating a pixel at a decimal position, so as to generate a motion disparity compensation image. Generally, in a case where the vector (mvLX) is a motion vector, such processing is referred to as motion compensation. In case of being a disparity vector, such processing is referred to as disparity compensation. Herein, the terms are integrated so as to be expressed as motion disparity compensation. A motion disparity compensation image for L0 prediction is referred to as predSamplesL0 below. A motion disparity compensation image for L1 prediction is referred to as predSamplesL1 below. In a case where predSamplesL0 and predSamplesL1 are not required to be distinguished from each other, the motion disparity compensation image is referred to as predSamplesLX. An example in which a motion disparity compensation image (predSamplesLX) which is obtained by the motion disparity compensation unit 3091 is subjected to residual prediction and illumination compensation will be described below. However, an output image obtained by performing the residual prediction and the illumination compensation is also referred to as the motion disparity compensation image (predSamplesLX). In a case where an input image and an output image are required to be distinguished from each other in the residual prediction and the illumination compensation below, the input image is expressed as predSamplesLX and the output image is expressed as predSamplesLX'.

(Residual Prediction)

The residual prediction unit 3092 performs residual prediction on the input motion disparity compensation image (predSamplesLX) in a case where a residual prediction carrying flag (resPredFlag) is 1. In a case where the residual prediction carrying flag (resPredFlag) is 0, the residual prediction unit 3092 outputs the input motion disparity compensation image (predSamplesLX) itself. The refResSamples residual prediction is performed by adding a residual of a reference layer (first layer image) from a target layer (second layer image), to the motion disparity compensation image predSamplesLX which is obtained by predicting the target layer. The target layer is a target of prediction image generation. That is, a residual of the reference layer which has been already inferred is used as an estimation value of the residual of the target layer on the assumption that a residual similar to the reference layer also occurs in the target layer. In a base layer (base view), only an image of the same layer is used as the reference image.

(Illumination Compensation)

In a case where an illumination compensation flag (ic_enable_flag) is 1, the illumination compensation unit 3093 performs illumination compensation on the input motion disparity compensation image (predSamplesLX). In a case where the illumination compensation flag (ic_enable_flag) is 0, the illumination compensation unit 3093 outputs the input motion disparity compensation image (predSamplesLX) itself. In a case where residual prediction is OFF, the motion disparity compensation image (predSamplesLX) which is input to the illumination compensation unit 3093 is an output image of the motion disparity compensation unit 3091. In a case where residual prediction is ON, the motion disparity compensation image (predSamplesLX) is an output image of the residual prediction unit 3092.

(Weighted Prediction)

The weighted-prediction unit 3094 generates a prediction picture block P (prediction image) by multiplying the input motion disparity image (predSamplesLX) by a weighting coefficient. In a case where the residual prediction and the illumination compensation are performed, the input motion disparity image (predSamplesLX) corresponds to an image subjected to the residual prediction and the illumination compensation. In a case where one (predFlagL0 or predFlagL1) of the reference list use flags is 1 (case of uni-directional prediction), processing by using the following expression is performed in case of not using weighted prediction. In such processing, the input motion disparity image (predSamplesLX) (LX is L0 or L1) is caused to match with the number of pixel bits.

predSamples[x][y]=Clip3(0,(1<<bitDepth)−1,(predSamplesLX[x][y]+offset1)>>shift1)

Here, expressions of shift1=14-bitDepth, and offset1=1<<(shift1-1) are satisfied.

In a case where both (predFlagL0 and predFlagL1) of the reference list use flags are 1 (case of bi-directional prediction), processing by using the following expression is performed in case of not using the weighted prediction. In such processing, the input motion disparity images predSamplesL0 and predSamplesL1 are averaged so as to be caused to match with the number of pixel bits.

predSamples[x][y]=Clip3(0,(1<<bitDepth)−1,(predSamplesL0[x][y]+predSamplesL1[x][y]+offset2)>>shift2)

Here, expressions of shift2=15-bitDepth and offset2=1<<(shift2-1) are satisfied.

In case of the uni-directional prediction, and in case of performing the weighted prediction, the weighted-prediction unit 3094 infers a weighted prediction coefficient w0 and an offset o0 and performs processing by using the following expression.

predSamples[x][y]=Clip3(0,(1<<bitDepth)−1,((predSamplesLX[x][y]*w0+2 log 2WD−1)>>log 2WD)+o0)

Here, log 2WD is a variable indicating a predetermined shift quantity.

In case of the bi-directional prediction, and in case of performing the weighted prediction, the weighted-prediction unit 3094 infers weighted prediction coefficients w0, w1, o0, and o1, and performs processing by using the following expression.

predSamples[x][y]=Clip3(0,(1<<bitDepth)−1,(predSamplesL0[x][y]*w0+predSamplesL1[x][y]*w1+((o0+o1+1)<<log 2WD))>>(log 2WD+1))

[Image Coding Device]

Figure 25:
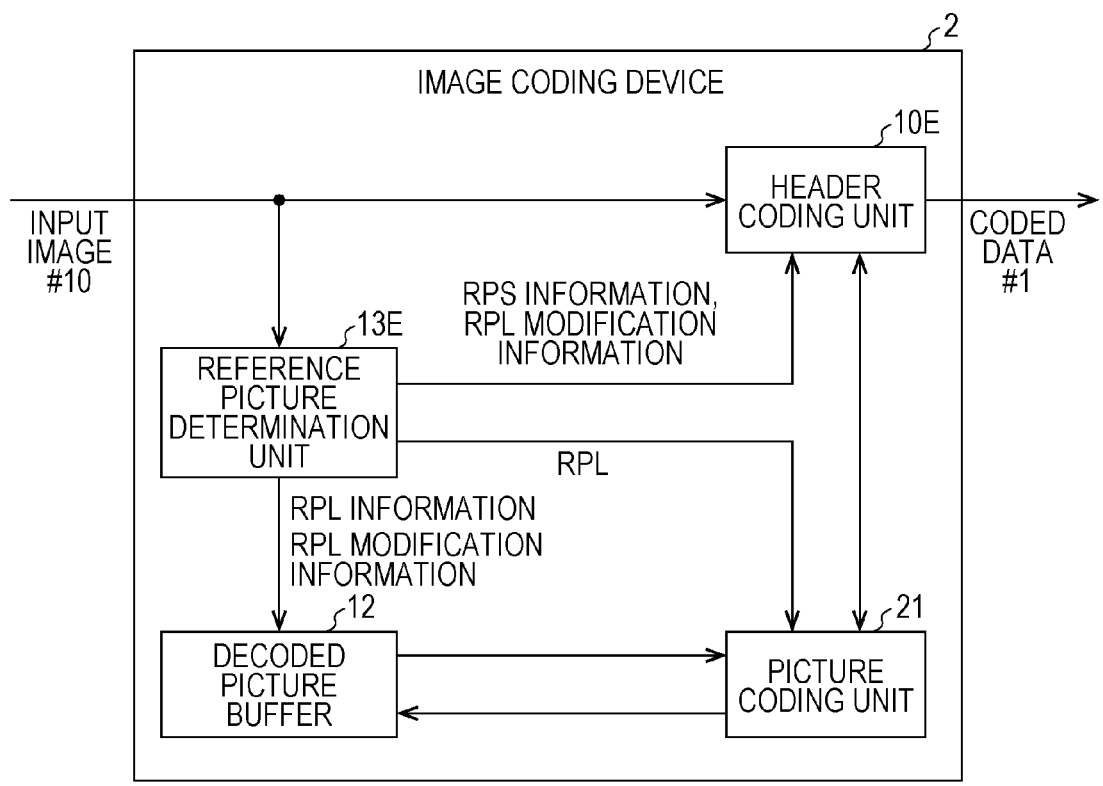
FIG. 25 is a schematic diagram illustrating a configuration of an image coding device according to the embodiment.

The image coding device 2 according to the embodiment will be described below with reference to FIG. 25.

(Outline of Image Coding Device)

Schematically, the image coding device 2 is a device that codes an input image #10 so as to generate coded data #1 and output the generated coded data #1.

(Configuration of Image Coding Device)

A configuration example of the image coding device 2 according to the embodiment will be described. FIG. 25 is a schematic diagram illustrating a configuration of the image coding device 2 according to the embodiment. The image coding device 2 includes a header coding unit 10E, a picture coding unit 21, a decoded picture buffer 12, and a reference picture determination unit 13E. The image coding device 2 allows random access decoding processing (which will be described later) to be performed. In the random access decoding processing, regarding an image including a plurality of layers, decoding is started from a picture at a specific point of time.

[Header Coding Unit 10E]

The header coding unit 10E generates information based on the input image #10, codes the generated information, and outputs the coded information. The generated information is used in decoding of a NAL unit header, an SPS, a PPS, and a slice header in a unit of a NAL unit, a unit of sequence, a unit of a picture, or a unit of a slice.

The header coding unit 10E parses the VPS and SPS included in the coded data #1, based on a predetermined syntax definition, so as to code information used in decoding in a unit of a sequence. For example, information regarding the number of layers is coded by using the VPS, and information associated with the image size of a decoded image is coded by using the SPS.

The header coding unit 10E parses the slice header included in the coded data #1, based on a predetermined syntax definition, so as to code information used in decoding in a unit of a slice. For example, a slice type is coded from the slice header.

The header coding unit 10E changes the syntax and codes the changed syntax in a case where a layer indicated by the layer ID is not an independent layer.

The header coding unit 10E may code additional syntax, instead of a change of the syntax.

In addition, the header coding unit 10E may skip to code the syntax, instead of a change of the syntax. That is, the header coding unit 10E may code the syntax only in a case where a layer indicated by the layer ID is an independent layer or the layer ID is 0.

The header coding unit 10E includes a NAL unit header coding unit 211E, a dependency layer information coding unit, a profile level information coding unit, a representation information coding unit, a scaling list coding unit, a POC information coding unit 2105E, and a reference picture information coding unit 218E.

[NAL Unit Header Coding Unit 211E]

The NAL unit header coding unit 211E includes a layer ID coding unit and a NAL unit type coding unit.

The layer ID coding unit codes a layer ID. The NAL unit type coding unit codes a NAL unit type.

[Dependency Layer Information Coding Unit]

The dependency layer information coding unit codes dependency layer information of each layer and codes representation information of each layer, based on a syntax definition defined from the VPS and the VPS extension.

[Profile Level Information Coding Unit]

The profile level information coding unit codes profile level information of each layer, and causes the coded profile level information to be included in the VPS. The profile level information coding unit codes profile level information of an independent layer and a layer in which the layer ID in the SPS is 0, and causes the coded profile level information to be included in the SPS.

[Representation Information Coding Unit]

The representation information coding unit codes the syntax in FIG. 28(a) and causes the coded syntax to be included in the VPS, and codes the syntax in FIG. 28(b) and causes the coded syntax to be included in the SPS.

Specifically, the representation information coding unit codes rep_format( ) and causes rep_format( ) to be included in the VPS. The representation information coding unit codes representation information and causes the coded representation information to be included in the VPS. Examples of the representation information include chroma_format_idc, separate_colour_plane_flag, pic_width_in_luma_samples, pic_height_in_luma_samples, bit_depth_luma_minus8, and bit_depth_chroma_minus8.

The representation information coding unit codes a representation information update flag (update_rep_format_flag) and causes the coded representation information update flag (update_rep_format_flag) to be included in the SPS, in a case where a layer indicated by the layer ID (nuh_layer_id) in the SPS is not an independent layer. In a case where the coded representation information update flag (update_rep_format_flag) is 1, the representation information coding unit codes representation information and causes the coded representation information to be included in the SPS. Examples of the representation information include chroma_format_idc, separate_colour_plane_flag, pic_width_in_luma_samples, pic_height_in_luma_samples, bit_depth_luma_minus8, and bit_depth_chroma_minus8.

[Scaling List Coding Unit]

The scaling list coding unit codes sps_infer_scaling_list_flag in a case where a layer indicated by the layer ID (nuh_layer_id) in the SPS is not an independent layer. The scaling list coding unit codes sps_scaling_list_ref_layer_id and causes sps_scaling_list_ref_layer_id to be included in the SPS, in a case where sps_infer_scaling_list_flag is not 0. In a case where sps_infer_scaling_list_flag is 0, the scaling list coding unit codes sps_scaling_list_data_present_flag and scaling_list_data( ) and causes sps_scaling_list_data_present_flag and scaling_list_data( ) to be included in the SPS. Similarly, the scaling list coding unit codes pps_infer_scaling_list_flag in a case where a layer indicated by the layer ID (nuh_layer_id) in the PPS is not an independent layer. In a case where pps_infer_scaling_list_flag is not 0, the scaling list coding unit codes sps_scaling_list_ref_layer_id and causes sps_scaling_list_ref_layer_id to be included in the PPS. In a case where pps_infer_scaling_list_flag is 0, the scaling list coding unit codes pps_scaling_list_data_present_flag and scaling_list_data( ) and causes pps_scaling_list_data_present_flag and scaling_list_data( ) to be included in the PPS.

[Reference Picture Determination Unit 13E]

The reference picture determination unit 13E includes a reference picture information coding unit 218E, a reference picture set determination unit 24, and a reference picture list determination unit 25 therein.

The reference picture set determination unit 24 determines a reference picture set RPS based on the input image #10 and a local decoded image recorded in the decoded picture buffer 12, and outputs the determined reference picture set RPS. The reference picture set RPS is used in coding and local decoding of a coding target picture.

The reference picture list determination unit 25 determines a reference picture list RPL based on the input image #10 and the reference picture set, and outputs the determined reference picture list RPL. The reference picture list RPL is used in coding and local decoding of the coding target picture.

[Reference Picture Information Coding Unit 218E]

The reference picture information coding unit 218E performs reference picture information coding processing based on the reference picture set RPS and the reference picture list RPL which are included in the header coding unit 10E, and generates RPS information and RPL modification information which are included in the SPS and the slice header.

(Correspondence Relationship with Image Decoding Device)

The image coding device 2 includes components corresponding to the components of the image decoding device 1. Here, the correspondence means that the components of the image coding device 2 and the components of the image decoding device 1 have a relationship of performing similar processing or reverse processing.

For example, reference picture information decoding processing of the reference picture information decoding unit 218 included in the image decoding device 1 is similar to reference picture information coding processing of the reference picture information coding unit 218E included in the image coding device 2. More specifically, the reference picture information decoding unit 218 generates RPS information or modification RPL information as a syntax value to be decoded from the SPS or the slice header. On the contrary, the reference picture information coding unit 218E codes the RPS information or modification RPL information which has been input, as a syntax value of the SPS and the slice header.

For example, processing of decoding the syntax value from a bit sequence in the image decoding device 1 corresponds to processing of coding the bit sequence from the syntax value in the image coding device 2, as reverse processing.

(Flow of Processing)

Procedures in which the image coding device 2 generates the coded data #1 as an output, from the input image #10 are as follows.

(S21) The following processes of S22 to S29 are performed on each (target picture) of pictures constituting the input image #10.

(S22) The reference picture set determination unit 24 determines a reference picture set RPS based on the target picture in the input image #10 and a local decoded image recorded in the decoded picture buffer 12. The reference picture set determination unit 24 outputs the determined reference picture set RPS to the reference picture list determination unit 25. The reference picture set determination unit 24 infers RPS information necessary for generating the reference picture set RPS, and outputs the inferred RPS information to the reference picture information coding unit 218E.

(S23) The reference picture list determination unit 25 infers a reference picture list RPL based on the target picture in the input image #10 and the reference picture set RPS which has been input. The reference picture list determination unit 25 outputs the inferred reference picture list RPL to the picture coding unit 21 and the picture decoding unit 11. The reference picture list determination unit 25 infers RPL modification information necessary for generating the reference picture list RPL, and outputs the inferred RPL modification information to the reference picture information coding unit 218E.

(S24) The reference picture information coding unit 218E generates RPS information and RPL modification information for being included in the SPS or the slice header, based on the reference picture set RPS and the reference picture list RPL.

(S25) The header coding unit 10E generates and outputs an SPS for being applied to the target picture, based on the input image #10, and the RPS information and the RPL modification information which have been generated by the reference picture determination unit 13E.

(S26) The header coding unit 10E generates and outputs a PPS for being applied to the target picture, based on the input image #10.

(S27) The header coding unit 10E codes a slice header of each of slices constituting the target picture, based on the input image #10, and the RPS information and the RPL modification information which are generated by the reference picture determination unit 13E. The header coding unit 10E outputs the coded slice header as a portion of coded data #1 to the outside, and to the picture decoding unit 11.

(S28) The picture coding unit 21 generates slice data of each of the slices constituting the target picture, based on the input image #10, and outputs the generated slice data as a portion of the coded data #1 to the outside.

(S29) The picture coding unit 21 generates a local decoded image of the target picture and causes the generated local decoded image in association with the layer ID and a POC of the target picture, to be recorded in the decoded picture buffer.

[POC Information Coding Unit 2105E]

Figure 40:
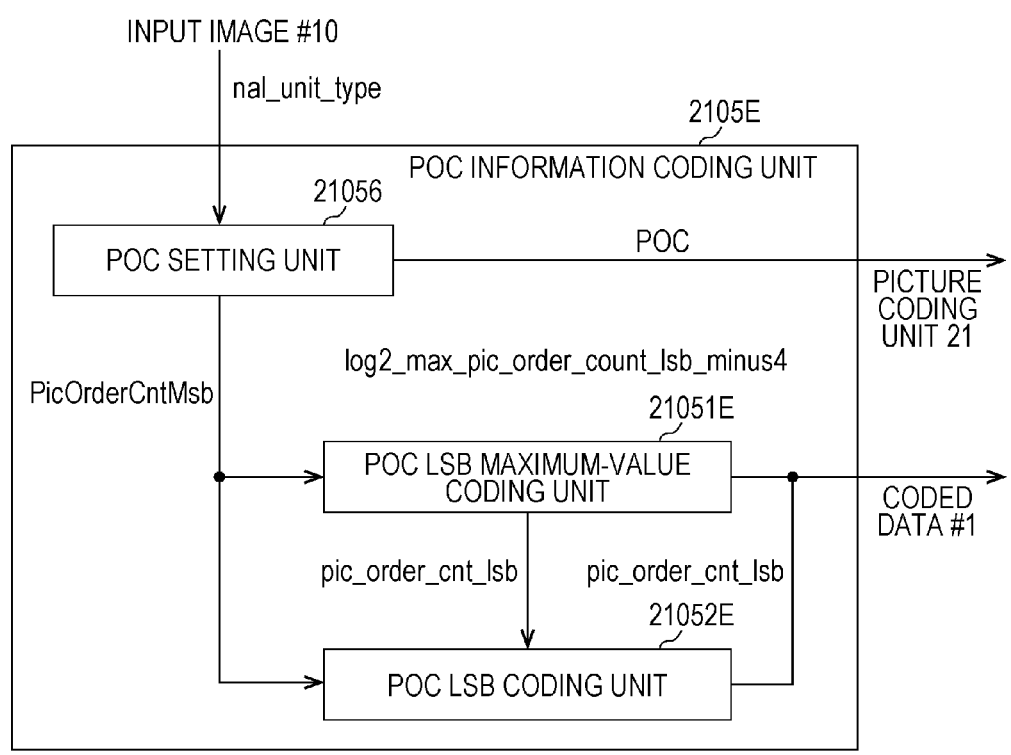
FIG. 40 is a schematic diagram illustrating a configuration of a POC information coding unit according to the embodiment of the present invention.

FIG. 40 is a functional block diagram illustrating a schematic configuration of the POC information coding unit 2105E. As illustrated in FIG. 40, the POC information coding unit 2105E includes a POC setting unit 21056, a POC LSB maximum-value coding unit 21051E, and a POC LSB coding unit 21052E. The POC information coding unit 2105E performs separation into a higher bit (PicOrderCnt-Msb) of the POC and a lower bit (pic_order_cnt_lsb) of the POC and performs coding.

The POC setting unit 21056 sets common time (TIME) for all pictures of layers at the same time. The POC setting unit 21056 sets a POC of the target picture based on time (TIME) (common time (TIME)) of the target picture. Specifically, in a case where a picture of the target layer is a RAP picture for coding a POC (BLA or IDR), the POC setting unit 21056 sets the POC to 0, and sets TIME at this time in a variable (TIME_BASE). TIME_BASE is recorded in the POC setting unit 21056.

In a case where a picture of the target layer is not the RAP picture for coding the POC, a value obtained by subtracting TIME_BASE from TIME is set to the POC.

The POC LSB maximum-value coding unit 21051E sets a common POC LSB maximum value (MaxPicOrderCntLsb) in all layers. The POC LSB maximum-value coding unit 21051E codes the POC LSB maximum value (MaxPicOrderCntLsb) which is set in the coded data #1. Specifically, the POC LSB maximum-value coding unit 21051E codes a value obtained by subtracting 4 (integer) from logarithm of the POC LSB maximum value (MaxPicOrderCntLsb), as log 2_max_pic_order_cnt_lsb_minus4.

Regarding pictures of a plurality of layers which have the same time (output time), display time POC (POC higher bit) is updated at the same time. Thus, pictures of the plurality of layers which have the same time (output time) can have display time POC. Accordingly, reference picture management in a case where a picture of a layer different from the target layer is used as a reference picture in the reference picture list can be performed. In a case, such as three-dimensional image reproduction, where a plurality of layers is synchronized with each other and is reproduced, and in a case, for example, where a display timing is managed by using time of the picture, management of being a picture at the same time can be performed by using the POC. Thus, an effect is obtained in that the reference picture is easily searched for and synchronized.

The POC LSB coding unit 21052E codes a POC lower bit (pic_order_cnt_lsb) of the target picture from the POC of the target picture which has been input from the POC setting unit 21056. Specifically, the POC lower bit (pic_order_cnt_lsb) is obtained by using the remainder obtained by the POC LSB maximum value (MaxPicOrderCntLsb) of the input POC, and by using POC % MaxPicOrderCntLsb (or POC&(MaxPicOrderCntLsb−1)). The POC LSB coding unit 21052E codes pic_order_cnt_lsb in the slice header of the target picture, a) if a layer indicated by the layer ID is a layer other than an independent layer and b) if the NAL unit type is not IDR (case of not being IDR_W_RADL and IDR_N_LP).

As long as a device is a coding device including the POC setting unit 21056, regarding pictures of all of the layers at the same time, the common time TIME is set and the POC LSB maximum-value coding unit 21051E sets the common POC LSB maximum value (MaxPicOrderCntLsb) in all of the layers, and thus coded data having the POC lower bit (pic_order_cnt_lsb) which has been already described can be generated.

(Configuration of Picture Coding Unit 21)

Figure 26:
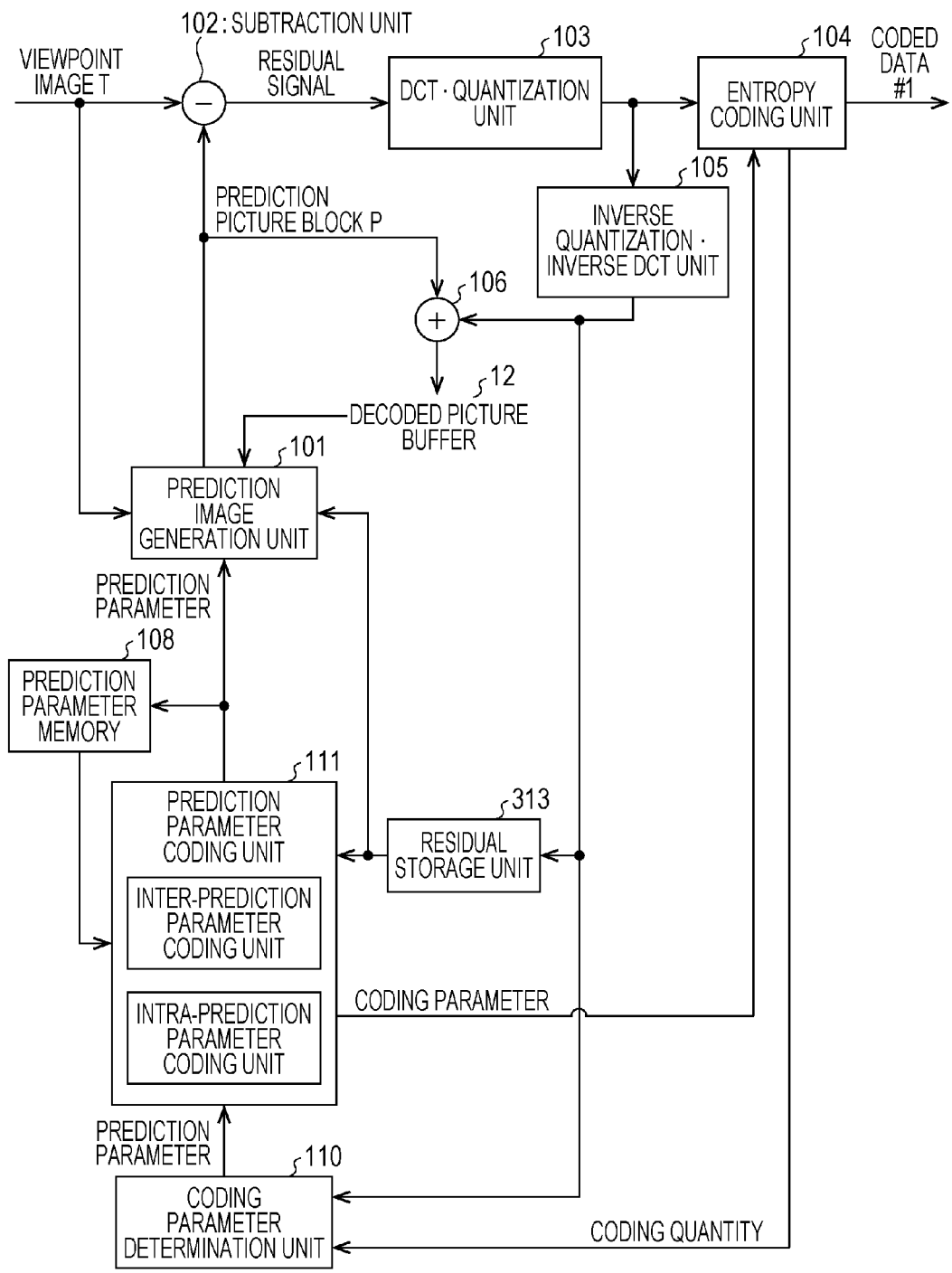
FIG. 26 is a block diagram illustrating a configuration of a picture coding unit according to the embodiment.

Next, a configuration of the picture coding unit 21 according to the embodiment will be described. FIG. 26 is a block diagram illustrating the configuration of the picture coding unit 21 according to the embodiment. The picture coding unit 21 includes a prediction image generation unit 101, a subtraction unit 102, a DCT•quantization unit 103, an entropy coding unit 104, an inverse quantization•inverse DCT unit 105, an addition unit 106, a prediction parameter memory 108, a coding parameter determination unit 110, and a prediction parameter coding unit 111. The prediction parameter coding unit 111 includes an inter-prediction parameter coding unit 112 and an intra-prediction parameter coding unit 113.

The prediction image generation unit 101 generates a prediction picture block P for each block, regarding each picture of each viewpoint of a layer image T which has been input from the outside. The block is an area obtained by dividing the picture. Here, the prediction image generation unit 101 reads a reference picture block from the decoded picture buffer 12, based on a prediction parameter input from the prediction parameter coding unit 111. As the prediction parameter input from the prediction parameter coding unit 111, for example, a motion vector or a disparity vector is provided. The prediction image generation unit 101 reads a reference picture block of a block at a position indicated by a motion vector or a disparity vector which are predicted by using a coding target block as the start point. The prediction image generation unit 101 generates a prediction picture block P based on the reference picture block which has been read, by using one prediction method among a plurality of prediction methods. The prediction image generation unit 101 outputs the generated prediction picture block P to the subtraction unit 102. Because the prediction image generation unit 101 performs the same operation as the prediction image generation unit 308 which has been already described, details of generation of the prediction picture block P will be omitted.

In order to select a prediction method, the prediction image generation unit 101 selects a prediction method in which an error value is reduced to be the minimum, based on a difference between a signal value of each pixel in a block which is included in a layer image, and a signal value of each of pixels corresponding to the prediction picture block P, for example. The method for selecting the prediction method is not limited thereto.

In a case where a picture as a coding target is a base view picture, as the plurality of prediction methods, intra-prediction, motion prediction, and mergence prediction are provided. The motion prediction corresponds to prediction between display points of time in the above-described inter-prediction. The mergence prediction corresponds to prediction using a prediction parameter and a reference picture block which is a coded block, and is the same as a block in a predetermined range from the coding target block. In a case where the picture as the coding target is a non-base view picture, as the plurality of prediction methods, the intra-prediction, the motion prediction, the mergence prediction, and disparity prediction are provided. Disparity prediction (parallax prediction) corresponds to prediction between other layer images (other viewpoint images), in the inter-prediction. Further, the motion prediction, the mergence prediction, and the disparity prediction are provided. In addition, prediction in a case where additional prediction (residual prediction and illumination compensation) is performed on the disparity prediction (parallax prediction) and prediction in case of not being performed are provided.

In a case where the intra-prediction is selected, the prediction image generation unit 101 outputs a prediction mode (predMode) indicating an intra-prediction mode which is used when the prediction picture block P is generated, to the prediction parameter coding unit 111.

In a case where the motion prediction is selected, the prediction image generation unit 101 stores the motion vector (mvLX) used when the prediction picture block P is generated, in the prediction parameter memory 108, and outputs the stored motion vector (mvLX) to the inter-prediction parameter coding unit 112. The motion vector (mvLX) indicates a vector from a position of the coding target block to a position of a reference picture block when the prediction picture block P is generated. An example of information indicating the motion vector (mvLX) includes information (for example, reference picture index (refIdxLX), picture order count (POC)) indicating a reference picture. As the information indicating the motion vector (mvLX), information indicating a prediction parameter may be provided. The prediction image generation unit 101 outputs a prediction mode (predMode) indicating the inter-prediction mode to the prediction parameter coding unit 111.

In a case where the disparity prediction is selected, the prediction image generation unit 101 stores a disparity vector used when the prediction picture block P is generated, in the prediction parameter memory 108, and outputs the stored disparity vector to the inter-prediction parameter coding unit 112. The disparity vector (dvLX) indicates a vector from the position of the coding target block to the position of the reference picture block when the prediction picture block P is generated. An example of information indicating the disparity vector (dvLX) includes information (for example, reference picture index (refIdxLX), view ID (view_id)) indicating a reference picture. As the information indicating the motion vector (mvLX), information indicating a prediction parameter may be provided. The prediction image generation unit 101 outputs a prediction mode (predMode) indicating the inter-prediction mode to the prediction parameter coding unit 111.

In a case where the mergence prediction is selected, the prediction image generation unit 101 outputs a mergence index (merge_idx) indicating the selected reference picture block to the inter-prediction parameter coding unit 112. The prediction image generation unit 101 outputs a prediction mode (predMode) indicating the mergence prediction mode to the prediction parameter coding unit 111.

In the motion prediction, the disparity prediction, and the mergence prediction, in a case where the residual prediction is performs as the additional prediction, the prediction image generation unit 101 causes the residual prediction unit 3092 included in the prediction image generation unit 101 as described above, to perform the residual prediction. In a case where the illumination compensation is performs as the additional prediction, the prediction image generation unit 101 causes the illumination compensation unit 3093 included in the prediction image generation unit 101 as described above, to perform illumination compensation prediction.

The subtraction unit 102 subtracts a signal value of the prediction picture block P input from the prediction image generation unit 101, from a signal value of a block corresponding to a layer image T input from the outside, for each pixel. The subtraction unit 102 generates a residual signal based on a result of subtraction. The subtraction unit 102 outputs the generated residual signal to the DCT•quantization unit 103 and the coding parameter determination unit 110.

The DCT•quantization unit 103 performs DCT on the residual signal input from the subtraction unit 102, and calculates a DCT coefficient. The DCT•quantization unit 103 quantizes the calculated DCT coefficient so as to obtain a quantization coefficient. The DCT•quantization unit 103 outputs the obtained quantization coefficient to the entropy coding unit 104 and the inverse quantization•inverse DCT unit 105.

The quantization coefficient is input to the entropy coding unit 104 from the DCT•quantization unit 103 and the coding parameter is input to the entropy coding unit 104 from the coding parameter determination unit 110. An example of the coding parameter to be input includes codes of the reference picture index (refIdxLX), the vector index (mvp_LX_idx), the differential vector (mvdLX), the prediction mode (predMode), the mergence index (merge_idx), and the like.

The entropy coding unit 104 performs entropy coding on the quantization coefficient and the coding parameter which have been input, so as to generate coded data #1. The entropy coding unit 104 outputs the generated coded data #1 to the outside.

The inverse quantization•inverse DCT unit 105 performs inverse quantization on the quantization coefficient which is input from the DCT•quantization unit 103, so as to obtain the DCT coefficient. The inverse quantization•inverse DCT unit 105 performs inverse DCT on the obtained DCT coefficient, so as to calculate a coded residual signal. The inverse quantization•inverse DCT unit 105 outputs the coded residual signal which has been calculated, to the addition unit 106.

The addition unit 106 adds the signal value of the prediction picture block P, which is input from the prediction image generation unit 101, and a signal value of the coded residual signal input from the inverse quantization•inverse DCT unit 105, for each pixel, so as to generate a reference picture block. The addition unit 106 stores the generated reference picture block in the decoded picture buffer 12.

The prediction parameter memory 108 stores the prediction parameter generated by the prediction parameter coding unit 111, at a predetermined position for each of pictures and blocks as the coding target.

The coding parameter determination unit 110 selects one set among a plurality of sets of the coding parameters. The coding parameter corresponds to the above-described prediction parameter or a parameter which is generated in association with this prediction parameter and is a target of coding. The prediction image generation unit 101 generates the prediction picture block P by using each of sets of these coding parameters.

The coding parameter determination unit 110 calculates a cost value which indicates the size of information quantity and a coding error regarding each of the plurality of sets. For example, the cost value is a sum of the coding quantity and a value obtained by multiply the square error by a coefficient $\lambda$. The coding quantity is information quantity of coded data #1 obtained by performing entropy coding on the quantization error and the coding parameter. The square error is the total sum of square values of a residual value of the residual signal calculated by the subtraction unit 102, regarding pixels. The coefficient $\lambda$ is a predetermined real number greater than zero. The coding parameter determination unit 110 selects a set of the coding parameters which cause the calculated cost value to be the minimum. Thus, the entropy coding unit 104 outputs the selected set of the coding parameters to the outside, as the coded data #1, but does not output a set of the coding parameters, which does not have been selected.

The prediction parameter coding unit 111 infers prediction parameters used when a prediction picture is generated, based on a parameter input from the prediction image generation unit 101. The prediction parameter coding unit 111 codes the inferred prediction parameters so as to generate a set of coding parameters. The prediction parameter coding unit 111 outputs the generated set of coding parameters to the entropy coding unit 104.

The prediction parameter coding unit 111 stores prediction parameters corresponding to a set which is selected by the coding parameter determination unit 110 among generated sets of coding parameters, in the prediction parameter memory 108.

In a case where the prediction mode (predMode) input from the prediction image generation unit 101 indicates the inter-prediction mode, the prediction parameter coding unit 111 operates the inter-prediction parameter coding unit 112. In a case where the prediction mode (predMode) indicates the intra-prediction mode, the prediction parameter coding unit 111 operates the intra-prediction parameter coding unit 113.

The inter-prediction parameter coding unit 112 infers an inter-prediction parameter based on the prediction parameters input from the coding parameter determination unit 110. The inter-prediction parameter coding unit 112 includes the same configuration as a configuration of the inter-prediction parameter decoding unit 303 (see FIG. 5 and the like) for inferring the inter-prediction parameter, as a configuration for inferring the inter-prediction parameter. The configuration of the inter-prediction parameter coding unit 112 will be described later.

The intra-prediction parameter coding unit 113 determines the intra-prediction mode (IntraPredMode) indicated by the prediction mode (predMode) which is input from the coding parameter determination unit 110, as a set of inter-prediction parameters.

(Configuration of Inter-Prediction Parameter Coding Unit)

Next, the configuration of the inter-prediction parameter coding unit 112 will be described. The inter-prediction parameter coding unit 112 is means corresponding to the inter-prediction parameter decoding unit 303.

Figure 27:
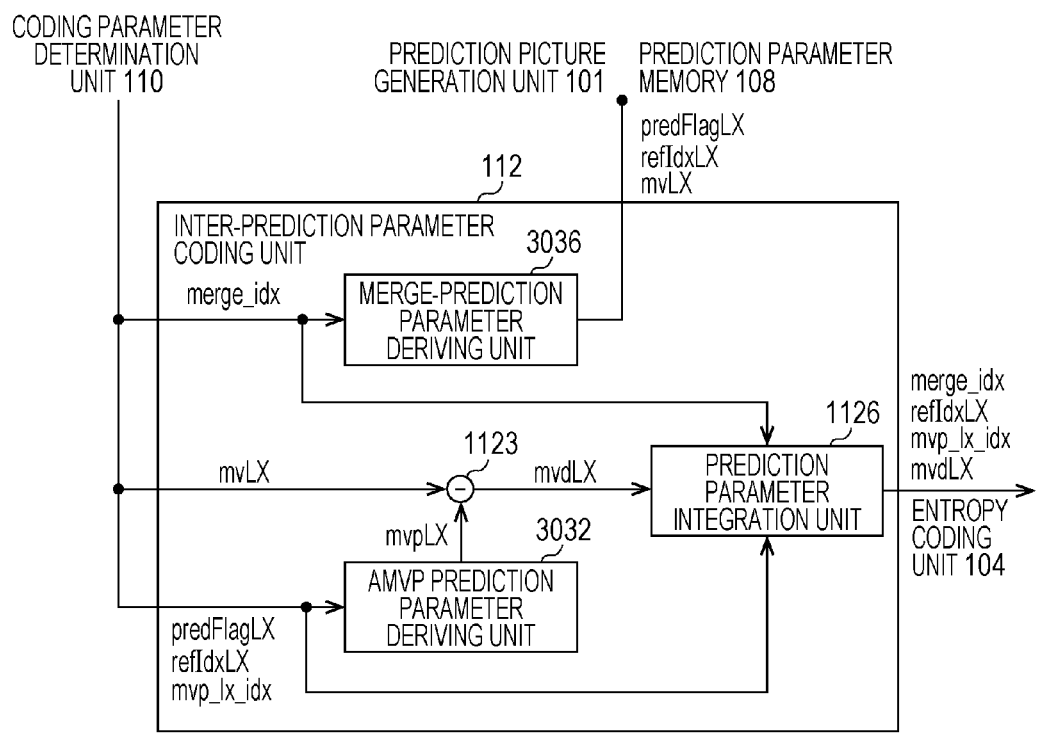
FIG. 27 is a schematic diagram illustrating a configuration of an inter-prediction parameter coding unit according to the embodiment.

FIG. 27 is a schematic diagram illustrating the configuration of the inter-prediction parameter coding unit 112 according to the embodiment.

The inter-prediction parameter coding unit 112 includes an inter-prediction parameter coding control unit 1031, a merge-prediction parameter deriving unit 1121, an AMVP prediction parameter deriving unit 1122, a subtraction unit 1123, and a prediction parameter integration unit 1126.

The merge-prediction parameter deriving unit 1121 has a configuration similar to the above-described merge-prediction parameter deriving unit 3036 (see FIG. 7).

The inter-prediction parameter coding control unit 1031 instructs the entropy coding unit 104 to code a code (syntax element) associated with the inter-prediction. The inter-prediction parameter coding control unit 1031 codes (syntax element) included in coded data #1. That is, for example, the inter-prediction parameter coding control unit 1031 codes the division mode (part_mode), the mergence flag (merge_flag), the mergence index (merge_idx), the inter-prediction flag (inter_pred_idx), the reference picture index (refIdxLX), the predictive vector index (mvp_LX_idx), and the differential vector (mvdLX).

In a case where the prediction mode (predMode) input from the prediction image generation unit 101 indicates the mergence prediction mode, the mergence index (merge_idx) input to the merge-prediction parameter deriving unit 1121 from the coding parameter determination unit 110. The mergence index (merge_idx) is output to the prediction parameter integration unit 1126. The merge-prediction parameter deriving unit 1121 reads the reference picture index (refIdxLX) and the vector (mvLX) of a reference block which is indicated by the mergence index (merge_idx) among mergence candidates, from the prediction parameter memory 108. The mergence candidates are reference blocks (for example, among reference blocks coming into contact with the lower-left end, the upper-left end, and the upper-right end of the coding target block) which are in a predetermined range from a coding target block which is set as the coding target. The mergence candidates are reference blocks of which coding processing is ended.

The AMVP prediction parameter deriving unit 1122 has a configuration similar to the above-described AMVP prediction parameter deriving unit 3032 (see FIG. 8).

In a case where the prediction mode (predMode) which is input from the prediction image generation unit 101 indicates the inter-prediction mode, the vector (mvLX) is input to the AMVP prediction parameter deriving unit 1122 from the coding parameter determination unit 110. The AMVP prediction parameter deriving unit 1122 infers the predictive vector (mvpLX) based on the input vector (mvLX). The AMVP prediction parameter deriving unit 1122 outputs the inferred predictive vector (mvpLX) to the subtraction unit 1123. The reference picture index (refIdx) and the vector index (mvp_LX_idx) are output to the prediction parameter integration unit 1126.

The subtraction unit 1123 subtracts the predictive vector (mvpLX) which is input from the AMVP prediction parameter deriving unit 1122, from the vector (mvLX) which is input from the coding parameter determination unit 110, so as to generate the differential vector (mvdLX). The differential vector (mvdLX) is output to the prediction parameter integration unit 1126.

In a case where the prediction mode (predMode) which is input from the prediction image generation unit 101 indicates the mergence prediction mode, the prediction parameter integration unit 1126 outputs the mergence index merge_idx which is input from the coding parameter determination unit 110, to the entropy coding unit 104.

In a case where the prediction mode (predMode) which is input from the prediction image generation unit 101 indicates the inter-prediction mode, the prediction parameter integration unit 1126 performs the following processing.

The prediction parameter integration unit 1126 integrates the reference picture index (refIdxLX) and the vector index (mvp_LX_idx) which are input from the coding parameter determination unit 110, and the differential vector mvdLX which is input from the subtraction unit 1123. The prediction parameter integration unit 1126 outputs a code obtained by integration to the entropy coding unit 104.

(Modification Example 1 of Decoding Device 1 and Coding Device 2)

The coding device 2 may code a flag (vps_syntax_change_by_layer_id_flag) and cause the coded flag to be included in the VPS. The flag (vps_syntax_change_by_layer_id_flag) indicates whether or not a syntax configuration is changed. The coding device 2 may change the syntax configuration of an independent layer only in a case where vps_syntax_change_by_layer_id_flag is 1 and the layer ID is greater than 0. The coding device 2 may code a flag (vps_syntax_change_by_layer_id_flag[ ]) for each layer. The flag (vps_syntax_change_by layer_id_flag[ ]) indicates whether or not the syntax configuration of a layer i may be changed. At this time, the flag (vps_syntax_change_by_layer_id_flag[i]) may be decoded only in a case where an independent layer flag (IndependentLayerFlag[i]) indicates that a layer is independent (case where NumDirectRefLayers[i] is greater than 0).

In this case, the header decoding unit 10 of the decoding device 1 decodes a flag (vps_syntax_change_by_layer_id_flag) from the VPS and the like. The flag (vps_syntax_change_by_layer_id_flag) indicates whether or not the syntax configuration may be changed. In a case where the flag (vps_syntax_change_by_layer_id_flag) is coded for each layer, the decoding device 1 sequentially decodes the flag (vps_syntax_change_by_layer_id_flag[i]) of a layer i. The flag (vps_syntax_change_by_layer_id_flag[i]) may be decoded only in a case where the independent layer flag (IndependentLayerFlag[i]) indicates that the layer is independent (case where NumDirectRefLayers[i] is 0). The profile level decoding unit 2102, the representation information decoding unit 2103, and the scaling list decoding unit 2104 which are provided in the header decoding unit 10 of the decoding device 1 are configured so as to perform the following processing.

[Profile Level Decoding Unit 2102]

The profile level decoding unit 2102 decodes profile level information of each layer, from the VPS. In a case where the profile level decoding unit 2102 decodes the SPS, the profile level decoding unit 2102 also decodes the profile level information from the SPS regardless of whether or not a layer indicated by the layer ID is an independent layer, when the flag (vps_syntax_change_by_layer_id_flag) is 0 or the layer ID of the SPS is 0 (see FIG. 41(*b*)).

[Representation Information Decoding Unit 2103]

The representation information decoding unit 2103 decodes the syntax in FIG. 41(*a*) from the VPS and decodes the syntax in FIG. 28(*b*) from the SPS.

In a case where the flag (vps_syntax_change_by_layer_id_flag) has a value other than 0 and the layer ID of the SPS is greater than 0, the representation information update flag (update_rep_format_flag) is included in the SPS, and the representation information decoding unit 2103 decodes the flag from the SPS. In a case where update_rep_format_flag is not included in the SPS, the representation information decoding unit 2103 infers update_rep_format_flag to be 0. In a case where update_rep_format_flag is 1, the representation information decoding unit 2103 decodes representation information. The decoded representation information includes chroma_format_idc, separate_colour_plane_flag, pic_width_in_luma_samples, pic_height_in_luma_samples, bit_depth_luma_minus8, bit_depth_chroma_minus8, and the like. In a case where update_rep_format_flag is 0, the representation information decoding unit 2103 uses the representation information which has been already decoded in rep_format( ) of the VPS, as representation information corresponding to the target layer.

[Scaling List Decoding Unit 2104]

In a case where the flag (vps_syntax_change_by_layer_id_flag) has a value other than 0 and the layer ID is greater than 0 (case where the layer ID is not 0), the scaling list decoding unit 2104 decodes sps_infer_scaling_list_flag from the SPS (see FIG. 41(*b*)). In a case where sps_infer_scaling_list_flag is not 0, the scaling list decoding unit 2104 decodes sps_scaling_list_ref_layer_id. In a case where sps_infer_scaling_list_flag is 0, the scaling list decoding unit 2104 decodes sps_scaling_list_data_present_flag and scaling_list_data( ), and decodes the scaling list.

In a case where the flag (vps_syntax_change_by_layer_id_flag) has a value other than 0 and the layer ID is greater than 0 (case where the layer ID is not 0), the scaling list decoding unit 2104 decodes pps_infer_scaling_list_flag from PPS (see FIG. 42(*a*)). In a case where pps_infer_scaling_list_flag is not 0, the scaling list decoding unit 2104 decodes pps_scaling_list_ref_layer_id. In a case where pps_infer_scaling_list_flag is 0, the scaling list decoding unit 2104 decodes pps_scaling_list_data_present_flag and scaling_list_data( ), and decodes the scaling list.

[POC Information Decoding Unit 2105]

The POC information decoding unit 2105 decodes slice_pic_order_cnt_lsb from the slice header, a) in a case where the flag (vps_syntax_change_by_layer_id_flag) has a value other than 0, and the layer ID is greater than 0 (case where the layer ID is not 0), or b) in a case where the NAL unit type does not indicate an IDR picture (case where NAL_UNIT_TYPE is neither of IDR_W_RADL and IDR_N_LP) (see FIG. 42(*b*)).

[Representation Information Coding Unit]

In a case where the flag (vps_syntax_change_by_layer_id_flag) has a value other than 0, and the layer ID of the SPS is greater than 0 (case where the layer ID is not 0), the representation information coding unit codes the representation information update flag (update_rep_format_flag) and causes the coded representation information update flag (update_rep_format_flag) to be included in the SPS. In a case where the coded representation information update flag (update_rep_format_flag) is 1, the representation information coding unit codes representation information and causes the coded representation information to be included in the SPS. Such representation information includes chroma_format_idc, separate_colour_plane_flag, pic_width_in_luma_samples, pic_height_in_luma_samples, bit_depth_luma_minus8, bit_depth_chroma_minus8, and the like.

[Scaling List Coding Unit]

In a case where the flag (vps_syntax_change_by_layer_id_flag) has a value other than 0, and the layer ID is greater than 0 (case where the layer ID is not 0), the scaling list coding unit codes sps_infer_scaling_list_flag. In a case where sps_infer_scaling_list_flag is not 0, the scaling list coding unit codes sps_scaling_list_ref_layer_id and causes sps_scaling_list_ref_layer_id to be included in the SPS. In a case where sps_infer_scaling_list_flag is 0, the scaling list coding unit codes sps_scaling_list_data_present_flag and scaling_list_data( ), and causes sps_scaling_list_data_present_flag and scaling_list_data( ), to be included in the SPS. Similarly, in a case where the flag (vps_syntax_change_by_layer_id_flag) has a value other than 0, and the layer ID is greater than 0 (case where the layer ID is not 0), the scaling list coding unit codes pps_infer_scaling_list_flag. In a case where pps_infer_scaling_list_flag is not 0, the scaling list coding unit codes sps_scaling_list_ref_layer_id and causes the sps_scaling_list_ref_layer_id to be included in the PPS. In a case where pps_infer_scaling_list_flag is 0, the scaling list coding unit codes pps_scaling_list_data_present_flag and scaling_list_data( ), and causes pps_scaling_list_data_present_flag and scaling_list_data( ) to be included in the PPS.

[POC Information Coding Unit 2105E]

The POC information coding unit 2105E codes slice_pic_order_cnt_lsb in the slice header, a) in a case where the flag (vps_syntax_change_by_layer_id_flag) has a value other than 0, and the layer ID is greater than 0 (case where the layer ID is not 0), or b) in a case where the NAL unit type does not indicate an IDR picture (case where NAL_UNIT_TYPE is neither of IDR_W_RADL and IDR_N_LP).

In a case where a list of the flag (vps_syntax_change_by_layer_id_flag[ ]) which indicates whether or not the syntax configuration may be changed is coded for each layer, determination is performed for determining whether or not information is decoded in accordance with the flag (vps_syntax_change_by_layer_id[nuh_layer_id]) which corresponds to the layer ID (nuh_layer_id) of each of the SPS, the PPS, and the slice header in decoding of the SPS, the PPS, and the slice header. In this case, because vps_syntax_change_by_layer_id[nuh_layer_id] already includes information of a unit of a layer, determination of a case where the flag (vps_syntax_change_by_layer_id_flag) has a value other than 0, and the layer ID is greater than 0 (case where the layer ID is not 0) in the above descriptions is substituted with determination that vps_syntax_change_by_layer_id[nuh_layer_id] is not 0.

The name of a predetermined flag indicating whether the syntax configuration may be changed is not limited to vps_syntax_change_by_layer_id_flag. For example, as the name of such a flag, the name of syntax_change_enable_flag and the like may be used. A predetermined flag may be a flag which has truth and falsehood reverse to the flag. That is, the flag is not a flag indicating that the syntax is permitted to be changed, but may be used as a flag (for example, syntax_change_disable_flag) indicating that the syntax is not permitted to be changed. In this case, the determination of "whether or not the flag (vps_syntax_change_by_layer_id_flag) has a value other than 0" is substituted with determination of "whether or not the flag has a value other than 0". The determination of "whether or not the flag (vps_syntax_change_by_layer_id_flag) is 0" is substituted with determination of "whether or not the flag has a value other than 0".

(Supplementary Information Relating to Modification Example 1)

The coding device 2 may perform signaling of vps_syntax_change_by_layer_id_flag of each layer to the decoding device 1 through the VPS.

(Modification Example 2 of Decoding Device 1 and Coding Device 2)

A plurality of layers constituting a video may be divided into a layer which permits a change of the syntax, and a layer which does not permit the change of the syntax.

For example, a layer having a layer ID which is smaller than a defined value (for example, value of LAYER_ID_FOR_SYNTAX_CHANGE) (that is, layer having a layer ID of 0) or a layer having a layer ID of a value in a specific range (that is, layer having a value which is 1 or more and less than LAYER_ID_FOR_SYNTAX_CHANGE) may be set as the layer which permits a change of the syntax. A layer having a layer ID which is equal to or greater than the defined value may be set as the layer which does not permit the change of the syntax.

In this case, the coding device 2 may change the syntax configuration of each of layers in which the layer ID is smaller than a defined threshold (for example, value of LAYER_ID_FOR_SYNTAX_CHANGE). The coding device 2 may code the value of LAYER_ID_FOR_SYNTAX_CHANGE and cause the coded value of LAYER_ID_FOR_SYNTAX_CHANGE to be included in the SPS and/or the PPS.

In this case, the profile level decoding unit 2102 and the scaling list decoding unit 2104 which are provided in the header decoding unit 10 of the decoding device 1 are configured so as to perform the following processing.

[Profile Level Decoding Unit 2102]

The profile level decoding unit 2102 decodes profile level information of each layer from the VPS. In case of decoding the SPS, the profile level decoding unit 2102 also decodes the profile level information from the SPS regardless of whether or not a layer indicated by the layer ID is an independent layer, when the layer ID (nuh_layer_id included in the NAL unit header as the NAL unit type is the SPS) of the SPS is equal to or greater than the value of LAYER_ID_FOR_SYNTAX_CHANGE or the layer ID of the SPS is 0 (see FIG. 43(a)).

[Representation Information Decoding Unit 2103]

In a case where the layer ID (nuh_layer_id) of the SPS is smaller than the value of LAYER_ID_FOR_SYNTAX_CHANGE and the layer ID of the SPS is greater than 0, the representation information decoding unit 2103 causes the representation information update flag (update_rep_format_flag) to be included in the SPS, and decodes the flag from the SPS. In a case where update_rep_format_flag is not included in the SPS, the representation information decoding unit 2103 infers update_rep_format_flag to be 0. In a case where update_rep_format_flag is 1, the representation information decoding unit 2103 decodes representation information. Examples of the representation information to be decoded include chroma_format_idc, separate_colour_plane_flag, pic_width_in_luma_samples, pic_height_in_luma_samples, bit_depth_luma_minus8, and bit_depth_chroma_minus8. In a case where update_rep_format_flag is 0, the representation information decoding unit 2103 uses representation information which has been already decoded in rep_format( ) of the VPS, as the representation information for the target layer.

[Scaling List Decoding Unit 2104]

In a case where the layer ID (nuh_layer_id) of the SPS is smaller than the value of LAYER_ID_FOR_SYNTAX_CHANGE and the layer ID is greater than 0, the scaling list decoding unit 2104 decodes sps_infer_scaling_list_flag from the SPS (see FIG. 41(b)). In a case where sps_infer_scaling_list_flag is not 0, the scaling list decoding unit 2104 decodes sps_scaling_list_ref_layer_id. In a case where sps_infer_scaling_list_flag is 0, the scaling list decoding unit 2104 decodes sps_scaling_list_data_present_flag and scaling_list_data( ), and decodes the scaling list.

In a case where the layer ID (nuh_layer_id) of the PPS is smaller than the value of LAYER_ID_FOR_SYNTAX_CHANGE and the layer ID is greater than 0 (case where the layer ID has a value other than 0), the scaling list decoding unit 2104 decodes pps_infer_scaling_list_flag from the PPS (see FIG. 42(a)). In a case where pps_infer_scaling_list_flag is not 0, the scaling list decoding unit 2104 decodes pps_scaling_list_ref_layer_id. In a case where pps_infer_scaling_list_flag is 0, the scaling list decoding unit 2104 decodes pps_scaling_list_data_present_flag and scaling_list_data( ), and decodes the scaling list.

[POC Information Decoding Unit 2105]

The POC information decoding unit 2105 decodes slice_pic_order_cnt_lsb from the slice header, a) in a case where the layer ID (nuh_layer_id) of the slice header is smaller than the value of LAYER_ID_FOR_SYNTAX_CHANGE and the layer ID is greater than 0 (case where the layer ID has a value other than 0), or b) in a case where the NAL unit type does not indicate an IDR picture (case where NAL_UNIT_TYPE is neither of IDR_W_RADL and IDR_N_LP) (see FIG. 42(b)).

[Representation Information Coding Unit]

In a case where the flag (vps_syntax_change_by_layer_id_flag) is not 0, and the layer ID of the SPS is greater than 0, the representation information coding unit codes the representation information update (flag update_rep_format_flag) and causes the coded representation information update (flag update_rep_format_flag) to be included in the SPS. In a case where the coded representation information update flag (update_rep_format_flag) is 1, the representation information coding unit codes representation information and causes the coded representation information to be included in the SPS. Examples of the representation information to be coded include chroma_format_idc, separate_colour_plane_flag, pic_width_in_luma_samples, pic_height_in_luma_samples, bit_depth_luma_minus8, and bit_depth_chroma_minus8.

[Scaling List Coding Unit]

In a case where the layer ID (nuh_layer_id) of the SPS is smaller than the value of LAYER_ID_FOR_SYNTAX_CHANGE and the layer ID of the SPS is greater than 0 (case where the layer ID has a value other than 0), the scaling list coding unit codes sps_infer_scaling_list_flag. In a case where sps_infer_scaling_list_flag is not 0, the scaling list coding unit codes sps_scaling_list_ref_layer_id, and causes sps_scaling_list_ref_layer_id to be included in the SPS. In a case where sps_infer_scaling_list_flag is 0, the scaling list coding unit codes sps_scaling_list_data_present_flag and scaling_list_data( ), and causes sps_scaling_list_data_present_flag and scaling_list_data( ) to be included in the SPS. Similarly, in a case where the layer ID (nuh_layer_id) of the PPS is smaller than the value of LAYER_ID_FOR_SYNTAX_CHANGE and the layer ID of the PPS is greater than 0 (case where the layer ID has a value other than 0), the scaling list coding unit codes pps_infer_scaling_list_flag. In a case where pps_infer_scaling_list_flag is not 0, the scaling list coding unit codes sps_scaling_list_ref_layer_id, and causes sps_scaling_list_ref_layer_id to be included in the PPS. In a case where pps_infer_scaling_list_flag is 0, the scaling list coding unit codes pps_scaling_list_data_present_flag and scaling_list_data( ), and causes pps_scaling_list_data_present_flag and scaling_list_data( ) to be included in the PPS.

[POC Information Coding Unit 2105E]

The POC information coding unit 2105E codes slice_pic_order_cnt_lsb in the slice header, a) in a case where the layer ID (nuh_layer_id) of a picture is smaller than the value of LAYER_ID_FOR_SYNTAX_CHANGE and the layer ID of the picture is greater than 0 (case where the layer ID has a value other than 0), or b) in a case where the NAL unit type of a picture does not indicate an IDR picture (case where NAL_UNIT_TYPE is neither of IDR_W_RADL and IDR_N_LP).

Portions of the image coding device 2 and the image decoding device 1 in the above-described embodiment, for example, the entropy decoding unit 301, the prediction parameter decoding unit 302, the prediction image generation unit 101, the DCT•quantization unit 103, the entropy coding unit 104, the inverse quantization•inverse DCT unit 105, the coding parameter determination unit 110, the prediction parameter coding unit 111, the entropy decoding unit 301, the prediction parameter decoding unit 302, the prediction image generation unit 308, and the inverse quantization•inverse DCT unit 311 may be realized by a computer. In this case, a program for realizing the control functions may be recorded in a computer-readable recording medium, the program recorded in the recording medium may be read and executed by a computer system, and thereby the control functions may be realized. Herein, "the computer system" is a computer system built in any of the image coding device 2 and the image decoding device 1. The "computer system" includes an OS or hardware of peripheral devices. The "computer-readable recording medium" refers to a flexible disk, a magneto-optical disk, a portable medium such as a ROM and a CD-ROM, and a storage device such as a hard disk, which is built in the computer system. The "computer-readable recording medium" may include a medium which dynamically holds a program for a short period of time, like a communication line in a case where the program is transmitted through a network such as the Internet, or through a communication channel such as a telephone circuit. The "computer-readable recording medium" may include a medium which holds a program for a predetermined period of time, like a volatile memory in a computer system which is used as a server or a client in that case. The program may be used for realizing some of the above-described functions. A combination of the program and a program which has been recorded may be used for realizing the above-described functions in the computer system.

Portions or all of the image coding device 2 and the image decoding device 1 in the above-described embodiment may be realized as an integrated circuit such as large scale integration (LSI). Each of functional blocks of the image coding device 2 and the image decoding device 1 may be realized as an individual processor. In addition, some or all of the functional blocks of the image coding device 2 and the image decoding device 1 may be may be integrated and realized as a processor. A method of forming an integrated circuit is not limited to the LSI. The method may be realized by a dedicated circuit or a public processor. In a case where a technology for substituting the LSI and forming an integrated circuit appears by the progress of the semiconductor technology, an integrated circuit may be used by using this technology.

(Conclusion)

According to a first aspect of the present invention, there is provided an image decoding device. The image decoding device is an image decoding device (image decoding device 1) which decodes an image subjected to scalable coding. The image decoding device includes a layer ID decoding unit (layer ID decoding unit 2111), a dependency layer information decoding unit (dependency layer information decoding unit 2101), and a profile level information decoding unit (profile level information decoding unit 2102). The layer ID decoding unit decodes a layer ID included in a NAL unit header. The dependency layer information decoding unit decodes dependency layer information which indicates whether or not there is a dependency relationship between layers, and determines whether or not a layer indicated by the layer ID is an independent layer which does not have the dependency relationship, based on the dependency layer information. The profile level information decoding unit decodes profile level information from a video parameter set. The profile level information decoding unit also decodes the profile level information, from a sequence parameter set in a case where it is determined that a layer indicated by the layer ID is the independent layer.

According to the configuration, an effect is obtained in that the image decoding device can extract the independent layer without rewriting of syntax and can cause a non-scalable decoder to perform reproduction.

According to a second aspect of the present invention, in the first aspect, the image decoding device may also decode the profile level information from the sequence parameter set only in a case where the profile level information decoding unit determines that a layer indicated by the layer ID is the independent layer, or only when the layer ID is 0 or a value of a specific flag (vps_syntax_change_by_layer_id_flag) which relates to a change of the syntax is 0.

According to a third aspect of the present invention, in the first aspect, the image decoding device may also decode the profile level information from the sequence parameter set only in a case where the profile level information decoding unit determines that a layer indicated by the layer ID is the independent layer, or only when the layer ID is 0 or the layer ID is a value in a specific range.

According to a fourth aspect of the present invention, there is provided an image coding device. The image coding device is an image coding device (image coding device 2) which codes an image subjected to scalable coding. The image coding device includes a layer ID coding unit, a dependency layer information coding unit, and a profile level information coding unit. The layer ID coding unit codes a layer ID which is included in a NAL unit header. The dependency layer information coding unit codes dependency layer information which indicates whether or not there is a dependency relationship between layers. The profile level information coding unit codes profile level information included in a parameter set, regarding each of the video parameter set and the sequence parameter set. The profile level information coding unit codes the profile level information which is included in the sequence parameter set, in a case where it is determined that a layer indicated by the layer ID is an independent layer.

According to a fifth aspect of the present invention, there is provided coded data. The coded data is coded data which includes one or more NAL units. The NAL unit is configured from a NAL unit header and NAL unit data. Each of the one or more NAL unit headers which are included in the coded data includes a layer ID and a NAL unit type. The NAL unit type is used for defining the type of a NAL unit which includes the NAL unit header. A NAL unit in which the NAL unit type is the video parameter set includes profile level information and dependency layer information indicating whether or not there is a dependency relationship between layers. A NAL unit in which the NAL unit type is the sequence parameter set, and a layer indicated by the layer ID is an independent layer includes the profile level information.

According to a sixth aspect of the present invention, there is provided an image decoding device which decodes an image subjected to scalable coding. The image decoding device includes a layer ID decoding unit, a dependency layer information decoding unit, and a POC information decoding unit. The layer ID decoding unit decodes a layer ID included in a NAL unit header. The dependency layer information decoding unit decodes dependency layer information which indicates whether or not there is a dependency relationship between layers, and determines whether or not a layer indicated by the layer ID is an independent layer which does not have the dependency relationship, based on the dependency layer information. The POC information decoding unit decodes POC information from a slice header. The POC information decoding unit is configured so as to decode the POC information in a case where the NAL unit type does not indicate an IDR picture. The POC information decoding unit also decodes the POC information in a case where it is determined that a layer indicated by the layer ID is a layer other than an independent layer.

According to the configuration, an effect is obtained in that the image decoding device can extract the independent layer without rewriting of syntax and can cause a non-scalable decoder to perform reproduction.

According to a seventh aspect of the present invention, in the sixth aspect, the image decoding device may decode the POC information only when a value of a specific flag (for example, vps_syntax_change_by_layer_id flag) relating to the layer ID is not 0, in a case where the NAL unit type indicates an IDR picture.

According to an eighth aspect of the present invention, in the sixth aspect, in the image decoding device, the POC information decoding unit may also decode the profile level information from the sequence parameter set only when the layer ID is a value (for example, value which is 1 or more and less than LAYER_ID_FOR_SYNTAX_CHANGE) in a specific range, in a case where the NAL unit type indicates an IDR picture.

According to a ninth aspect of the present invention, there is provided an image coding device which codes an image subjected to scalable coding. The image coding device includes a layer ID coding unit, a dependency layer information coding unit, and a POC information coding unit. The layer ID coding unit codes a layer ID which is included in a NAL unit header. The dependency layer information coding unit codes dependency layer information which indicates whether or not there is a dependency relationship between layers. The POC information coding unit codes POC information in a slice header, in a case where the NAL unit type is not an IDR picture, or in a case where it is determined that a layer indicated by the layer ID is a layer other than the independent layer.

According to a tenth aspect of the present invention, there is provided coded data which includes one or more NAL units. The NAL unit is configured from a NAL unit header and NAL unit data. Each of the one or more NAL unit headers which are included in the coded data includes a layer ID and a NAL unit type. The NAL unit type is used for defining the type of a NAL unit which includes the NAL unit header. The POC information is included in the slice header only in a case where the NAL unit type is not an IDR picture or a case where a layer indicated by the layer ID is a layer other than the independent layer.

According to an 11th aspect of the present invention, there is provided an image decoding device which decodes an image subjected to scalable coding. The image decoding device includes a layer ID decoding unit, a dependency layer information decoding unit, and a representation information decoding unit. The layer ID decoding unit decodes a layer ID included in a NAL unit header. The dependency layer information decoding unit decodes dependency layer information which indicates whether or not there is a dependency relationship between layers, and determines whether or not a layer indicated by the layer ID is an independent layer which does not have the dependency relationship, based on the dependency layer information. The representation information decoding unit decodes representation information from a video parameter set. The representation information decoding unit decodes a representation information update flag from a sequence parameter set in a case where it is determined that a layer indicated by the layer ID is not the independent layer. The representation information decoding unit decodes representation information in a case where the representation information update flag has a value other than 0.

According to the configuration, an effect is obtained in that the image decoding device can extract the independent layer without rewriting of syntax and can cause a non-scalable decoder to perform reproduction.

According to a 12th aspect of the present invention, in the 11th aspect, in the image decoding device, the representation information decoding unit may decode the representation information update flag from the sequence parameter set only when a value of a specific flag (for example, vps_syntax_change_by_layer_id flag) relating to the layer ID is not 0.

According to a 13th aspect of the present invention, in the 11th aspect, in the image decoding device, the representation information decoding unit may decode the representation information update flag from the sequence parameter set only when the layer ID is a value (for example, value which is 1 or more and less than LAYER_ID_FOR_SYNTAX_CHANGE) in a specific range.

According to a 14th aspect of the present invention, there is provided an image coding device which codes an image subjected to scalable coding. The image coding device includes a layer ID coding unit, a dependency layer information coding unit, and a representation information coding unit. The layer ID coding unit codes a layer ID which is included in a NAL unit header. The dependency layer information coding unit codes dependency layer information which indicates whether or not there is a dependency relationship between layers. The representation information coding unit codes representation information included in a video parameter set. The representation information coding unit codes a representation information update flag included in a sequence parameter set, in a case where it is determined that a layer indicated by the layer ID is not the independent layer.

According to a 15th aspect of the present invention, there is provided coded data which includes one or more NAL units. The NAL unit is configured from a NAL unit header and NAL unit data. Each of the one or more NAL unit headers which are included in the coded data includes a layer ID and a NAL unit type. The NAL unit type is used for defining the type of a NAL unit which includes the NAL unit header. A NAL unit in which the NAL unit type is a video parameter set includes representation information. A NAL unit in which the NAL unit type is a sequence parameter set and a layer indicated by the layer ID is not an independent layer includes a representation information update flag.

According to a 16th aspect of the present invention, there is provided an image decoding device which decodes an image subjected to scalable coding. The image decoding device includes a layer ID decoding unit, a dependency layer information decoding unit, and a scaling list decoding unit. The layer ID decoding unit decodes a layer ID included in a NAL unit header in which a NAL unit type is a sequence parameter set. The dependency layer information decoding unit decodes dependency layer information which indicates whether or not there is a dependency relationship between layers, and determines whether or not a layer indicated by the layer ID is an independent layer which does not have the dependency relationship, based on the dependency layer information. The scaling list decoding unit decodes a scaling list. The scaling list decoding unit decodes a scaling list prediction flag from a sequence parameter set and a picture parameter set in a case where it is determined that a layer indicated by the layer ID is a layer other than the independent layer. The scaling list decoding unit decodes the scaling list in a case where the scaling list prediction flag is 0.

According to the configuration, an effect is obtained in that the image decoding device can extract the independent layer without rewriting of syntax and can cause a non-scalable decoder to perform reproduction.

According to a 17th aspect of the present invention, in the 16th aspect, in the image decoding device, the scaling list decoding unit may decode the scaling list prediction flag from the sequence parameter set and the picture parameter set only when a value of a specific flag (for example, vps_syntax_change_by_layer_id flag) relating to the layer ID is not 0.

According to an 18th aspect of the present invention, in the 16th aspect, in the image decoding device, the scaling list decoding unit may decode the scaling list prediction flag from the sequence parameter set only when the layer ID is a value (for example, value which is 1 or more and less than LAYER_ID_FOR_SYNTAX_CHANGE) in a specific range.

According to a 19th aspect of the present invention, there is provided an image coding device which codes an image subjected to scalable coding. The image coding device includes a layer ID coding unit, a dependency layer information coding unit, and a scaling list coding unit. The layer ID coding unit codes a layer ID which is included in a NAL unit header. The dependency layer information coding unit codes dependency layer information which indicates whether or not there is a dependency relationship between layers. The scaling list coding unit codes a scaling list. The scaling list coding unit codes a scaling list prediction flag in a sequence parameter set and a picture parameter set, in a case where it is determined that a layer indicated by the layer ID is a layer other than the independent layer.

According to a 20th aspect of the present invention, there is provided coded data which includes one or more NAL units. The NAL unit is configured from a NAL unit header and NAL unit data. Each of the one or more NAL unit headers which are included in the coded data includes a layer ID and a NAL unit type. The NAL unit type is used for defining the type of a NAL unit which includes the NAL unit header. A NAL unit in which the NAL unit type is a sequence parameter set, a layer indicated by the layer ID is not an independent layer, and a NAL unit in which the NAL unit type is a picture parameter set and a layer indicated by the layer ID is not an independent layer include a scaling list prediction flag.

According to a 21st aspect of the present invention, there is provided coded data which is configured from an access unit. The access unit includes one or more NAL units. The NAL unit is configured from a NAL unit header and NAL unit data. Each of the one or more NAL unit headers which are included in the coded data includes a layer ID and a NAL unit type. The NAL unit type is used for defining the type of a NAL unit which includes the NAL unit header. A NAL unit in which the NAL unit type is a video parameter set includes dependency layer information indicating whether or not there is dependency relationship between layers. A NAL unit in which the NAL unit type is a picture includes POC information in a slice header. Layers which are included in the access unit and are set as reference layers in the dependency layer information have the same POC as all pictures belonging to a layer which is defined as a reference target layer.

According to a 22nd aspect of the present invention, there is provided coded data which is configured from an access unit. The access unit includes one or more NAL units. The NAL unit is configured from a NAL unit header and NAL unit data. Each of one or more NAL unit headers which are included in the coded data includes a layer ID and a NAL unit type. The NAL unit type is used for defining the type of a NAL unit which includes the NAL unit header. A NAL unit in which the NAL unit type is a video parameter set includes dependency layer information indicating whether or not there is dependency relationship between layers. A NAL unit in which the NAL unit type is a picture includes POC information in a slice header. In a case where there is a probability that pictures which are included in and belong to the access unit have different POCs, an access unit delimiter indicating a border of the access unit is provided ahead of the access unit.

Hitherto, the embodiment of the invention is described in detail with reference to the drawings. However, the specific configuration is not limited to the above-described configuration. Various design modifications may be made in a range without departing from a gist of the invention.

INDUSTRIAL APPLICABILITY

The present invention can be appropriately applied to an image decoding device which decodes coded data obtained by coding image data, and an image coding device which generates coded data obtained by coding the image data. The present invention can be appropriately applied to a data structure of coded data which is generated by the image coding device and is referred by the image decoding device.

REFERENCE SIGNS LIST

1 IMAGE DECODING DEVICE
2 IMAGE CODING DEVICE
3 NETWORK
4 IMAGE DISPLAY DEVICE
5 IMAGE TRANSMISSION SYSTEM
10 HEADER DECODING UNIT
10E HEADER CODING UNIT
11 PICTURE DECODING UNIT
12 DECODED PICTURE BUFFER
13 REFERENCE PICTURE MANAGEMENT UNIT
131 REFERENCE PICTURE SET SETTING UNIT
132 REFERENCE PICTURE LIST DRAWING UNIT
13E REFERENCE PICTURE DETERMINATION UNIT
101 PREDICTION IMAGE GENERATION UNIT
102 SUBTRACTION UNIT
103 DCT•QUANTIZATION UNIT
1031 INTER-PREDICTION PARAMETER CODING CONTROL UNIT
104 ENTROPY CODING UNIT
105 INVERSE QUANTIZATION•INVERSE DCT UNIT
106 ADDITION UNIT
108 PREDICTION PARAMETER MEMORY
110 CODING PARAMETER DETERMINATION UNIT
111 PREDICTION PARAMETER CODING UNIT
112 INTER-PREDICTION PARAMETER CODING UNIT
1121 MERGE-PREDICTION PARAMETER DERIVING UNIT
1122 AMVP PREDICTION PARAMETER DERIVING UNIT
1123 SUBTRACTION UNIT
1126 PREDICTION PARAMETER INTEGRATION UNIT
113 INTRA-PREDICTION PARAMETER CODING UNIT
2101 DEPENDENCY LAYER INFORMATION DECODING UNIT
2102 PROFILE LEVEL INFORMATION DECODING UNIT
2103 REPRESENTATION INFORMATION DECODING UNIT
2104 SCALING LIST DECODING UNIT
2105 POC INFORMATION DECODING UNIT
2105E POC INFORMATION CODING UNIT
21051 POC LSB MAXIMUM-VALUE DECODING UNIT
21051E POC LSB MAXIMUM-VALUE CODING UNIT
21052 POC LSB DECODING UNIT
21052E POC LSB CODING UNIT
21053 POC MSB DRAWING UNIT
21053B POC MSB DRAWING UNIT
21054 POC ADDITION UNIT
21055 POC RESET UNIT
21056 POC SETTING UNIT
21 PICTURE CODING UNIT
211 NAL-UNIT HEADER DECODING UNIT
2111 LAYER ID DECODING UNIT
2112 NAL UNIT TYPE DECODING UNIT
211E NAL UNIT HEADER CODING UNIT
2112E NAL UNIT TYPE CODING UNIT
212 VPS DECODING UNIT
213 SPS DECODING UNIT
214 PPS DECODING UNIT
215 SLICE HEADER DECODING UNIT
218 REFERENCE PICTURE INFORMATION DECODING UNIT
24 REFERENCE PICTURE SET DETERMINATION UNIT
25 REFERENCE PICTURE LIST DETERMINATION UNIT
301 ENTROPY DECODING UNIT
302 PREDICTION PARAMETER DECODING UNIT
303 INTER-PREDICTION PARAMETER DECODING UNIT

3031 INTER-PREDICTION PARAMETER DECODING CONTROL UNIT
30311 ADDITIONAL PREDICTION-FLAG DECODING UNIT
30312 MERGENCE INDEX DECODING UNIT
30313 VECTOR-CANDIDATE INDEX DECODING UNIT
30314 ADDITIONAL PREDICTION-FLAG DETERMINATION UNIT
3032 AMVP PREDICTION PARAMETER DERIVING UNIT
3033 VECTOR CANDIDATE DRAWING UNIT
3034 PREDICTIVE VECTOR SELECTION UNIT
3035 ADDITION UNIT
3036 MERGE-PREDICTION PARAMETER DERIVING UNIT
30361 MERGENCE CANDIDATE DRAWING UNIT
303611 MERGENCE CANDIDATE STORAGE UNIT
303612 EXPANDED MERGENCE CANDIDATE DRAWING UNIT
3036121 INTER-LAYER MERGENCE CANDIDATE DRAWING UNIT
3036122 DISPARITY VECTOR ACQUISITION UNIT
3036123 INTER-LAYER DISPARITY MERGENCE CANDIDATE DRAWING UNIT
303613 BASIC MERGENCE CANDIDATE DRAWING UNIT
3036131 SPATIAL MERGENCE CANDIDATE DRAWING UNIT
3036132 TEMPORAL MERGENCE CANDIDATE DRAWING UNIT
3036133 COMBINATION MERGENCE CANDIDATE DRAWING UNIT
3036134 ZERO MERGENCE CANDIDATE DRAWING UNIT
303614 MPI CANDIDATE DRAWING UNIT
30362 MERGENCE CANDIDATE SELECTION UNIT
304 INTRA-PREDICTION PARAMETER DECODING UNIT
307 PREDICTION PARAMETER MEMORY
308 PREDICTION IMAGE GENERATION UNIT
309 INTER-PREDICTION IMAGE GENERATION UNIT
3091 DISPARITY COMPENSATION UNIT
3092 RESIDUAL PREDICTION UNIT
30921 RESIDUAL ACQUISITION UNIT
30922 RESIDUAL FILTER UNIT
3093 ILLUMINATION COMPENSATION UNIT
30931 ILLUMINATION PARAMETER ESTIMATION UNIT
30932 ILLUMINATION COMPENSATION FILTER UNIT
3094 PREDICTION UNIT
310 INTRA-PREDICTION IMAGE GENERATION UNIT
3101 DIRECTIONAL PREDICTION UNIT
3102 DMM PREDICTION UNIT
311 INVERSE QUANTIZATION•INVERSE DCT UNIT
312 ADDITION UNIT
313 RESIDUAL STORAGE UNIT

The invention claimed is:

1. An image decoding device which decodes image data subjected to scalable coding, the device comprising:
 circuitry that
 decodes a first flag of a layer; and
 decodes slice_pic_order_cnt_lsb as one type of POC information,
 wherein
 the circuitry decodes the slice_pic_order_cnt_lsb from a slice header (a) in a first case where the first flag indicates a first value and a layer ID is greater than 0, and also (b) in a second case where a NAL unit type does not indicate an IDR picture,
 the circuitry not decoding the slice_pic_order_cnt_lsb in cases different than the first case and the second case.

2. The image decoding device according to claim 1, wherein
 the circuitry further decodes the number of direct dependency layers, and decodes the first flag only in a case where the number of direct dependency layers is 0.

3. An image coding device which performs scalable coding on image data, the device comprising:
 circuitry that
 decodes a first flag of a layer; and
 decodes slice_pic_order_cnt_lsb as one type of POC information,
 wherein
 the circuitry codes the slice_pic_order_cnt_lsb from a slice header (a) in a first case where the first flag indicates a first value and a layer ID is greater than 0, and is also (b) in a second case where a NAL unit type does not indicate an IDR picture, and
 the circuitry not coding slice_pic_order_cnt_lsb in cases different than the first case and the second case.

4. The image coding device according to claim 3, wherein
 the circuitry further codes the number of direct dependency layers, and codes the first flag only in a case where the number of direct dependency layers is 0.

* * * * *